Feb. 3, 1959 H. P. FIELD ET AL 2,872,520

MULTIPLEX COMMUNICATION SYSTEM

Filed Sept. 6, 1952 21 Sheets-Sheet 1

INVENTORS
HAROLD P. FIELD &
JAMES A. KRUMHANSL
BY
T. L. Bowes
ATT'Y

INVENTORS
HAROLD P. FIELD &
JAMES A. KRUMHANSL

BY J. L. Bowes

ATT'Y

MULTIPLEX COMMUNICATION SYSTEM

Filed Sept. 6, 1952 21 Sheets-Sheet 3

LOCAL (MASTER) MULTIPLEXING EQUIPMENT-40

INVENTORS
HAROLD P. FIELD &
JAMES A. KRUMHANSL
BY
T. L. Bowes
ATT'Y

Inventors
Harold P. Field &
James A. Krumhansl
By
T. L. Bowes
Att'y

INVENTORS
HAROLD P. FIELD &
JAMES A. KRUMHANSL

BY T. L. Bowes

ATT'Y.

MULTIPLEX COMMUNICATION SYSTEM

INVENTORS
HAROLD P. FIELD &
JAMES A. KRUMHANSL
BY
T. L. Bowes
ATT'Y

SWITCHING WAVEFORM GENERATOR -370

INVENTORS
HAROLD P. FIELD &
JAMES A. KRUMHANSL
BY
T. L. Bowes
ATT'Y

SWITCHING WAVEFORM GENERATOR -370

INVENTORS
HAROLD P. FIELD &
JAMES A. KRUMHANSL
BY [signature]
ATT'Y

Pulse Width Modulator
and
Multiplexer-220

Inventors
Harold P. Field &
James A. Krumhansl

By T. L. Bowes

Att'y

Inventors
Harold P. Field &
James A. Krumhansl
By T. L. Bowes
Atty

RECEIVER SLICER - 350

INVENTORS
HAROLD P. FIELD &
JAMES A. KRUMHANSL
BY
ATT'Y

Demultiplexer & Pulse Width Demodulator -230

Inventors
Harold P. Field &
James A. Krumhansl
By T. L. Bowes
Att'y

INVENTORS
HAROLD P. FIELD &
JAMES A. KRUMHANSL
BY
T. L. Bowes
ATT'Y

Feb. 3, 1959  H. P. FIELD ET AL  2,872,520

MULTIPLEX COMMUNICATION SYSTEM

Filed Sept. 6, 1952  21 Sheets-Sheet 14

INVENTORS
HAROLD P. FIELD &
JAMES A. KRUMHANSL
BY T. L. Bowes
ATT'Y

Supervisory Relay Circuits 200 & Hybrid 210 (Manual Ringdown) System

Inventors
Harold P. Field &
James A. Krumhansl
By T. L. Bowes
Att'y

Feb. 3, 1959 H. P. FIELD ET AL 2,872,520

MULTIPLEX COMMUNICATION SYSTEM

Filed Sept. 6, 1952 21 Sheets-Sheet 16

INVENTORS
Harold P. Field and
James A. Krumhansl
BY T. L. Bowes
Attorney

Feb. 3, 1959 H. P. FIELD ET AL 2,872,520

MULTIPLEX COMMUNICATION SYSTEM

Filed Sept. 6, 1952 21 Sheets-Sheet 17

INVENTORS:
Harold P. Field and
James A. Krumhansl
BY J. L. Bowes
Attorney

INVENTORS:
Harold P. Field and
James A. Krumhansl
BY T. L. Bowes
Attorney

Feb. 3, 1959 H. P. FIELD ET AL 2,872,520

MULTIPLEX COMMUNICATION SYSTEM

Filed Sept. 6, 1952 21 Sheets-Sheet 19

INVENTORS.
Harold P. Field and
James A. Krumhansl
BY T. L. Bowes
Attorney

INVENTORS:
Harold P. Field and
James A. Krumhansl
BY
T. L. Bowes
Attorney

INVENTORS:
Harold P. Field and
James A. Krumhansl
BY T. L. Bowes
Attorney

United States Patent Office 2,872,520

Patented Feb. 3, 1959

2,872,520

MULTIPLEX COMMUNICATION SYSTEM

Harold P. Field, Rochester, and James A. Krumhansl, Ithaca, N. Y., assignors, by mesne assignments, to General Dynamics Corporation, a corporation of Delaware Application September 6, 1952, Serial No. 308,204

44 Claims. (Cl. 179—15)

The present invention relates to a multiplex communication system and more particularly to a system for multiplex two-way transmission of a plurality of messages over a common transmission path. Specifically, the multiplex two-way transmission of messages is accomplished by allotting successive intervals of time to each of the messages being transmitted, a pulse width modulation system being employed to convey information during the sampling period.

While the invention is of general utility, it is particularly applicable to and will be described in connection with a system capable of providing the complete transmission path between the main frame connections of two telephone toll offices, and includes a microwave radio transmission link between the local and remote terminal points of the telephone system.

In many instances, it is necessary to provide a multiplex communication system which is adapted to work with other conventional communication systems. For example, it is desirable to provide a communication system which will operate with any standard telephone system and in addition, may include a radio link for coupling two widely spaced terminal points of the communication system. While the conventional communication system is concerned only with the transmission of message frequencies which usually require reception of frequencies in the audible range, when the communication system is adapted to work with a standard telephone system it is necessary to provide facilities for transmitting all of the accompanying telephone supervisory signals as well as the message signals. The supervisory signal requirements of conventional telephone systems include the provision for transmission of audible signals such as dial tone and busy signals; provision for the transmission of sub-audible signals such as ringing signals; and provision for the transmission of D. C. signals such as dialing impulses and connect and disconnect signals.

While the supervisory signal requirement of a standard telephone system requires the transmission of D. C. and sub-audible signals, it is nevertheless desirable to provide a communication system in which a single message channel is used to transmit both intelligence information and the telephone supervisory signals. While it is possible to translate the supervisory signals into individual tone frequencies and to transmit the resulting tones over separate channels, such an arrangement requires substantially greater space in the frequency spectrum for a given number of communication channels.

In a multiplex communication system wherein successive intervals of time are allotted to each of the messages being transmitted, it is necessary to provide at each of the terminal points of the communication system, means for synchronizing the terminal equipment so that the time allotted to a given message is accurately synchronized at all points of the communication system. However, it is also desirable to provide a single master frequency source which is used as a standard for the time base set up at the other terminal of the system. It is moreover desirable to provide a synchronization system for synchronizing the time allotment at all of the terminals without using a separate message channel to convey the synchronizing information and in order to simplify the equipment at the slave station.

Accordingly, it is an object of the present invention to provide a new and improved multiplex communication system of the pulse width modulation type.

It is another object of the present invention to provide a new and improved multiplex communication system which is particularly adapted for use with a standard telephone system.

It is a further object of the present invention to provide a new and improved multiplex communication system which is particularly adapted for use with a standard telephone toll system and employs a microwave radio transmission link between the terminal points of the system.

It is another object of the present invention to provide a new and improved multiplex communication system wherein time delays due to transmission of signals between the terminal points of the system are fully compensated.

It is still another object of the present invention to provide a new and improved multiplex communication system which is particularly adapted for use with a standard telephone system and employs a microwave radio transmission link between the terminal points of the system and wherein the time delays due to transmission over the link may be fully compensated.

It is a further object of the present invention to provide a new and improved multiplex communication system which is adapted to be connected into either manual, dial, or unattended community dial offices of present day telephone toll systems without requiring substantial change in existing trunk equipment.

It is a still further object of the present invention to provide a multiplex communication system wherein a single message channel is adapted to handle all of the supervisory signals of a standard telephone toll system as well as the message associated therewith.

Another object of the present invention resides in the provision of a multiplex communication system wherein a single message channel is adapted to handle two-way supervisory telephone signals as well as the message signals associated therewith.

A further object of the present invention resides in the provision of a multiplex communication system of the pulse width modulation type wherein each of the terminals of the system are synchronized by a common master timing source.

A still further object of the present invention resides in the provision of a multiplex communication system of the pulse width modulation type wherein all of the terminals of the system are synchronously timed from a master timing source without using a message channel solely for the transmission of synchronizing information.

It is another object of the present invention to provide a multiplex communication system of the pulse width modulation type wherein each of the message channels is substantially isolated to prevent cross talk and interchannel noise effects.

The invention, both as to its organization and method of operation, together with further objects and advantages thereof, will best be understood by reference to the following specification taken in connection with the accompanying drawings, in which:

Fig. 1 diagrammatically illustrates a multiplex communication system characterized by the features of the present invention and shown in conjunction with a standard telephone toll system;

Figs. 2, 3, 4, and 5, when arranged in the manner shown in Fig. 6, diagrammatically illustrate the components of the multiplex communication system of Fig.1;

Figs. 7 to 15, inclusive, 16A and 16B illustrate the details of the system shown in Figs. 2 to 5, inclusive; and Figs. 13A and 17 to 20, inclusive, are graphs illustrating the operating characteristics of certain components of the system.

In general, the multiplex communication system herein disclosed is of the pulse width modulation type and is capable of transmitting a plurality of message signals from a local or master station to one or more remote or slave stations on a pulse multiplex basis. Basically, the present improved multiplex communication system utilizes a system of pulse sampling effectively at an ultrasonic rate of different ones of a plurality of message signals to provide signal channel separation. Specifically, each of the message channels at the local station is assigned a particular pulse time position in each of the repetitive pulse frames. Intelligence signals developed on any one of the message channels at the local station are sampled only in the particular pulse time position assigned to that message channel and the samples are carried through the multiplexing equipment as width modulated pulses which are positioned in the center of the particular pulse time position and have a duration which varies in accordance with the amplitude of the intelligence signals. The width modulated pulses which are produced in each of the message channel pulse time positions are then simultaneously conveyed by suitable means to the remote station or stations. At the remote station the width modulated pulses are separated from each other and are demodulated to reproduce the original intelligence signals which are supplied to the corresponding message channels of the remote station. In an entirely similar manner, signals originating at the remote station are multiplexed in the manner described above and are conveyed to the local station wherein they are demodulated and supplied to the proper message channel to establish private, two-way communication between the local and remote stations on any one of a plurality of message channels. The successive pulse time positions in repetitive pulse time position frames are established under the control of a common master timing source and the pulse time positions at the local and remote stations are maintained in synchronism by means of synchronizing information which is transmitted from the local station to the remote stations during the pulse time position assigned to one message channel and then only during alternate pulse frames.

In accordance with an important feature of the present invention the multiplex system includes novel facilities for permitting the system to operate with a telephone toll system of any one of the standard types. In particular, the multiplex communication system of the present invention includes facilities for connection into either manual or dial telephone exchanges as well as into unattended community dial offices, any one of which may be equipped for ring-down supervision or two-way dialing with full supervision. These facilities provide for the complete transmission path between the main frame connections of two toll offices of a standard telephone system, and the multiplex system may be operated with existing toll trunk equipment now used on wire lines without substantial change in the trunk equipment and in the case of manual offices without change in the operator's procedure. More specifically, the multiplex communication system of the present invention is capable of providing selective and private two-way communication between any two trunk circuits of existing telephone toll offices and includes facilities for transmitting supervisory signals associated with each telephone call over the same message channel as the intelligence signals associated therewith. While any suitable pulse transmission means may be employed to connect the local and remote stations, the multiplex communication system of the present invention is particularly adapted for use with, and will be illustrated in connection with, a microwave radio transmission link which is employed simultaneously to transmit the width modulated pulses between the local and remote stations over a common pulse multiplex path.

DESCRIPTION OF THE SYSTEM AS A WHOLE

Referring now to the drawings, and more particularly to Fig. 1 thereof, the multiplex communication system of the present invention is indicated generally at 30 and is shown in conjunction with a standard telephone system including a local telephone toll office or exchange 10 having a plurality of trunk circuits 11 to 18, inclusive, and a remote telephone toll office or exchange 20 having a plurality of trunk circuits 21 to 28, inclusive, associated therewith. The multiplex system 30 of the present invention provides private two-way communication between the trunk circuits 11 to 18, inclusive, of the exchange 10 and the trunk circuits 21 to 28, inclusive, of the exchange 20. In the illustrated embodiment a microwave radio link indicated generally at 35 is used to transmit signals between the local multiplexing equipment 40 associated with the local telephone exchange 10 and the remote multiplexing equipment 45 associated with the remote exchange 20.

Generally considered, the multiplexing system 30 provides eight selective and private two-way message signal channels which are designed selectively to transmit the messages to and from the eight trunk or signalling circuits of the illustrated toll telephone exchanges. Intelligence and supervisory signals which appear at the system in jack of any one of the eight trunk circuits 11 to 18, inclusive, are sampled in a particular pulse time position assigned to the associated signalling channel to produce width modulated pulses having a duration which is proportional to the amplitude of the related message signal impressed upon the signalling channel. The signal-bearing pulses of all signalling channels are multiplexed together and are transmitted over the microwave radio link 35 to the remote multiplexing equipment wherein they are demultiplexed and demodulated and supplied to the corresponding signalling channel of the remote exchange 20. At the remote exchange 20 an entirely similar process is provided for signals transmitted in the opposite direction which includes sampling the return message, to produce related width modulated pulses, multiplexing the signal-bearing pulses and the pulse multiplex wave train over the microwave radio link to the local equipment 40, and demultiplexing and demodulating the return signals in the corresponding signal channel in the equipment 40 and impressing the demodulated signals upon the associated trunk circuit of the local exchange 10.

Considering now the component units of the multiplex communication system of Fig. 1, reference may be had to Figs. 2 to 5, inclusive, wherein these component units are shown in block diagram form. In general, the local multiplexing equipment 40, which, in the illustrated embodiment, is shown as the master or controlling unit for the system 30, includes eight substantially identical message signal channels A, B, C, D, E, F, G, and H, a transmitter slicer unit 250, a receiver slicer unit 350 (Fig. 3), a master timing source 360, a switching wave form generator 370, a synchronizing signal generator 385, and a synchronizing pulse modulator and multiplexer 380. Each of the signal channels A to H, inclusive, is connected to one of the trunk circuits 11 to 18, inclusive, of the local exchange 10 and generally performs the functions of translating the message signal impressed thereon into width modulated pulses occurring in the pulse time position or interval assigned to that channel. Each signal channel also demultiplexes and demodulates incoming width modulated pulses occurring in the particular pulse time position assigned thereto and supplies the demodulated message signal to the trunk circuit associated therewith. Each of the channels A to H, inclusive, also performs the function of translating supervisory signals associated with the message signal impressed thereon to provide the supervisory functions necessary when the multiplex system is incorporated in a standard toll telephone system.

Considering, for example, the signal channel A, in order to perform the above-described functions this signal channel includes the supervisory relay circuits 200, a hybrid coil and associated circuit 210, a pulse width modulator and multiplexer 220, and demultiplexer and pulse width demodulator 230. In an entirely similar manner, the message channel B includes the supervisory relay circuits 201, a hybrid coil and associated circuit 211, a pulse width modulator and multiplexer 221, and the demultiplexer and pulse width demodulator 231. The other channels C to H, inclusive, are also provided with corresponding component units to perform the necessary functions associated with each of these channels. All of the pulse width modulator and multiplexer units 220, 221, 222, 223, 324, 325, 326, and 327 are connected to the transmitter slicer unit 250 over the common conductor 251. Likewise, all of the demultiplexer and pulse width demodulator units 230, 231, 232, 233, 334, 335, 336, and 337 are connected to the receiver slicer unit 350 over the common conductor 351.

The output from the transmitter slicer 250 is connected over the conductor 252 to a microwave transmitter 255 which forms a portion of the microwave radio link 35. Likewise, the output of the receiver slicer 350 is connected over the conductor 352 to the microwave receiver 355, which latter unit also forms a portion of the link 35.

In the illustrated embodiment the local multiplexing equipment 40 is shown as the master or controlling station and accordingly is provided with the master timing source 360 which is used as a frequency standard for the entire multiplexing system. In general, the master timing source 360 performs the functions of providing a timing square wave having a suitable supersonic frequency which may be varied from approximately 80 kilocycles per second to 90 kilocycles per second, the produced timing square wave being supplied over the conductor 361 to the switching wave form generator 370 to control the operation thereof. The master timing source 360 also provides control pulses of relatively short duration and of a frequency which is 1/16 that of the timing wave, these control pulses being supplied over the conductors 362 to 365, inclusive, to maintain the switching units of the generator 370 in synchronism as will be described in more detail hereinafter.

The switching wave form generator 370 performs the function of providing a series of positive and negative square wave pairs having frequencies which are submultiples of the timing square wave produced by the master timing source 360. The positive and negative square waves produced by the switching wave form generator 370 are combined on a binary coincidence basis in various combinations to establish successive pulse time positions in repetitive pulse time position frames. Thus, a first pair of positive and negative square waves having a frequency which is ½ that of the timing wave from the source 360 are respectively supplied to the output conductors 372 and 373 of the unit 370. Likewise, a second pair of positive and negative square waves having a frequency which is ¼ that of the master timing wave are respectively impressed upon the conductors 374 and 375. A third pair of positive and negative square waves having a frequency which is ⅛ that of the master timing wave are respectively impressed on the conductors 376 and 377, and a fourth pair of positive and negative square waves having a frequency 1/16 that of the master timing wave are respectively impressed on the conductors 378 and 379.

The switching wave form generator 370 also performs the function of providing at the output terminal 371 thereof a triangular shaped control wave having a frequency equal to that of the master timing wave, this triangular control wave being supplied to the message channels A to H, inclusive, to control in part the formation of width modulated pulses in each of these channels in the pulse position assigned thereto. In order to perform these functions the switching wave form generator is connected over the conductor 371 to the pulse width modulator and multiplexer unit of each of the channels A to H, inclusive. Also the triangular control wave is supplied over the conductor 371 to the synchronizing signal generator 385. Additionally, various combinations of the output conductors 372 to 379, inclusive, of the generator 370 are connected on a binary coincidence basis to the pulse width modulator and multiplexer units and the demultiplexer and pulse width demodulator units of each of the signal channels A to H, inclusive.

Considering generally the functions of the component units of channel A, the supervisory relay circuits 200 thereof perform the functions of transmitting message signals in both directions between the trunk circuit 11 and the hybrid coil circuit 210, translating telephone supervisory signals which are impressed on the trunk circuit 11 into suitable control signals which are supplied over the conductor **220*a* to the pulse width modulator and multiplexer 220, and of translating incoming supervisory signals from the demultiplexer and pulse width demodulator 230 into corresponding telephone supervisory signals which may be impressed upon the trunk circuit 11. To perform these functions, the supervisory relay circuits 200 are connected over the conductor 200*a* to the hybrid coil circuit 210, over the conductor 220*a* to the pulse width modulator and multiplexer 220, and over the conductor 230*b* to the demultiplexer and pulse width demodulator 230**.

The hybrid coil circuit 210 is substantially conventional and performs the function of isolating message signals transmitted in one direction through the system from message signals transmitted in the opposite direction. Thus, signals impressed upon the system in jack of the trunk circuit 11 are transmitted through the hybrid coil circuit 210 and over the conductor **210*a* to the pulse width modulator and multiplexer. Also, incoming signals from the pulse width demodulator and demultiplexer are supplied over the conductor 230*a* to the hybrid coil 210**.

The pulse width modulator and multiplexer 220 performs the function of combining the square waves which are supplied thereto from the switching wave form generator 370 to derive a gating pulse which occurs only during periods when all of the combined square waves are of the same positive phase, thereby defining the forward or outgoing pulse time position assigned to channel A, and of sampling intelligence and supervisory signals only during the interval of the derived gating pulse. More specifically, sampling of the intelligence and supervisory signals is accomplished by superimposing these signals upon the triangular shaped control wave during the derived gating pulse interval, and the resulting amplitude modulated triangular topped pulse which occurs in the pulse time position assigned to the channel A is supplied to the transmitter slicer unit 250 over the common conductor 251. To perform these functions the pulse width modulator and multiplexer unit 220 is connected over the common conductor 251 to the transmitter slicer unit 250 and is connected over the conductors 371, 373, 375, and 377 to the switching wave form generator 370.

The demultiplexer and pulse width demodulator 230 performs the functions of combining on a binary coincidence basis the square waves which are supplied thereto from the switching wave form generator to derive a gating pulse which occurs only during periods when the combined square waves are all of the same positive phase, thereby defining the return or incoming pulse time position assigned to the channel A, selecting only the particular one of the incoming width modulated pulses which occurs during the gating interval corresponding to the derived gating pulse, and of demodulating the selected width modulated pulse to reconstruct the incoming intelligence and supervisory signals. To perform these functions the demultiplexer and pulse width demodulator 230 is connected over the common conductor 351 to the receiver slicer unit 350 and is connected over the conductors 373, 375 and 377 to the switching wave form generator 370. Also, the demodulator unit 230 is connected to the hybrid coil circuit 210 over the conductor 230*a* and over the conductor 230*b* to the supervisory relay circuits 200. The transmitter slicer unit 250 receives triangular topped pulses from the signal channels A to H, inclusive, over the common conductor 251. Each of these triangular topped pulses occurring in the pulse time position assigned to each of the signal channels and are amplitude modulated in accordance with the message signal impressed upon the particular signal channel. The transmitter slicer 250 performs the function of translating the amplitude modulated triangular shaped pulses into a series of constant amplitude, width modulated pulses which occur during the respective pulse time positions assigned to the signal channels A to H, inclusive, and the resulting width modulated pulses are supplied over the conductor 252 to the microwave transmitter 255. The microwave transmitter 255 may comprise any suitable radio frequency or ultra-high-frequency transmitter for transmitting the width modulated signal-bearing pulses, to the remote multiplexing equipment 45. For example, the microwave transmitter 255 may include suitable means for producing a microwave carrier and for modulating the carrier, either in amplitude phase or frequency in accordance with these pulses.

Incoming signals from the remote multiplexing equipment 45 are received by the microwave receiver 355 wherein they are amplified and detected to provide a wave train of width modulated pulses which are supplied over the conductor 352 to the receiver slicer unit 350. The receiver slicer unit 350 performs the function of removing undesired noise components from the pulse wave train and of increasing the slope of each of the width modulated pulses, the output from the receiver slicer 350 being connected over the common conductor 351 to the demultiplexer and pulse width demodulator units of each of the signal channels A to H, inclusive.

In order to convey sychronizing information from the local multiplexing equipment 40 to the remote multiplexing equipment 45 and to the end that the master timing source 360 can be employed as a frequency standard for the entire multiplexing system; one of the signal channels, in the illustrated embodiment channel H, is permitted to transmit width modulated signal pulses only during alternate pulse frames, the pulse time positions which are not used by channel H being employed to convey synchronizing information to the remote multiplexing equipment 45. Accordingly, the pulse width modulator and multiplexer unit 327 and the demultiplexer and pulse width demodulator unit 337 in the signal channel H are supplied with an additional square wave from the switching generator 370 which has a frequency of one-half that of the pulse frame frequency, i. e., one-sixteenth that of the timing square wave developed by the master timing source 360. With this arrangement the signal channel H transmits width modulated signal pulses during the pulse time position assigned thereto but only during alternate pulse frames.

To provide synchronizing information which may be supplied to the remote multiplexing equipment 45, the local equipment 40 includes the synchronizing signal generator 385 and the synchronizing pulse modulator and multiplexer 380. The triangular control wave produced by the switching generator 370 is supplied over the conductor 371 to the synchronizing signal generator 385 and this generator performs the function of producing a unique synchronizing signal which is distinguishable from the width modulated pulses of the remainder of the system. More specifically, the generator 385 produces a signal consisting of two synchronizing pulses which occur during one pulse time position, and the leading and trailing edges of these synchronizing pulses are separated in time by an interval less than the interval between the leading or trailing edges of any two successive signal bearing pulses of the system. The synchronizing signal produced by the generator 385 is supplied over the conductor 386 to the synchronizing pulse modulator and multiplexer 380. The unit 380 is substantially identical to the pulse width modulator and multiplexer 220 of channel A described above. However, no triangular shaped control wave is supplied thereto and the only information which is conveyed to the unit 380 is the synchronizing signal supplied by the generator 385. Accordingly, the synchronizing pulse modulator and multiplexer produces a pair of flat topped pulses occurring in the pulse time position of channel H and during the alternate pulse frames which are not used by channel H. These synchronizing signal pulses are supplied over the common conductor 251 and through the transmitter slicer 250 to the transmitter 255 and are transmitted by means of the transmitter 255 to the remote equipment 45.

The remote multiplexing equipment 45 is identical in many respects with the local multiplexing equipment 40. However, in the remote equipment 45 no master timing source is provided but instead the synchronizing information which is transmitted to the remote equipment in the manner described above is employed to control the operation of a synchronizer unit 560. The synchronizer unit 560 performs the functions of separating the synchronizing information from the width modulated signal pulses of the remainder of the system and of producing from the separated synchronizing information a timing square wave which is supplied over the conductor 561 to the switching wave form generator 570 of the remote equipment 45. The timing square wave supplied by the synchronizer unit 560 to the switching wave form generator 570 controls the operation of the switching units of the generator 570 in substantially the same manner as the timing wave which is supplied from the master timing source to the generator 370 in the local equipment 40. In addition, the synchronizer unit 560 provides control pulses of relatively short duration which are supplied over the conductors 562 to 565 to the generator 570. The switching wave form generator 570 is substantially identical to the switching wave form generator 370 of the local equipment 40 and provides a series of positive and negative pairs of square waves on the conductors 572 to 579, inclusive, which are combined on a binary coincidence basis in each of the channels A′ to H′, inclusive, to derive the pulse time position assigned to each message channel. The switching wave form generator 570 also provides a triangular modulation wave which is supplied over the conductor 571 to the modulator and demodulator units of each of the channels A′ to H′, inclusive, in the remote equipment 45.

The signal channels A′ to H′, inclusive, of the remote multiplexing equipment 45 are substantially identical to the corresponding channels of the local multiplexing equipment 40. Thus, the signal channels A′ to H′, inclusive, of the remote equipment 45 perform the necessary sampling, multiplexing, demultiplexing and demodulating functions to transmit intelligence and supervisory signals impressed upon the trunk circuits 21 to 28, inclusive, to the local multiplexing equipment 40. As a part of the microwave link 35 there is provided the microwave receiver 455 which receives multiplex signals from the transmitter 255 of the local equipment 40, and the microwave transmitter 555 which transmits multiplex signals from the remote equipment 45 to the microwave receiver 355 of the local equipment 40.

In order to render the mode of operation of the system more readily understandable, a pulse chart has been illustrated in Figs. 17 to 19, inclusive, to show the timing relationships of the wave forms produced by the component units of the system and the manner in which these wave forms are utilized to perform the above described multiplexing, demultiplexing, and synchronizing functions. Referring to these figures, the master timing source 360 produces a sinusoidal master timing wave 50 (Fig. 17*a*) which has a frequency which is variable from approximately 80 kilocycles per second to 90 kilocycles per second. From the sinusoidal timing wave 50 there is produced in the timing source 360 a timing square wave 51 (Fig. 17*b*) which is of the same fundamental frequency as the sinusoidal timing wave 50 and is supplied over the conductor 361 to the switching wave form generator 370 to control the switching units thereof.

The switching wave form generator 370 produces a series of positive and negative square wave pairs having frequencies which are submultiples of the frequency of the timing wave 51. Thus, the switching wave form generator 370 produces a positive square wave 52 (Fig. 17*c*) which has a frequency equal to one-half that of the timing wave 51 and is impressed upon the conductor 372 (Fig. 3). Likewise, the switching wave form generator 370 produces a negative going square wave 54 (Fig. 17*d*), having a frequency one-half that of the timing wave 51 which is impressed upon the conductor 373. The switching wave form generator 370 also produces the positive square wave 55 (Fig. 17*e*) and the negative square wave 56 (Fig. 17*f*) which have a frequency which is one-fourth that of the timing wave 51 and which are respectively impressed upon the conductors 374 and 375 (Fig. 3). Additionally, the square wave generator 370 produces a positive square wave 57 (Fig. 17*g*) and the negative square wave 58 (Fig. 17*h*) which have a frequency which is one-eighth that of the timing wave 51 and which are respectively impressed upon the conductors 376 and 377. Finally, the switching wave form generator 370 produces the positive square wave 59 (Fig. 17*i*) and the negative square wave 60 (Fig. 17*j*), which have a frequency one-sixteenth that of the timing wave 51 and which are respectively impressed upon the conductors 378 and 379.

In order to establish successive pulse time positions in repetitive pulse time position frames, certain ones of the positive and negative square waves shown in Fig. 17*c* to 17*j*, inclusive, are combined on a binary coincidence basis to define the required pulse time positions. For example, to define the first pulse time position in a pulse time position frame, i. e., the forward or outgoing pulse time position assigned to channel A, the square waves 52, 55, and 57 are combined to produce the composite wave 62 shown in Fig. 17*k*. From an inspection of Fig. 17*k* it is evident that the composite wave 62 includes the positive portions 63 which occur during periods when all of the combined square waves are of the same phase and which are of greater amplitude than the remaining portions of the composite wave 62. It will be noted that the positive portions 63 have a duration equal to one cycle of the original sinusoidal timing wave 50. By suitable separating means, the portion of the composite wave 62 which appears above a predetermined clipping level 64 is selected to provide a gating square wave 65 (Fig. 17*l*) which persists during and defines the limits of the first pulse time position of each pulse frame.

Considering another example of the manner in which the square waves of Figs. 17*c* to 17*j*, inclusive are combined on a binary coincidence basis to provide gating pulses occurring in the correct pulse time position, in order to define the third pulse time position, i. e., the forward pulse time position assigned to channel C, the square waves 52, 56 and 57 are combined to produce the composite wave 67 shown in Fig. 18*a*. From an inspection of the composite wave 67, it is evident that this wave includes the portions 68 which occur during periods when the combined square waves are of the same phase, these portions having an amplitude greater than the other portions of the composite wave 67 and a duration corresponding to one cycle of the timing wave 50. All portions of the composite wave 67 below a predetermined clipping level 69 are removed by suitable selecting means so that there is produced the positive gating pulses 70 (Fig. 18*b*) which occur in the third pulse time position of each pulse frame.

The switching wave form generator 370 also produces a triangularly shaped control wave 75, shown in Fig. 18*c*, which has a fundamental frequency equal to that of the master timing wave 50 (Fig. 17*a*) and which is supplied over the conductor 371 to all of the modulator units of the channels A to H, inclusive, and the synchronizing signal generator 385.

In order to produce multiplexed pulses which occur during the pulse time position assigned to each of the signal channels A to H, inclusive, and are modulated in width in accordance with with the intelligence and supervisory signals impressed upon these channels, the triangular shaped modulation wave 75 (Fig. 18*c*) is combined with a gating wave, such as the composite wave 62 (Fig. 17*k*), to produce a triangular topped composite wave which may be clipped at a variable clipping level to provide width modulated output pulses. For example, to obtain a width modulated output pulse for the channel A, the triangular modulation wave 75 is combined with the composite wave 62 to provide the composite triangular topped wave 76 shown in Fig. 18*d*. It is evident from an inspection of Fig. 18*d* that the triangular sides of the wave 75 are superimposed upon the flat tops of the gating wave 62 so that the uppermost portion of the triangular topped wave 76 occurs during the first pulse time position in each pulse time position frame. A clipping level indicated by the dotted line 78 is so chosen relative to the amplitude of the composite wave 76 so as to select only the upper portion of that portion of the composite wave 76 which occurs during the first pulse time position of each pulse frame. The selected portions 77 of the composite wave 76 which comprise triangular shaped pulses occurring during the first pulse time position of each pulse frame are then flattened off in the transmitter slicer unit 250 (Fig. 2). There is thus produced the output pulses 80 (Fig. 18*e*) which occur during the first pulse time position of each pulse frame. It is evident from an inspection of Figs. 18*d* and 18*e* that, with the clipping level 78 illustrated in these figures, the output pulses 80 occur well within the limits of the first pulse time position as defined by the gating pulses 65 shown in Fig. 17*e*. It is also evident from these figures that as the clipping level 78 is varied relative to the composite wave 76 the width of the output pulses 80 will vary in a proportionate amount. Thus, as the clipping level 78 is increased relative to the composite wave 76, the output pulses 80 are decreased in width. Likewise, as the clipping level 78 is decreased, the output pulses 80 increase in width. Accordingly, the clipping level 78 may be controlled in accordance with the intelligence and supervisory signals impressed upon the channel A so as to produce the output pulses 80 which are modulated in width in direct proportion to the amplitude of the impressed intelligence and supervisory signals. It will be understood that the clipping level 78 is normally adjusted midway of the total amplitude of the triangular modulation wave 75 so that the intelligence and supervisory signals may swing the clipping level an equal amount on either side of the middle or quiescent position. However, as will be described in more detail hereinafter, the width of the output pulses during off signal periods may be chosen to correspond to a particular D. C. condition to provide for the transmission of D. C. or substantially continuous supervisory signals.

In an entirely similar manner to that described above, the square waves shown in Figs. 17*c* to 17*j*, inclusive, may be combined to define successive pulse time positions for the other seven channels of the system. Thus, the square waves 54, 55, and 57 may be combined with the triangular modulation wave 75 to provide the output pulses 82 shown in Fig. 18*f*, these pulses being modulated in width in accordance with the intelligence and supervisory signals impressed upon the channel B. In a like manner, the square waves 52, 56, and 57 may be combined with the triangular wave 75 to provide the output pulses 85 shown in Fig. 18*g*, these pulses being modulated in width in accordance with the intelligence and supervisory signals impressed upon the channel C. It will be noted that the output pulses 80, 82, and 85 are positioned substantially in the center of the channel pulse interval associated therewith so that the maximum range of width modulation of these pulses is obtained.

In order to transmit synchronizing information to the remote multiplexing equipment 45 without setting aside one of the channels A to H, inclusive, for the exclusive use of synchronizing signal transmission, pulse time positions in alternate pulse frames of one of the signal channels in the illustrated embodiment signal channel H are used to convey an appropriate synchronizing signal. In order to provide this type of operation it is necessary to utilize one of the square waves 59 or 60 which has a fundamental frequency of one-half the pulse frame frequency. Accordingly, to provide synchronizing information the square waves 54, 56, 58 and 59 are combined to produce the composite wave 90 shown in Fig. 18*h*. As shown in this figure the composite wave 90 includes the positive portions 91 which have a greater amplitude than the remaining portions of the wave and which occur only during alternate pulse frames when all of the combined square waves are of the same phase. A clipping level 92 is established midway of the height of the portions 91 so as to remove all portions of the wave 90 below the clipping level 92 and provide the output synchronizing signal 95 shown in Fig. 19*a*. As there shown, the output synchronizing signal occurs within the limits of the pulse time position assigned to channel H and then only during alternate pulse frames.

In order to transmit intelligence and supervisory signals impressed on the channel H, the square waves 54, 56, 58, and 60 are combined to establish the channel pulse position 98 shown in Fig. 19*b*. It is evident that the channel pulse position 98 occurs during the alternate pulse frames which are not used for the transmission of the output synchronizing signal 95. The triangular modulation wave 75 is superimposed upon the pulses 98 and the resultant wave is sliced to provide the output pulses 100 (Fig. 19*c*) which occur during alternate pulse frames in the pulse time position assigned to channel H. In this connection it will be understood that the output pulses 100 are width modulated in accordance with the intelligence and supervisory signals impressed upon channel H.

The output pulses from the pulse width modulator and multiplexer units of each of the channels A to H, inclusive, are impressed upon the common conductor 251 and supplied to the transmitter slicer 250. There is thus produced on the common conductor 251 the composite wave train shown in Fig. 19*d*. As illustrated in this figure, the synchronizing pulses 95 are of substantially greater amplitude than the width modulated triangular portions of the remainder of the wave train. Accordingly, the peak amplitude of the synchronizing pulses 95 may be used as a reference or clamping level to maintain the position of the wave train of Fig. 19*d* relatively fixed despite changes in the amplitude modulated triangular portions thereof. In the transmitter slicer 250 an upper clipping level indicated by the dotted line 102, and a lower clipping level indicated by the dotted line 103, are established to convert the amplitude modulated triangular portions of the wave train into constant amplitude width modulated portions. The portion of the composite wave train included between upper and lower clipping levels 102 and 103 is then supplied to the microwave transmitter 255 and transmitted to the remote multiplexing equipment 45.

With the above general description of the pulse chart illustrated in Figs. 17 to 19, inclusive, in mind it will readily be understood that each pulse frame is divided into eight readily identifiable pulse time positions each of which is assigned to one of the channels A to H, inclusive. It will further be understood that the pulse time position assigned to a particular channel may be varied by varying the combination of gating square waves supplied thereto from the switching wave form generator 370.

*Operation of the system as a whole*

Briefly, to consider the general mode of operation of the system it may be assumed that a toll call originates at the telephone exchange 10 and is intended for the telephone exchange 20 by way of the multiplexing equipment 30 of the present invention. Inasmuch as the telephone exchanges 10 and 20 may be of many different types, a description of the operation of the multiplex communication system in conjunction with a manual ringdown toll telephone system will be given, after which a description of the operation of the system in conjunction with a two-way dial toll system with full supervision will be set forth. In this connection it will be understood that many other types of telephone systems may be employed with the multiplex communication system of the present invention. However, the above identified illustrations provide substantially the entire range of conditions under which the multiplex equipment will be required to operate for any given type of telephone toll system.

During periods when the multiplexing equipment 30 is to be used, the component units of this equipment are continuously energized. However, if desired, the transmitter units 255 and 555 of the microwave link 35 may be de-energized during periods when the system is not in operation to provide economy in the operation of these units. Such intermittent operation of the transmitter units does not interfere in any way with the operation of the system as described below, and, in fact, such operation is preferably employed with the more complicated supervisory systems as will be described in more detail in the detailed description of the system. The master timing source 360 is continuously energized so as to produce the timing square wave 51 shown in Fig. 17*b* and the square wave 51 is supplied over the conductor 361 to the switching wave form generator 370 to control the switching units of this generator. Accordingly, the switching wave form generator 370 produces the positive and negative square wave pairs shown in Figs. 17*c* to 17*j*, inclusive, which are connected over the illustrated conductors 372 to 379, inclusive, in various combinations to the pulse width modulator and multiplexer units and the demultiplexer and pulse width demodulator units of the channels A to H, inclusive. Likewise, the switching wave form generator 370 produces the triangular modulation wave 75 which is supplied over the conductor 371 to the pulse width modulator and multiplexer units of each of the channels A to H, inclusive.

Considering the operation of channel A, the square waves 52, 55 and 57 are continuously supplied to the pulse width modulator and multiplexer unit 220 together with the triangular wave 75 so as to produce the composite wave 76 shown in Fig. 18*d*. In the absence of intelligence or supervisory signals the clipping level 78 shown in this figure is constant and the triangular portions 77 of the composite wave 76 are supplied over the common conductor 251 to the transmitter slicer unit 250. In the unit 250 the triangular portions 77 are converted into the constant amplitude output pulses 80 (Fig. 18*e*) which are centrally positioned within the first pulse time position of each pulse frame. It will be understood that since the clipping level 78 remains fixed, the width of the pulses 80 remains fixed in the absence of intelligence and supervisory signals.

Considering still the operation of the multiplexing system before the start of a call, the triangular modulation wave produced by the generator 370 is also supplied over the conductor 371 to the synchronizing signal generator 385 to produce the unique synchronizing signal 95 shown in Fig. 19*a*. The synchronizing signal 95 is supplied to the synchronizing pulse modulator and multiplexer 380 which operates to produce the synchronizing pulses during the alternate pulse frames and during the pulse time position assigned to channel H. There is thus produced on the common conductor 251 the composite wave form shown in Fig. 19*d*. A horizontal slice between the upper and lower clipping levels 102 and 103 is removed from the center portion of the composite wave shown in Fig. 19*d* and the removed portion thereof is amplified and transmitted over the microwave link which includes the transmitter 255 and the remote receiver 455. In the remote multiplexing equipment 45 the synchronizing signal 95 is separated from the remaining pulses of the system and is used to control or key the synchronizer unit 560 thereof. The synchronizer unit provides a timing square wave substantially identical to the square wave 51 shown in Fig. 17*b* which is supplied to the switching wave form generator 570 to enable this generator to produce a set of positive and negative square wave pairs which is substantially identical to the square waves shown in Figs. 17*c* to 17*j*, which latter waves are produced by the generator 370. A time delay circuit included in the synchronizer 560 is provided for the purpose of insuring that the square waves produced by the switching generator 570 are in time phase coincidence with the square waves produced at the master station by the switching wave form generator 370. Thus, the time delay circuit in the synchronizer unit 560 permits the square waves produced by the generator 570 to be delayed such that the total delay is equal to the time allotted for one pulse time position. Accordingly, the received pulses can be adjusted to fall in the middle of the pulse time position established at the remote multiplexing equipment 45 by the generator 570 and these pulses may be separated from each other and detected to reconstruct the original intelligence and supervisory signals carried thereby.

Considering now the operation of the system when a call is placed at the exchange 10 and assuming that the telephone exchange 10 is of the manual ring-down toll trunk type, the outward operator first plugs into the trunk jack of the trunk circuit 11 thus placing a ground condition originating in the standard trunk or cord circuits on the sleeve lead of the trunk circuit 11. If desired, the microwave transmitter 255 may be normally de-energized such that pulses are not transmitted over the microwave link 35 during periods when a call is not in progress. Under these conditions when the outward operator plugs into the trunk jack, a relay circuit in the supervisory relay circuits 200 is operated to supply a control potential to the transmitter 255 to energize this transmitter. Accordingly, a radio frequency carrier which is modulated by the entire pulse wave train between the clipping levels 102 and 103 of Fig. 19*d* is supplied to the remote receiver 455 to condition the remote multiplexing equipment for operation in the manner described above.

When the operator throws the ringing key at the originating office, the normal 20 or 135 cycle ringing current is coupled through the supervisory circuits 200 wherein it is attenuated to a suitable amplitude and is supplied over the conductor **200*a* to the hybrid coil circuit 210. From the hybrid coil circuit 210 the ringing current is supplied to the pulse width modulator and multiplexer 220 so as to vary the clipping level 78** (Fig. 18*d*) at the ringing current frequency. Accordingly, the output pulses 80 (Fig. 18*e*) are modulated in width at the ringing frequency and the modulated pulses 80 are transmitted over the microwave link 35 to the remote equipment 45. At the remote equipment square waves corresponding to the square waves 52, 55, and 57 (Figs. 17*c*, 17*e* and 17*g*) are supplied to the demultiplexer and pulse width modulator 430 to enable the modulated pulses 80 to be separated from the remaining pulses of the composite wave train. After separation from the other pulses of the system, the modulated pulses 80 are demodulated by suitable detector means so as to reproduce the original ringing current which is supplied over the conductor **430*b* to the supervisory relay circuits 400. In the relay circuits 400 the ringing current is detected in a frequency sensitive relay which in turn places the normal 20 or 135 cycle ringing current onto the tip and ring leads of the trunk circuit 21 for the proper ring-down operation of the standard trunk equipment at the remote exchange 20**.

When the called line answers, the transmission of ringing current thereto is terminated by standard operator procedure and private two-way communication is established between the calling and called lines. Thus, the intelligence signals impressed upon the trunk circuit 11 are transmitted through the relay circuits 200 and the hybrid coil 210 to the pulse width modulator 220 and vary the clipping level 78 (Fig. 18*d*) at the audio rate. Accordingly, the output pulses 80 (Fig. 18*e*) are width modulated in accordance with the intelligence signals, and the pulses 80 are transmitted over the microwave link 35 to the remote multiplexing equipment 45. At the remote equipment the pulses 80 are separated from the remaining pulses of the system by combining the square waves from the generator 570 on a binary coincidence basis to provide a channel-defining pulse which occurs in the same pulse time position as the pulses 80. After separation from the other pulses of the system the pulses 80 are demodulated and the recovered intelligence is transmitted to the trunk circuit 21 and from there to the called substantion. In an entirely similar manner intelligence signals impressed upon the trunk circuit 21 are transmitted through the hybrid coil 410 to the pulse width modulator 420 wherein the intelligence signals produce a variation in the clipping level of the composite wave form established in the unit 420. The composite wave form established in the pulse width modulator and multiplexer 420 is substantially identical to the wave form 76 shown in Fig. 18*d*. However, it will be recalled that the square waves and triangular wave which make up this composite wave are derived from the switching generator 570 rather than from the generator 370 at the master equipment 40. Variation of the clipping level of the composite wave produced at the remote station 45 produces output pulses corresponding to the pulses 80 which are width modulated in accordance with the return intelligence signals. These pulses are transmitted over the link 35 and supplied to the demultiplexer and pulse width demodulator unit 230 of channel A wherein they are demodulated to recover the returned intelligence signals which are transmitted over the conductor **230*a* and through the hybrid coil 210 and the relay circuits 200 to the trunk circuit 11**.

From the above description of the transmission of ringing current through the multiplexing equipment it will be evident that the system is capable of transmitting any supervisory signal of the alternating current type. These supervisory signals may include audible signals such as dial tone and busy tone signals, and the illustrated sub-audible signals such as the conventional 20 cycle or 135 cycle ringing current. In addition to the transmission of alternating current supervisory signals, it is necessary in some telephone systems to provide for the transmission of unidirectional signals such as dialing impulses which are essentially D. C., and connect and disconnect signals which are truly D. C. signals. While it is possible to assign a portion of the modulation range of the equipment for voice signals, and another portion of the modulation range for supervisory signals so that each may be transmitted at the same time, such an arrangement does not permit the voice signals alone to make full use of the modulation range with the result that the signal to noise ratio of the voice signals is substantially reduced. However, with the multiplexing system of the present invention the voice signals may be transmitted at the same time as a unidirectional supervisory signal by designating the average width of the pulses as a particular D. C. condition and adjusting the supervisory relay circuits so that under talking conditions the average width of the output pulses corresponds to the desired D. C. condition at the local and remote stations. The D. C. supervisory voltage can be used either to modulate the width of the output pulse directly or to close a relay which in turn applies a unidirectional potential to the modulator units of the system to change the width of the output pulses. During conversation, the output pulses are made to have a zero modulation width which is exactly half-way between the extreme modulation limits of the system. Accordingly, the voice signals can make use of the full modulation range of the system while permitting the simultaneous transmission of supervisory signals which correspond to the average pulse width whatever their condition. The supervisory relay circuits necessary to provide for the transmission of D. C. supervisory signals are described in detail in connection with Figs. 16*a* and 16*b* of the drawings wherein the supervisory relay circuits suitable for operation with a two-way dialling toll system with full supervision are described.

In the above-described call it has been assumed that channel A at the local or master station 40 is assigned the same pulse time position in repetitive pulse time position frames as the corresponding channel A′ at the remote equipment 45. However, under actual conditions the output pulses transmitted over the microwave link 35 will be delayed between the transmitter and receiver units of this link by an amount dependent upon the distance between these units and the delays in the component circuits thereof. Accordingly, in actual practice a communication path delay is experienced between the transmitting and receiving points so that signal pulses which are produced in the first pulse time position at the local station are delayed in transmission to the remote equipment. Also, signal modulated pulses which are produced in a given time position at the remote station 45 do not appear in the same pulse time position at the local station 40 due to the return communication path delay.

In accordance with an important feature of the present invention, there is provided means for compensating for the over-all communication path delay so that the local and remote stations may be controlled by the common master timing source 360 without providing connections between the local and remote equipments except over the microwave link 35. In the illustrated embodiment, compensation for the communication path delay is provided by allocating different pulse time positions for the local and remote message channels which are employed to establish a given two-way communication. For example, if the communication path delay in one direction is equal to the persistence interval of one pulse time position, then it is evident that the signal pulses are displaced by one complete pulse time position in travelling from the local to the remote stations. However, the synchronizing signal pulses are also transmitted over the same path so that the pulse time position frames set up by the switching wave form generator 570 at the remote station 45 are also delayed by approximately the same amount. In this connection it will be recalled that there is some delay involved in separating and reproducing the received synchronizing signal in the synchronizer unit 560 so that the received signal pulses may not coincide with the pulse time positions set up at the remote station by as much as one pulse persistence interval. Correspondingly, signal pulses which are produced in the second pulse time position at the remote equipment 45 are delayed in transmission over the return path so that they appear in the third pulse time position of each pulse frame set up at the local equipment 40. To provide for the above-described communication path delay, the pulse width modulator and multiplexer units of the message channels may be assigned different pulse time positions from the demultiplexer and pulse width demodulator units of the same channels. Furthermore, such allocation of incoming and outgoing signals may be provided at either the local or the remote station or at both stations.

In order to illustrate the manner in which the multiplexer and the demultiplexer units may be allocated in each channel to compensate for the communication path delay, there is shown in Figs. 20*a* to 20*h*, inclusive, certain wave forms of the system under different communication path delay conditions. Referring to these figures, there is illustrated in Fig. 20*a* the local pulse frames which are produced at the local station 40 by combination of the square waves produced by the switching wave form generator 370. As illustrated, each local pulse frame comprises eight successive pulse time positions which are given the numbers 1 to 8, inclusive. Considering the channels A and A′, for example, and assuming that the communication path delay between stations is equal to one full pulse time position interval, the outgoing signals impressed upon the trunk circuit 11 are sampled in the first pulse time position of each local pulse frame to provide the width modulated pulses 125 shown in Fig. 20*a*. The signal pulses 125 are multiplexed with the other signal pulses of the system such as the signal pulses 126 produced in the channel B and the synchronizing signal pulses 127 produced in the synchronizing pulse modulator and multiplexer 380. The pulse multiplex wave train is transmitted over the link 35 to the remote station and during such transmission the pulses are delayed by an interval $t$, (Fig. 20*b*) which, under the assumed conditions, is equal to one pulse time position interval of the local time base shown in Fig. 20*a*.

At the remote station the synchronizing pulses 127 (Fig. 20*b*) are separated from the remaining pulses of the multiplex wave train in the synchronizer unit 560 and time delay pulses 130 are derived from the separated synchronizing signal, the pulses 130 being delayed from the synchronizing signal pulses 127 by an amount $t_1$. As stated generally heretofore, the interval $t_1$ may be adjusted in the synchronizer unit 560 so that the leading edges of the time delay pulses 130 coincides exactly with the start of a pulse time position interval of the local pulse frames shown in Fig. 20*a*.

In the synchronizer unit 560 a timing square wave 135 (Fig. 20*d*) is produced which is substantially identical to the timing square wave 51 (Fig. 17*b*) although it is derived from the time delay pulses 130. The timing square wave 135 is supplied to the switching wave form generator 570, which latter unit produces a series of positive and negative square wave pairs which are combined on a binary coincidence basis in a manner substantially identical to that described above in connection with the switching wave form generator 370 to define the remote pulse frames shown in Fig. 20*e*

It is evident from an inspection of Fig. 20*e* that the pulse time positions of the remote pulse frames are displaced in time from the pulse time positions of the local pulse frames by an interval equal to two full pulse time position intervals. In this connection it will be understood that in the illustrated embodiment one-half of this time delay is due to the transmission over the link 35, the other half of the delay arising in the development of the timing square wave 135 in the synchronizer unit 560.

By a comparison of Figs. 20*a* and 20*e* it is evident that the first time position of the remote pulse frames coincides in time with the third pulse time position of the local pulse frames. In order to demultiplex and demodulate the pulses 125 which are transmitted to the remote equipment 45 in the manner described above, the demultiplexer and pulse width demodulator 430 in the channel A′ is energized during the eighth pulse time position of each remote pulse frame, and it is evident from a comparison of Figs. 20*b* and 20*e* that such energization of the unit 430 will permit the separation of the pulses 125 from the remaining pulses of the multiplex wave train.

Still considering the operation of channels A and A′ under the above-described communication path delay conditions, incoming or return signals may, for example, be sampled at the remote station 45 in the eighth pulse time position of each remote pulse frame and the pulse multiplex wave train containing these incoming signal samples is transmitted back to the local station 40 over the link 35. In such transmission the incoming signal pulses are delayed by an additional interval $t$ so that they arrive at the local station 40 during the third pulse time position of each local pulse frame. Accordingly, the demultiplexer and pulse width demodulator 230 in the channel A is energized by the square waves 52, 56, and 57 (Fig. 17), the combination of these square waves defining the third pulse time position of each local pulse frame. With this arrangement the incoming signal pulses are separated from the remaining pulses of the multiplex wave train during the third pulse time position of each local pulse frame, after which they are demodulated and impressed upon the trunk circuit 11.

It will be evident from the foregoing description that the multiplexing and demultiplexing of the incoming and outgoing signals may be correlated in many different ways to compensate for the communication path delay. For example, outgoing signals may be sampled in the first time position of each local pulse frame and demultiplexed at the remote station in the eighth pulse time position of each remote pulse frame as described above, and the incoming signals may be sampled in the sixth pulse time position of each remote pulse frame and demultiplexed in the first time position of each local pulse frame. This is readily apparent when Figs. 20*a* and 20*e* are compared, and it is seen that the first pulse time position of each local pulse frame is delayed by one pulse interval from the sixth pulse time position of each remote pulse frame.

While the above-described analysis accurately describes the situation when the communication path delay is exactly equal to one or more pulse time position intervals, this delay may under certain situations be less than or more than one pulse time position interval. To accommodate such situations the frequency of the master timing source 360 may be varied so as to adjust the pulse time position interval so that it bears an integral relationship to the communication path delay. With this arrangement it is possible to use the time bases established by the switching wave form generators 370 and 570 for both multiplexing outgoing signals and demultiplexing returning signals with any given amount of communication path delay.

In this connection it will be understood that the time delay between stations may be equal to more than one pulse frame. For example, the delay in transmission between the stations 40 and 45 may be equal to the interval $t_2$ shown in Fig. 20*f* so that the signal pulses are delayed by an amount equal to eleven successive pulse time position intervals in transmission between these stations. Under such conditions the time delay pulses 130 (Fig. 20*g*) are again reproduced an interval $t_1$ after the synchronizing pulses 127 and the remote time base shown in Fig. 20*h* is developed from the time delay pulses 130 shown in Fig. 20*g*. It will be evident from a comparison of Figs. 20*f* and 20*h* that the signal pulses 125, which are delayed by the interval $t_2$ in transmission, may be demultiplexed during the eighth pulse time position of each remote pulse frame. The incoming or return signals may also be sampled in the eighth pulse time position of each remote pulse frame and the signal samples are delayed by a corresponding interval $t_2$ in transmission back to the local station. Accordingly, the demultiplexer and pulse width demodulator 230 in the channel A is energized by the square waves 52, 56, and 58 in order to demultiplex the return signal samples during the seventh pulse time position in each local pulse frame. If the transmission delay is slightly less than the illustrated interval $t_2$, the frequency of the master timing source 360 is increased by an amount such that the time duration of eleven successive pulse time positions is equal to the transmission delay. On the other hand, if the delay is slightly greater than the interval $t_2$, the frequency of the master timing source 360 is reduced until the communication path delay is equal to an integral number of successive pulse time positions.

By providing the above-described compensation for the over-all communication path delay, the system of the present invention is substantially simplified in that a single time base may be employed at the local station for both the multiplexing and demultiplexing functions, and a single time base may be employed at the remote equipment 45, which is maintained in synchronism with the common master frequency source 360, and may be used for multiplexing and demultiplexing functions at the remote station.

DETAILED DESCRIPTION OF THE SYSTEM

Figure 1:
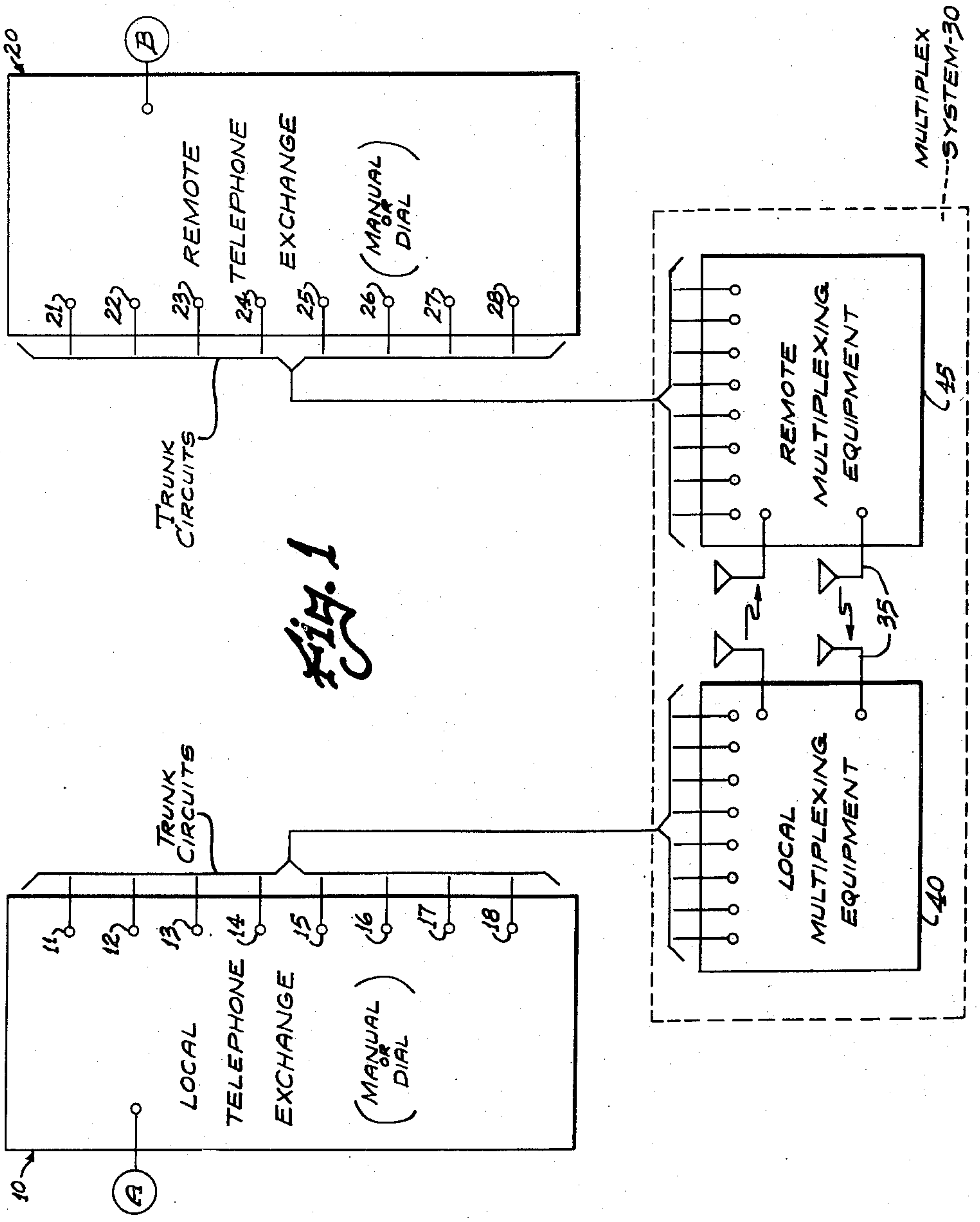
Figure 6:
Figure 2:
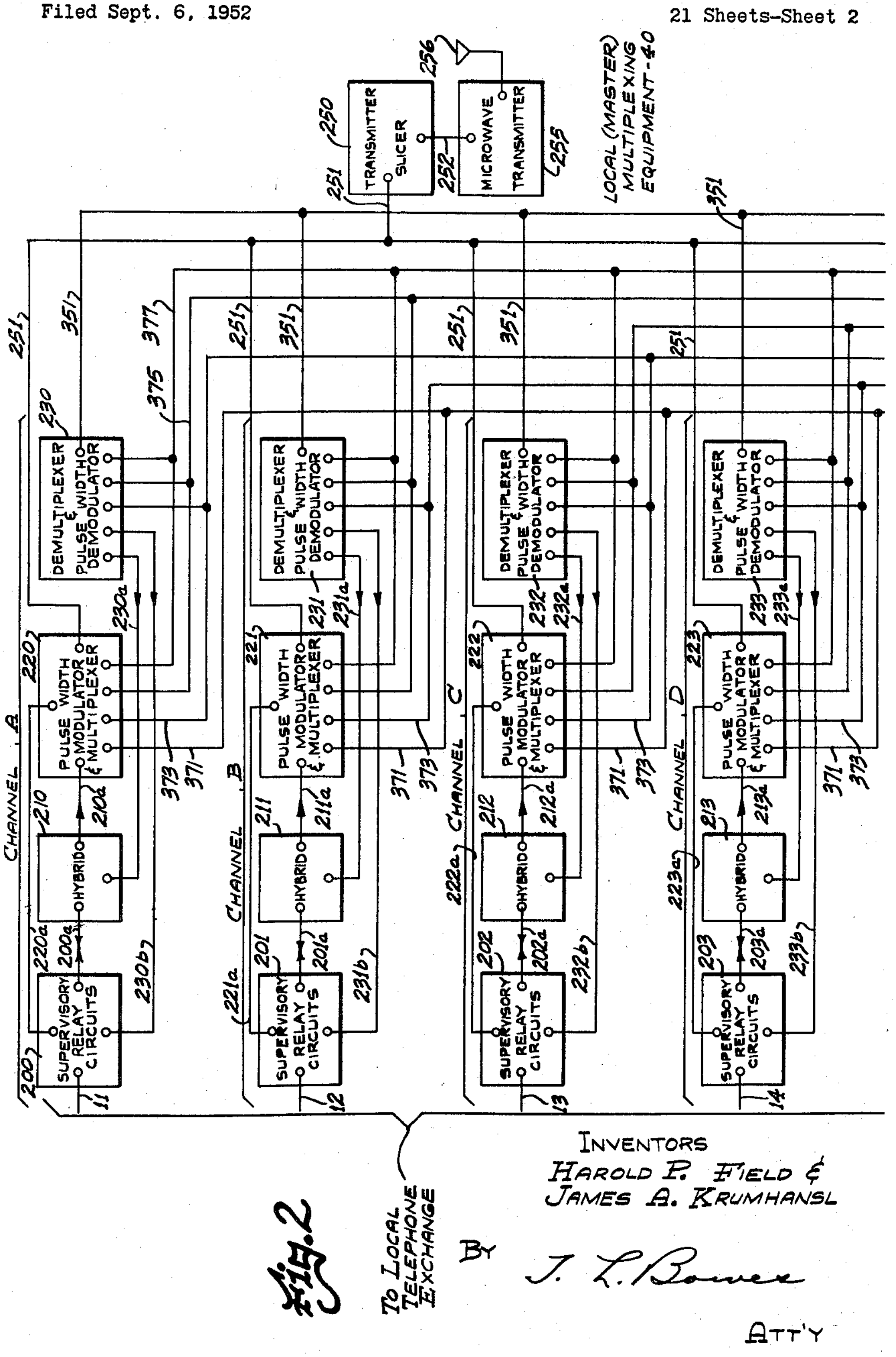
Figure 3:
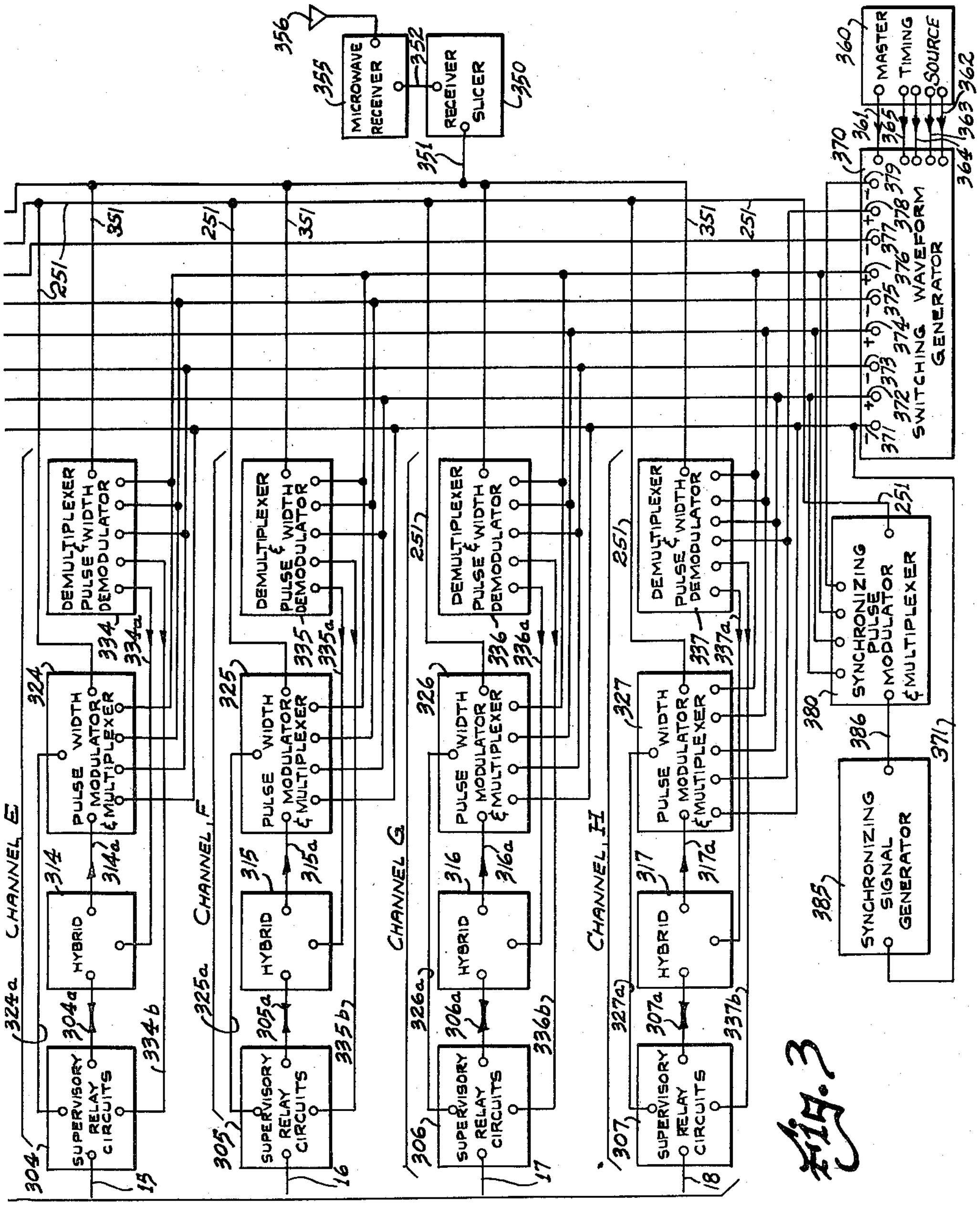
Figure 4:
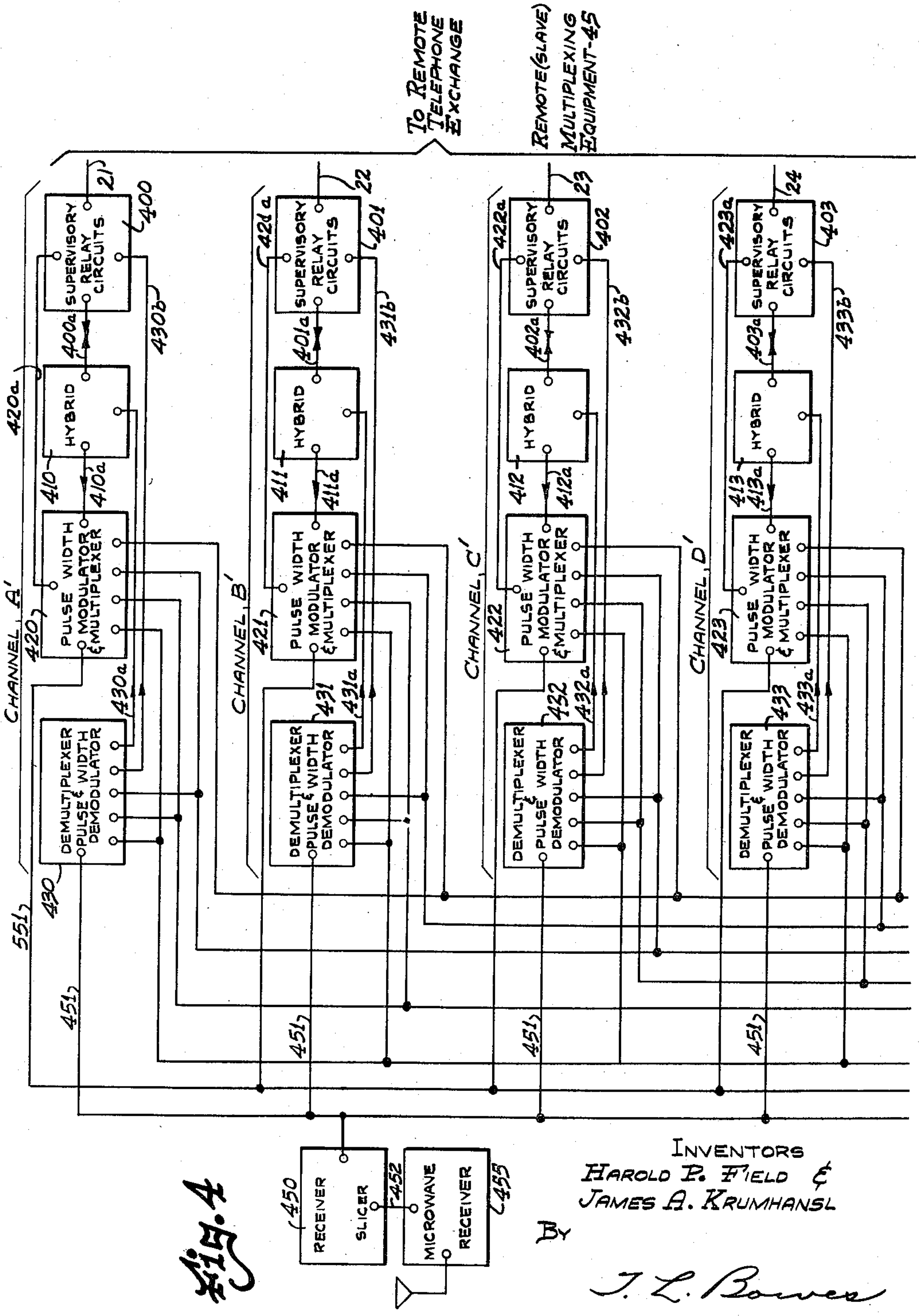

In considering the detailed circuitry of the multiplex communication system components briefly described above, operation of these components will be analyzed insofar as possible in terms of functions which they perform in establishing the above-described connection between the local telephone exchange 10 and the remote telephone exchange 20. Before considering the details of the system components, however, it is pointed out generally that corresponding reference characteristics have been used throughout the drawings to identify corresponding circuit elements of the system. It is also pointed out that all pulse carrying conductors, such, for example, as the conductors 250 and 251, are preferably in the form of coaxial cables or other forms of transmission lines having low pulse attenuating properties at the pulse frequencies employed. On the other hand, all illustrated conductors which function as direct current potential or audio signal carrying conductors are in the form of open or shielded wire. While the schematic diagrams of the components of the system are shown in separate figures in the drawings, it will be understood that a common ground connection is used for the entire system. It is also pointed out that unless necessary to an understanding of the operation to a particular system component, those circuit elements which perform entirely conventional functions in the circuit, namely, functions which will be readily understood in the art, have not been identified in the drawings or referred to in the following description of the system components.

*Master timing circuit 360*

Figure 7:
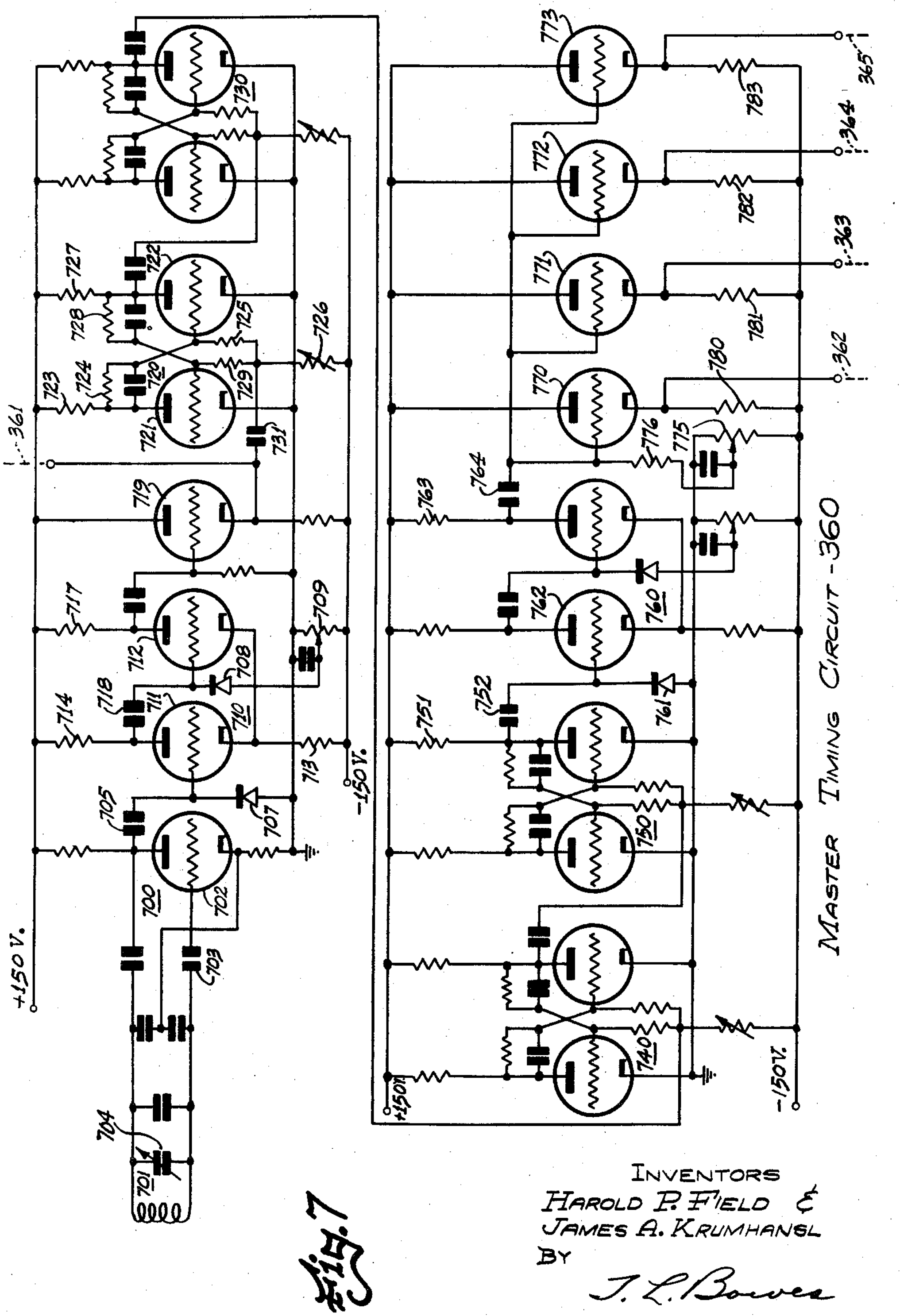

This circuit, as shown in Fig. 7 of the drawings, is designed to provide a stable timing square wave having a frequency which is variable from approximately 80 kilocycles to approximately 90 kilocycles, which is supplied over the conductor 361 to the switching wave form generator 370. Also, the master timing circuit 360 produces negative control pulses of relatively short duration which have a frequency which is one-sixteenth that of the timing square wave, these control pulses being supplied over the conductors 362 to 365 to the switching units of the switching wave form generator 370.

The master timing circuit 360 comprises an oscillator indicated generally at 700, of the well known Colpitts type, a regenerative slicing or squaring circuit indicated generally at 710, a cathode follower output tube 719, a counting chain including a plurality of tandem connected switching circuits of the type having two conditions of stable equilibrium, indicated respectively at 720, 730, 740 and 750, a second regenerative slicing or squaring circuit 760, and a plurality of control pulse output tubes 770, 771, 772 and 773. The counting chain comprising the switching circuits 720, 730, 740 and 750 is provided for the purpose of developing negative control pulses of short duration which recur at one-sixteenth the rate of timing square wave and which are used to maintain the switching units of the wave form generator 370 in synchronism.

More specifically, the oscillator 700 is of the electron coupled Colpitts type wherein a frequency determining parallel resonant circuit 701 is coupled to the anode-cathode circuit of a triode oscillator tube 702 and a portion of the tank circuit voltage is coupled through the condenser 703 to the control grid of the tube 702 so as to sustain oscillations in the resonant circuit 701 at the natural frequency thereof. The frequency of the oscillator 700 may be varied by means of the variable condenser 704 and a stable sinusoidal wave having a frequency which is variable from 80 kilocycles to 90 kilocycles is produced at the anode of the tube 702 and coupled through the condenser 705 to the regenerative squaring circuit 710. The squaring circuit 710 may comprise any suitable circuit arrangement for deriving a rectangular shaped wave from the sinusoidal input supplied thereto from the oscillator 70. However, in order to provide a timing square wave having relatively steep sloped sides, there is provided a circuit commonly known as a Schmitt trigger circuit which is capable of producing a relatively steep sided rectangular wave when excited by a suitable input voltage. In effect, the squaring circuit 710 rejects all portions of the input wave above a predetermined upper clipping level and rejects all portions of the input wave below a predetermined lower clipping level so that the circuit 710 effectively takes a horizontal slice through the middle portion of the wave which is presented to the input circuit thereof and due to the regenerative action thereof provides a relatively steep sided output wave. Such a circuit is commonly caller a slicer circuit. Inasmuch as regenerative squaring circuits similar to the squaring circuit 710 are used in many places throughout the system, a detailed description of this type of squaring circuit is included at this point in the specification. As illustrated, the squaring circuit 710 comprises a pair of triode tubes 711 and 712, the cathodes of which are connected together and through a common cathode resistor 713 to a negative supply potential. The anode of the tube 711 is connected through the resistor 714 to the positive supply potential and the anode of the tube 712 is connected through a resistor 717 to the positive supply potential. The control grid of the tube 711 is connected through a rectifier 707 to ground and the control grid of the tube 712 is connected through a rectifier 708 to the arm of a bias potentiometer 709 which is connected from the negative supply potential to ground. A coupling condenser 718 is connected from the anode of the tube 711 to the control grid of the tube 712.

The tube 712 is normally non-conductive and the positive peaks of the input wave are clamped to ground by means of the rectifier 707. As the input wave becomes more negative, the current in the tube 711 decreases and due to the regenerative common cathode connection, there is an abrupt change or switching action whereby the tube 711 is turned off and the tube 712 rendered fully conductive. As a result, a thin section or slice of the input wave appears in amplified form across the anode resistor 717 of the tube 712 and the output wave across the resistor 717 comprises the timing square wave 51 (Fig. 17*b*) having relatively steep sloped leading and trailing edges and having a frequency equal to that of the input wave from the oscillator 700. The timing square wave produced in the manner described above by the squaring wave circuit 710 is coupled through the condenser to the cathode follower tube 719 which provides a low impedance output circuit suitable for supplying the timing square wave 51 over the conductor 361 to the switching wave form generator 370. The cathode follower 719 also supplies the 80 kilocycle timing square wave to the first switching circuit 720.

The switching circuit 720 comprises a trigger circuit of the modified Eccles-Jordan type and includes the triode tubes 721 and 722. Generally speaking, the tubes 721 and 722 are interconnected so as to be switching abruptly from a conductive to a non-conductive state in response to control pulses supplied to the control grids therof. More specifically, the anode of the tube 721 is connected through the resistor 723 to the positive supply potential and through the resistor 724 to the control grid of the tube 722. The control grid of the tube 722 is connected through the resistor 725 and the common potentiometer 726 to the negative supply potential. In a similar manner the anode of the tube 722 is connected through the resistor 727 to the positive supply potential and through the resistor 728 to the control grid of the tube 721. The control grid of the tube 721 is connected through the resistor 729 and through the common potentiometer 726 to the negative supply potential. The cathodes of the tubes 721 and 722 are connected to ground. The timing square wave 51 is coupled from the cathode of the cathode follower tube 719 through a small differentiating condenser 731 to the junction point of the resistors 725, 729, and 726.

The values of the circuit constants in the voltage divider networks between the anode of one tube and the control grid of the opposite tube in the switching circuit 720 are so chosen that conduction of one tube produces a potential at the control grid of the opposite tube which is sufficient to bias the opposite tube beyond anode current cutoff. The tubes 721 and 722 are abruptly switched from a conductive to a non-conductive state in response to control pulses which are produced across the common grid potentiometer 726 so that the switching circuit 720 may be considered as having two conditions of stable equilibrium. Thus, if the tube 721 is conducting, a negative control pulse produced across the resistor 726 operates abruptly to switch the tube 721 to a non-conductive state and to render the tube 722 fully conductive. On the other hand, the ratio of the resistors 725 and 729 to the resistor 726 is so chosen that positive pulses produced across the resistor 726 are ineffective to cause switching of the counter circuit 720. In this connection it will be understood that the potentiometer 726 may be adjusted to provide the desired two-to-one counting function.

The output wave produced across the anode resistor 727 of the tube 722 comprises a square wave which has a frequency of one-half the frequency of the timing square wave 51 which is supplied to the switching circuit 720. In an entirely similar manner the circuits 730, 740, and 750 each reduce the frequency of the timing square wave by a factor of two so that there is produced across the anode resistor 751 of the final switching circuit 750, a square wave having a frequency which is one-sixteenth that of the 80 kilocycle timing square wave 51. The output square wave across the resistor 751 is coupled through a small differentiating condenser 752 to the control grid of the tube 762 which forms a part of a second regenerative squaring circuit 760. The squaring circuit 760 is substantially identical to the squaring circuit 710 described in detail above. However, the output square wave from the circuit 750 is differentiated by the condenser 752 and the rectifier 761, connected between the control grid of the tube 762 and ground, absorbs the positive portions of the differentiated wave so that the only portion of the output square wave from the counter 750 which is presented to the squaring circuit 760 comprises sharp negative pulses having a frequency which is one-sixteenth that of the timing square wave 51. The negative pulses presented to the control grid of the tube 762 are further sharpened in the squaring circuit 760 and appear as negative pulses across the output resistor 763 of this circuit. These negative control pulses are coupled through the common condenser 764 to the control grids of the cathode follower output tubes 770, 771, 772, and 773 in parallel. A common potentiometer 775, which is connected between the negative supply potential and ground, is used as a source of bias potential for all of the output tubes 770 to 773, inclusive, and a common grid resistor 776 connects the control grids of all of these tubes to the arm of the potentiometer 775. As a result, there is produced across the respective cathode resistors 780, 781, 782, and 783, identical negative control pulses which are of relatively short duration, the D. C. potential across each of these resistors being determined by the setting of the potentiometer 775.

Since the oscillator 700 runs continuously and independently of periods when the multiplexing system is in use, it will be evident that the negative control pulses produced on the conductors 362, 363, 364, and 365 are continuously supplied to the switching wave form generator 370 to control the switching circuits thereof. Accordingly, the time base at the local multiplexing equipment 40 is maintained despite periods of fading or interruptions due to noise pulses so that the time base is automatically maintained at the correct frequency at all times. Also, it will be evident from the foregoing detailed description that the frequency of the oscillator 700 may be varied by a variation of the condenser 704 so that the timing square wave 51 impressed upon the conductor 361 and supplied to the switching wave form generator 370 may be varied to compensate for delays in the transmission path between the local and remote equipment as described heretofore.

*Switching wave form generator 370*

Figure 8A:
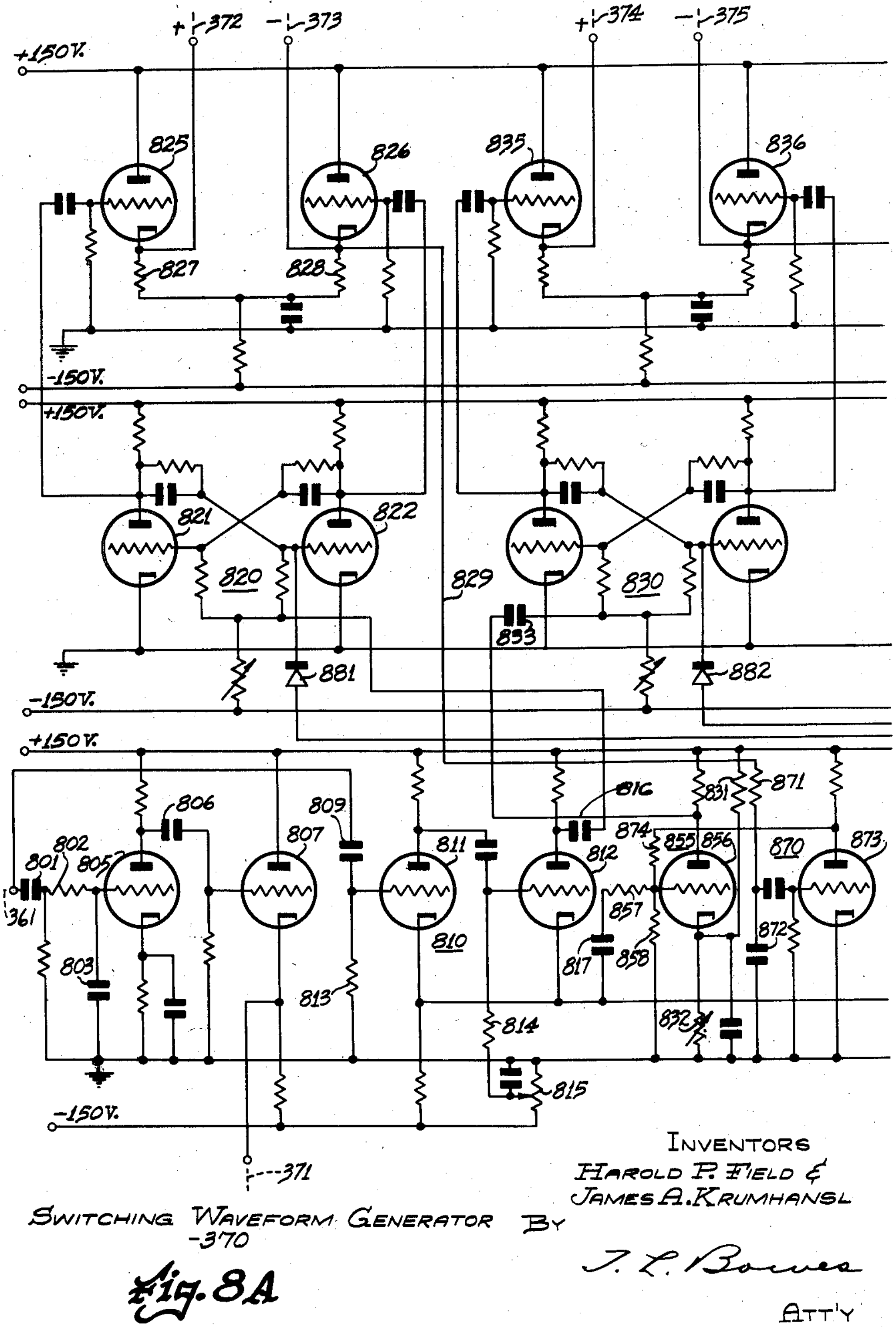
Figure 8B:
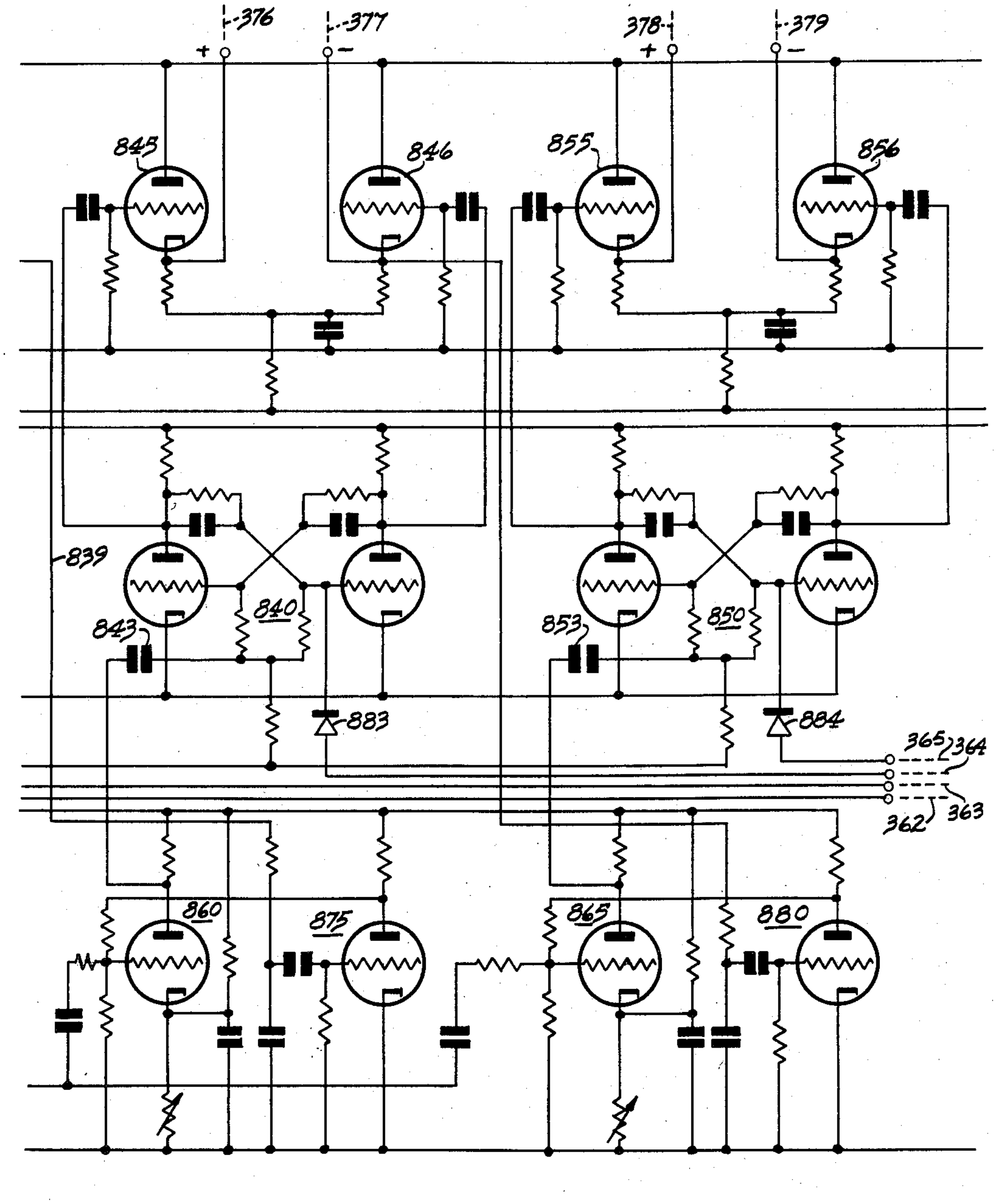
Figure 18:
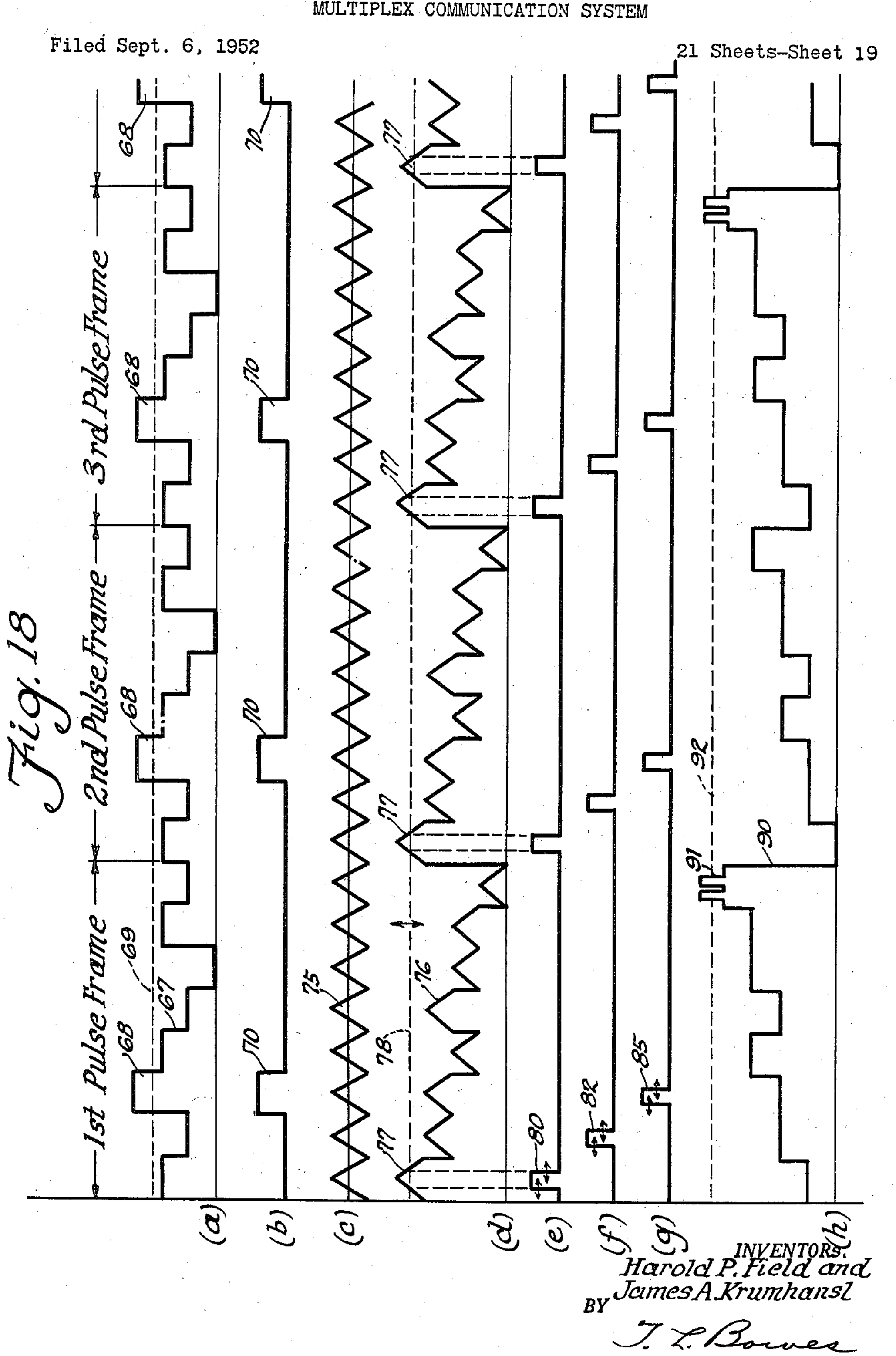

As described briefly in the general description of the system, the switching wave form generator 370, which is shown in Figs. 8A and 8B of the drawings, is provided for the purpose of producing positive and negative square wave pairs having different sub-multiple relationships to the 80 kilocycle timing square wave 51, certain ones of these positive and negative square waves being combined on a binary coincidence basis to establish successive pulse time positions in repetitive time position frames. The switching wave form generator 370 also provides the triangular modulation wave 75 (Fig. 18*c*) which is supplied to the modulator units of the channels A to H, inclusive, as described generally above.

In general, the switching wave form generator 370 includes a triangle wave producing stage 805, a regenerative squaring circuit 810, a series of two-to-one switching circuits 820, 830, 840, and 850, a plurality of cathode follower output stages 825, 826, 835, 836, 845, 846, 847, 848, a plurality of pulse selector stages 855, 860, and 865, and a plurality of wave shaping stages 870, 875, and 880.

In order to eliminate time delays due to switching action when a plurality of switching circuits are keyed in succession by one another, each of the circuits 820, 830, 840, and 850 of the switching wave form generator 370 is controlled by control pulses from the squaring circuit 810. Since the same control pulses are used to key all of the switching circuits 820, 830, 840, and 850, there is no cumulative time delay due to switching action of these circuits, and the positive and negative square wave pairs derived from these counter circuits may be combined on a binary coincidence basis without the production of undesirable switching transients which would reduce the usable time interval of each pulse time position established by these square waves.

Generally considered, the squaring circuit 810 provides negative keying pulses for the first two-to-one counter or switching circuit 820 and also supplies positive control pulses to each of the pulse selector stages 855, 860, and 865. The square wave output of the first switching circuit 820 is integrated in the wave shaping stage 870 to provide a triangularly shaped wave which is combined with the positive control pulses from the squaring circuit 810 in the pulse selector stage 855. The control pulses are of smaller amplitude than the peak-to-peak amplitude of the triangular wave produced by the wave shaping stage 870 and a clipping level is established in the selector stage 855 such that only alternate ones of the control pulses are produced in the output circuit thereof and supplied to the second switching circuit 830.

In a similar manner the output of the second circuit 830 is integrated in the wave shaping stage 875 and the integrated output thereof is combined with the control pulses from the squaring circuit 810 in the pulse selector stage 860 to select every fourth one of the control pulses which are supplied to the third switchting circuit 840. The output of the third circuit is integrated in the wave shaping stage 880 and is combined with the control pulses from the squaring circuit 810 in the pulse selector stage 865 to select every eighth one of the control pulses which are then supplied to the final switching circuit 850.

Figure 17:
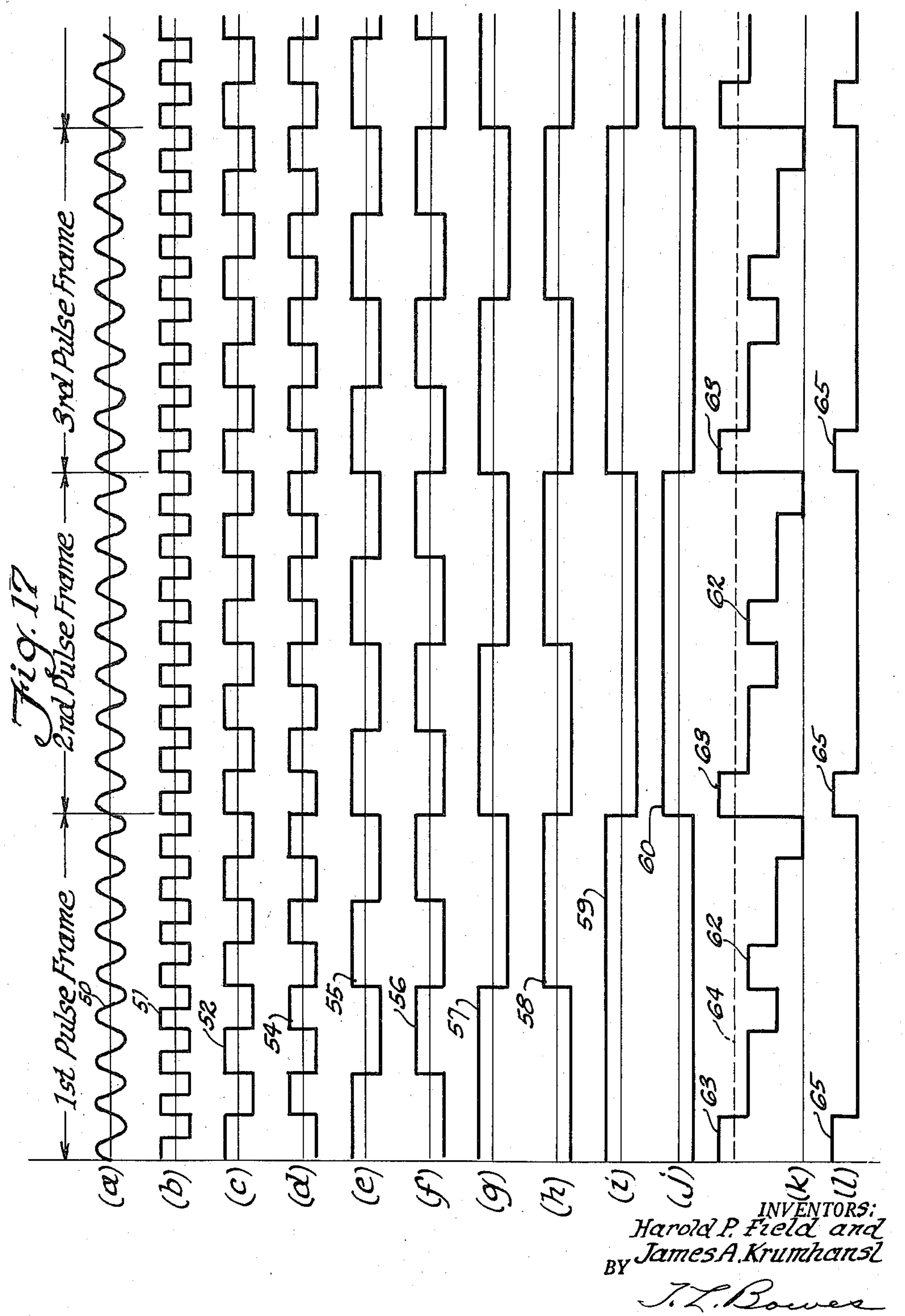

In order to facilitate an understanding of the above described operation of the switching wave form generator 370, there is illustrated in Figs. 19*e* to 19*h*, inclusive, certain of the wave forms produced in the generator 370. Thus, the squaring circuit 810 provides the positive control pulses 110 (Fig. 19*e*) which are of the same frequency as the master timing square wave 51 (Fig. 17*b*). The negative square wave output of the first switching circuit 820, i. e., the square wave 54 shown in Fig. 17*d*, is integrated in the wave shaping stage 870 to provide the triangularly shaped wave 812 shown in Fig. 19*f*, and the positive control pulses 110 are superimposed upon the triangular wave 112 in the manner shown in this figure. A clipping level 114 is established in the pulse selector stage 855 so that only the upper portions of alternate ones of the control pulses 110 are passed by the selector stage 855. The selected alternate control pulses are then supplied to the second switching circuit 830 to control the operation thereof. The negative square wave output of the second circuit 830, i. e., the negative square wave 56 shown in Fig. 17*f*, is integrated in the wave shaping stage 875 to provide the triangular wave 115 shown in Fig. 19*g*. The control pulses 110 are superimposed upon the triangular wave 115 in the manner shown in Fig. 19*g* and a clipping level 116 is established in the pulse selector stage 860 so as to select every fourth one of the control pulses 110. The selected control pulses are then supplied to the third switching circuit 840 to control the operation thereof. The negative square wave output of the third switching circuit 840, i. e., the square wave 58 shown in Fig. 17*h*, is integrated in the wave shaping stage 880 to provide the triangular wave 118 shown in Fig. 19*h*, and the triangular wave 118 is combined with the control pulses 110 in the manner shown in this figure. A clipping level 120 is established in the pulse selector stage 865 to select every eighth one of the control pulses 110, the selected pulses being used to control the final switching circuit 850. From the foregoing description it is evident that the positive and negative square wave pairs developed in the unit 370 are controlled by the common control pulses 110 and may be added on a binary concidence basis without producing substantial switching transients which would interfere with the proper operation of the multiplex system.

Referring now to the detailed schematic diagram of the switching wave form generator 370 shown in Figs. 8A and 8B, the timing square wave 51 is supplied over the conductor 361 and through the condenser 801 (Fig. 8A) to an integration network including the series resistor 802 and the shunt condenser 803. The series resistor 802 and the condenser 803 integrate the timing square wave 51 appearing on the conductor 361 so as to produce the triangular shaped modulation wave 75 (Fig. 18*c*) which is supplied to the control grid of an amplifier tube 805. The triangular wave 75 is amplified in the tube 805 and connected through the condenser 806 to the control grid of a cathode follower tube 807 and the amplified triangular wave is supplied from the cathode of the tube 807 over the conductor 371 to the modulator units of each of the channels A to H, inclusive, and to the synchronizing signal generator 385.

The timing square wave 51 is also supplied from the conductor 361 and through the differentiating condenser 809 to a regenerative squaring circuit indicated generally at 810. The regenerative squaring circuit 810 is similar in many respects to the regenerative squaring wave circuit 710 described in detail in connection with the master timing circuit 360. However, the control grid of the normally on tube 811 of the squaring circuit 810 is connected to ground through the resistor 813 and the control grid of the normally off tube 812 is connected through the resistor 814 to the arm of the bias potentiometer 815. The timing square wave 51 is differentiated in the differentiation circuit including the condenser 809 and the resistor 813 and the negative pulses produced by differentiation are shaped by the squaring circuit 810 to produce at the anode of the tube 812 sharp negative control pulses of relatively large amplitude and to produce at the cathode of the tube 812 correspondingly sharp positive control pulses. The negative pulses produced at the anode of the tube 812 in the manner described above are coupled through the condenser 816 to a first two-to-one switching circuit indicated generally at 820. The switching circuit 820 is of the modified Eccles-Jordan type and is substantially identical with the circuit 720 described in detail in connection with the master timing circuit 360. The circuit 820 functions to produce at the anode of the tubes 821 and 822 thereof, positive and negative square waves which have a frequency equal to one-half that of the timing square wave 51. The positive and negative square waves produced by the circuit 820 are respectively supplied to the cathode followers 825 and 826 and are repeated across the output resistors 827 and 828 thereof to their respective conductors 372 and 373.

As described generally above, the output of the switching circuit 820 is integrated to provide the triangular wave 112 (Fig. 19*f*) which is combined with the control pulses 110 from the squaring circuit 810 to select every other one of the control pulses which are then used to key the succeeding switching circuit 830. More specifically, the negative square wave appearing across the resistor 828 is connected over the conductor 829 and through the series connected resistor 871 and the condenser 872 to ground. The resistor 871 and the condenser 872 constitute an integrating network so that there is produced across the condenser 872 a triangular wave of the same fundamental frequency as the square wave 54 appearing across the resistor 828. The triangular wave thus formed is amplified and inverted in the tube 873 and is coupled through the resistor 874 to the control grid of the selector tube 856. The positive control pulses 110 which are produced at the cathode of the tube 812 in the manner described above, are coupled through the condenser 817 and the resistor 857 to the control grid of the selector tube 856 and this control grid is connected to ground through the resistor 858. The cathode of the tube 856 is biased positively by means of the network including the resistor 831 and the potentiometer 832 which are connected in series from the positive supply potential to ground. The positive bias on the cathode of the tube 856 may be varied by varying the potentiometer 832 to establish the clipping level 114, shown in Fig. 19*f*, at the input circuit of the tube 856. Accordingly, only those control pulses which are superimposed upon the peaks of the triangular wave 112 appear in the anode circuit of the tube 856. Inasmuch as the control pulses occur at twice the rate of the square wave 54 and in synchronism therewith, alternate ones of the control pulses 110 from the squaring circuit 810 are superimposed upon the peaks of the triangular wave 112 so that alternate ones of the control pulses appear as negative pulses in the anode circuit of the tube 856. These negative pulses which are produced in the anode circuit of the tube 856 and occur at one-half the rate of the control pulses from the squaring circuit 810, are coupled through the condenser 833 to the second switching circuit 830. The second circuit 830 is substantially identical to the circuit 820 and provides positive and negative output square waves which have a frequency which is one-half the frequency of the control pulses supplied thereto, i. e., one-fourth the frequency of the control pulses 110 from the squaring circuit 810. The positive and negative square waves produced by the circuit 830 are respectively supplied to the output cathode followers 835 and 836 so as to produce corresponding square waves on the output conductors 374 and 375.

In a manner entirely similar to that described above, the negative square wave 56 (Fig. 17*f*) produced at the cathode of the cathode follower 836 is supplied over the conductor 839 to the wave shaping stage 875 wherein it is converted into the triangular wave 115 (Fig. 19*g*) of the same frequency and is supplied to the pulse selector stage 860. In the selector stage 860, the control pulses 110 from the squaring circuit 810 are combined with the triangular wave 115 so that the control pulses are superimposed upon the triangular wave and only those control pulses which are superimposed upon the peak of the triangular wave 115 appear in the output circuit of the selector stage 860. Negative control pulses which appear in the output circuit of the selector stage 860 and occur at a frequency one-fourth that of the control pulses 110 are coupled through the condenser 843 to the third switching circuit 840. The circuit 840 again counts down by a factor of two so as to produce positive and negative square waves having a frequency which is one-eighth that of the timing square wave 51. These square waves are respectively supplied to the cathode followers 845 and 846 and are impressed upon the output conductors 376 and 377.

The negative square wave 58 from the cathode follower 846 is integrated in the wave shaping stage 880 and combined with the control pulses 110 from the squaring circuit 810 in the selector stage 865 so as to select every eighth one of these control pulses. The selected control pulses are coupled through the condenser 853 to the final switching circuit 850 which again counts down by a factor of two so as to provide positive and negative square waves which have a frequency which is one-sixteenth that of the timing square wave. These square waves are respectively supplied to the cathode followers 855 and 856 and repeated through these stages to the output conductors 378 and 379.

In order to maintain the counter circuits 820, 830, 840, and 850 in synchronous operation with respect to each other, and to the end that these counter circuits always maintain the same relative phase relationships, the phasing pulses which are produced by the master timing circuit 360 in the manner described above, are supplied over the conductors 362, 363, 364, and 365 to the cathodes of the respective gating crystal rectifiers 881, 882, 883, and 884. The anodes of the rectifiers 881 to 884, inclusive, are respectively connected to the control grid of the right hand tube of each of the switching circuits 820, 830, 840, and 850. During the interval of the negative phasing pulses supplied over the conductors 362 to 365, inclusive, each of the rectifiers 881 to 884, inclusive, is rendered conductive so as to force all of the counter circuits 820, 830, and 840, and 850 into the same phase relationship. More specifically, when the gating rectifiers conduct, the right hand tube of each of the circuits 820, 830, 840, and 850 is rendered non-conductive at the same instant. If one of the switching circuits is operating out of phase with respect to the other circuits, the negative phasing pulses force this switching circuit into the correct phase relationship. As a result, the positive and negative square wave outputs from the circuits 820, 830, 840, and 850 may be combined on a binary coincidence basis and the correct pulse time positions maintained at all times. Also, the switching wave form generator 570 at the remote station 45, which is identical to the generator 370, will function properly at all times despite momentary loss of the synchronizing signal due to fading or the like by virtue of the above-described automatic phasing feature of the present invention. In this connection, it will be understood that a reversal in the phase in one of the switching circuits would cause a shift in the pulse time position assigned to a particular channel so that a message originally designated for one channel would be shifted to an entirely different channel if the above-described phasing system is not employed.

*Pulse width modulator and multiplexer 220*

Figure 9:
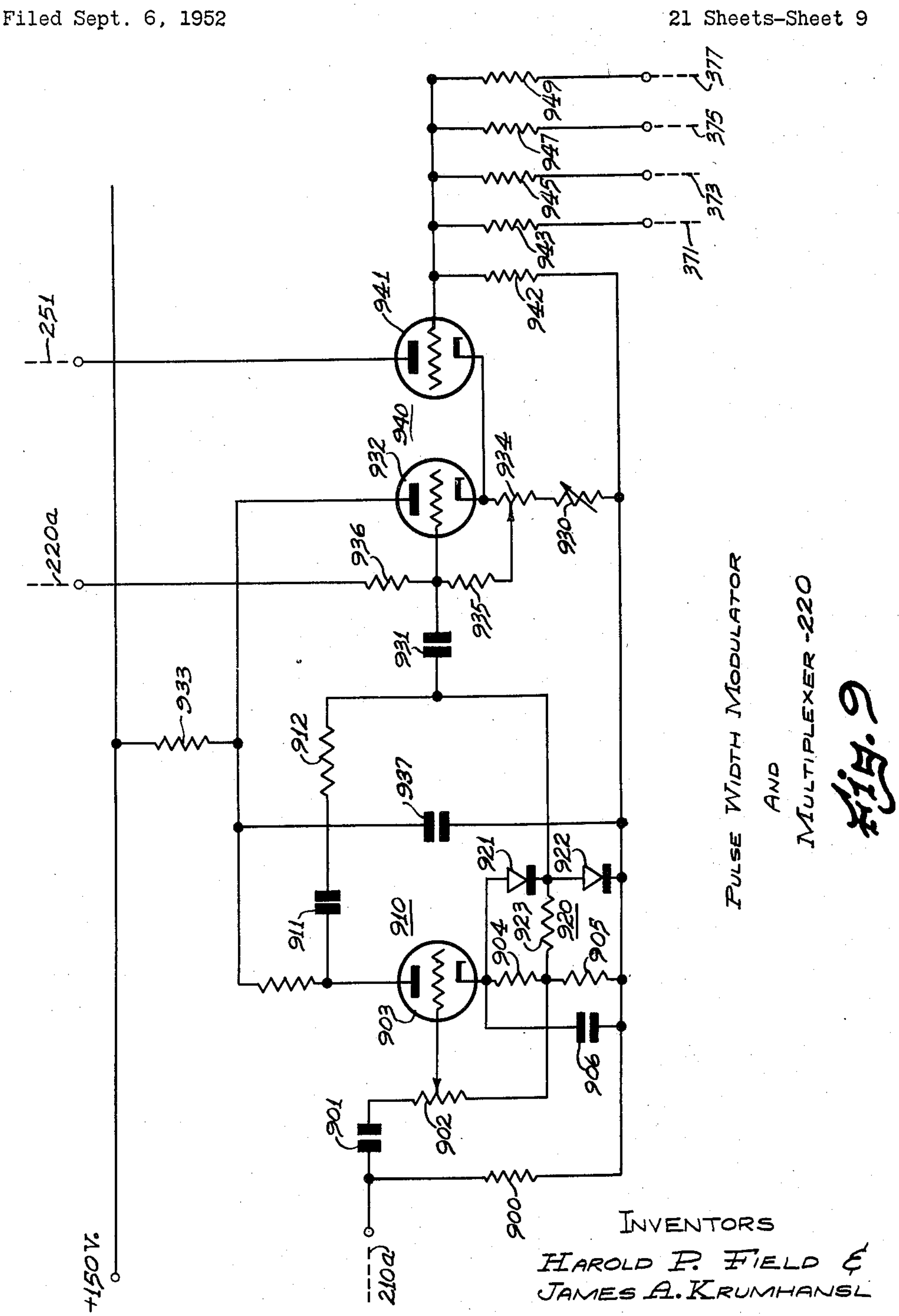

As discussed generally in connection with the general description of the system, the pulse width modulator and multiplexer 220, which is shown in detail in Fig. 9 of the drawings, performs the functions of combining a predetermined group of the positive and negative square waves produced by the switching wave form generator 370 on a binary coincidence basis to define a particular pulse time position within repetitive time position frames and of sampling the message signals impressed upon the channel A in the established time position. Sampling of the message signals is done on an amplitude basis; however, the triangular modulation wave 75 produced by the generator is superimposed on the square wave combination to produce the amplitude modulated triangular wave portions 77 shown in Fig. 18*d*.

The pulse width modulator and multiplexer also performs the functions of providing the correct input impedance for operation with standard telephone circuits, adjusting the amplitude level of the message signal to obtain complete modulation of the pulse during the selected pulse time position, limiting the peak amplitude of the message signal to prevent over-modulation and cross-talk with other channels, and translating D. C. supervisory information into corresponding changes in the width of the output pulse. Additionally, the pulse width modulator and multiplexer unit 220 must have adequate frequency response to transmit the desired message signals and the D. C. supervisory information with a minimum of distortion of these signals and a relatively low noise level.

Referring now to Fig. 9 of the drawings, the pulse width modulator and multiplexer 220 includes an audio amplifier stage 910, a peak limiter circuit 920, and a gating and mixing stage indicated generally at 940. Message signals which originate at the trunk circuit 11 and are transmitted through the supervisory relay circuits 200 and the hybrid coil circuit 210, are connected over the conductor 210*a* and through the condenser 901 to a volume control potentiometer 902. The arm of the potentiometer 902 is directly connected to the grid of an audio amplifier tube 903, the lower end of the potentiometer 902 being connected to the junction point of the series connected cathode resistors 904 and 905 which are connected between the cathode of the tube 903 and ground. A condenser 906 is connected from the cathode of the tube 903 to ground to by-pass signals of message frequencies. A predetermined percentage of the message signals appearing on the conductor 210*a* may be selected by variation of the arm of the potentiometer 902 and the message signal appears in amplified form at the anode of the tube 903. The amplified message signal is coupled through the condenser 911, the series resistor 912, and the condenser 931 to the control grid of a modulator tube 932.

In order to prevent over-modulation of the pulses by the message signal, there is provided a peak limiting circuit indicated generally at 920 which includes the rectifiers 921 and 922. The cathode of the rectifier 921 is connected to the cathode of the tube 903 and the anode of the rectifier 921 is connected through a resistor 932 to the junction point of the resistors 904 and 905. The cathode of the rectifier 922 is conencted to the anode of the rectifier 921 and the anode of the rectifier 922 is connected to ground. The peak limiter circuit 920 clips off the positive and negative peaks of the message signal which have an amplitude greater than the value necessary to provide 100 percent modulation of the triangular modulation wave 75. Thus, if the positive portion of the message signal appearing at the anode of the tube 903 exceeds the potential across the resistor 904, the rectifier 921 conducts so that the input circuit of the modulator tube 932 is effectively short circuited to ground through the condenser 906. Similarly, if the negative portion of the signal appearing at the anode of the tube 903 exceeds the potential across the resistor 905, the rectifier 922 conducts and short circuits the input circuit of the tube 932 directly to ground.

In accordance with an important feature of the limiter circuit 920, the bias potential for each of the rectifiers 921 and 922 is derived from the cathode circuit of the amplifier tube 903 in the manner described above so that the bias potential for each of the limiting rectifiers 921 and 922 is completely isolated from the audio circuits of the other signal channels of the system. In this connection, it will be understood that if a conventional bias potential such as a battery or other unidirectional potential source were employed to provide a common bias potential for all of the limiting rectifiers of the signal channels, substantial interaction and interchannel cross-talk would result. However, by the above-described arrangement, a balanced peak limiting action is obtained while maintaining isolation of the audio circuits.

In order to establish the desired pulse time position there is provided in the pulse width modulator and multiplexer 220 means for combining certain ones of the square waves produced by the switching wave form generator 370 and the triangular modulation wave 75 produced by this generator. In the illustrated embodiment a system of resistance mixing is employed in the grid circuit of a gating tube 941 included in the gating and modulating stage 940. More specifically, the control grid of the gating tube 941 is connected to ground through the resistor 942 and the square waves and triangular wave are connected through relatively large isolating resistors 943, 945, 947, and 949 to the control grid of the gating tube 941.

Thus, the positive square wave 52, which has a frequency which is one-half the frequency of the matser timing square wave 51, is connected over the conductor 373 and through the resistor 945 to the control grid of the tube 941, the positive square wave 55 of one-fourth the frequency of the master timing square wave 51 is supplied over the conductor 375 and through the resistor 947 to the control grid of the tube 941, the positive square wave 57 of a frequency one-eighth that of the master timing square wave 51 is supplied over the conductor 377 and through the resistor 949 to the control grid of the tube 941, and the triangular modulation wave 75 which has a frequency equal to that of the master timing square wave 51 is supplied over the conductor 371 and through the resistor 943 to the control grid of the tube 941. Each of the resistors 943, 945, 947, and 949 is of the same value which is several times greater than the common resistor 942 which is connected to ground so that the conductors 371, 373, 375, and 377 are effectively isolated, although the wave forms present on these conductors are combined in equal amounts at the control grid of the tube 941 to form the composite wave 76 shown in Fig. 18*d*. The cathode potential of the tube 941 is controlled by the modulating tube 932 and is biased to a positive potential by the flow of current through the potentiometers 934 and 930 to establish the clipping level 78 which prevents all but the uppermost portions 77 of the composite wave 76 from appearing in the anode circuit of the gating tube 941. Since the gating square waves are combined on a binary coincidence basis to establish a particular pulse time position, only those cycles of the triangular modulation wave 75 which occur during periods when all of the combined square waves are of the same phase appear at the anode of the tube 941. Furthermore, only that portion of the selected triangles which extends above the clipping level 78 is repeated to the anode of the tube 941. Accordingly, variation in the clipping level 78 produces a corresponding variation in the amplitude of the selected triangle portions 77 and at the same time produces a corresponding variation in the width of the base of these triangle portions.

In order to vary the clipping level 78 in accordance with the impressed message signals, these signals, which are amplified in the amplifier tube 903, are coupled through the condenser 911, the resistor 912, and the condenser 931 to the control grid of the modulator tube 932 thereby varying the cathode potential of this tube directly in accordance with the impressed message signal. The cathode of the modulator tube 932 and the gating tube 941 are directly connected together so that the variation of the cathode potential of the tube 932 causes a variation in the clipping level 78 and hence a variation in the amplitude and width of the selected triangular portions 77. The modulator tube 932 is operated as a cathode follower, the anode thereof being connected to the positive supply potential through the decoupling resistor 933 which is common to both the amplifier tube 903 and the modulator tube 932, variation in the anode potential of the tube 932 being prevented by the by-pass condenser 937 which is connected from the anode of the tube 932 to ground. The control grid of the tube 932 is connected through the resistor 935 to the arm of the potentiometer 934. The quiescent or zero modulation position of the clipping level 78 may be adjusted by variation of the potentiometers 934 and 930.

Considering now the operation of the gating and modulating stage 940 in producing a selected triangular wave which is amplitude and width modulated in accordance with the desired message signals, it is first assumed that no message signals are received and the cathodes of the tubes 932 and 941 are ocerated at a steady D. C. potential. The cathode potential of the tubes 932 and 941 can be varied by adjusting the arm of the potentiometer 934 so that the cathode of the tube 942 is sufficiently positive to establish the clipping level 78 which cuts off the gating tube 941 at all times except when the three gating waves produced on the conductors 373, 375, and 377 add simultaneously, which condition occurs only once during each pulse frame and for one-eighth of the total duration of the pulse frame. As a result, a selected triangular wave, which occurs during the period when all three of the gating waves add simultaneously, is produced in the anode circuit of the tube 941 and the potentiometer 934 may be adjusted to provide a clipping level such that only the upper half of the selected triangular wave is passed by the tube 941.

When the message signal is coupled through the condenser 931 to the control grid of the modulator tube 932, this tube acts as a cathode follower and varies the cathode potential of the tube 941 at the audio rate of the message signal. Accordingly, the amplitude and base width of the selected triangular portions 77, Fig. 18*d*, which are passed by the tube 941, vary relative to the fixed reference level, i. e., the D. C. clipping level established by the flow of current through the cathode potentiometers 934 and 935 of the modulator tube 932.

In accordance with an important feature of the pulse width modulator unit 220, the audio message signal is impressed upon the grid of the modulator tube 932 and the time base square waves produced on the conductors 373, 375, and 377 and the triangular modulation wave on the conductor 371 are combined with the audio signal in the relatively low impedance common cathode circuit of the tubes 932 and 941. As a result, the audio message signal is completely isolated from the square waves produced by the switching wave form generator so that a substantial improvement in the cross-talk ratio between channels is produced. In this connection it will be understood that the square waves of the generator 370 are supplied in various combinations to all of the message channels, and any audio signals which are impressed upon these square waves would be reproduced in each of the message channels as cross-talk. Furthermore, the gating tube 941 is completely cut off except during the selected pulse time position when the three gating waves add simultaneously as described above so that the audio signal is completely isolated from the timing wave forms except during the desired pulse time position.

In order to translate D. C. supervisory information into corresponding changes in width of the output pulse of the associated message channel, there is provided in the pulse width modulator and multiplexer unit 220 means for varying directly the clipping level 78 and hence the cathode potential of the gating tube 941. More specifically, the D. C. supervisory information from the supervisory relay circuits 200 is connected over the conductor **220*a* and through the resistor 936 to the control grid of the modulator tube 932. Since the D. C. supervisory information is of greater amplitude than the incoming message signal no amplification of the supervisory information is necessary and a galvanic connection is provided to the control grid of the modulator tube 932. Accordingly, changes in the D. C. level on the conductor 220*a* produce corresponding changes in the cathode potential of the tube 941 and the amplitude and width of the output pulse appearing at the anode of this tube. Since a direct connection is made through the above enumerated circuit components, a truly D. C. change may be effected in the pulse width so as to provide for the transmission of D. C. supervisory information through the multiplex communication system. In this connection it will be understood that the transmission of D. C. supervisory information through the audio stage 910** would require that this stage pass a unidirectional component. Such a requirement is undesirable from the standpoint of stability and simplicity of the circuit components. However, with the above-described circuit arrangements the transmission of D. C. supervisory information is effected in a simple and efficient manner.

It will be understood from the foregoing description that the audio stage 910 of the pulse width modulator and multiplexer unit 220 is capable of transmitting all supervisory signals which are of the alternating current type so that this unit transmits all of the alternating current supervisory information required for telephone systems of any desired type. Thus, the frequency response of the audio amplifier stage 910 is such as to transmit the relatively low frequency ringing current signals and busy tone signals to the modulator tube 932.

*Transmitter slicer 250*

Figure 10:
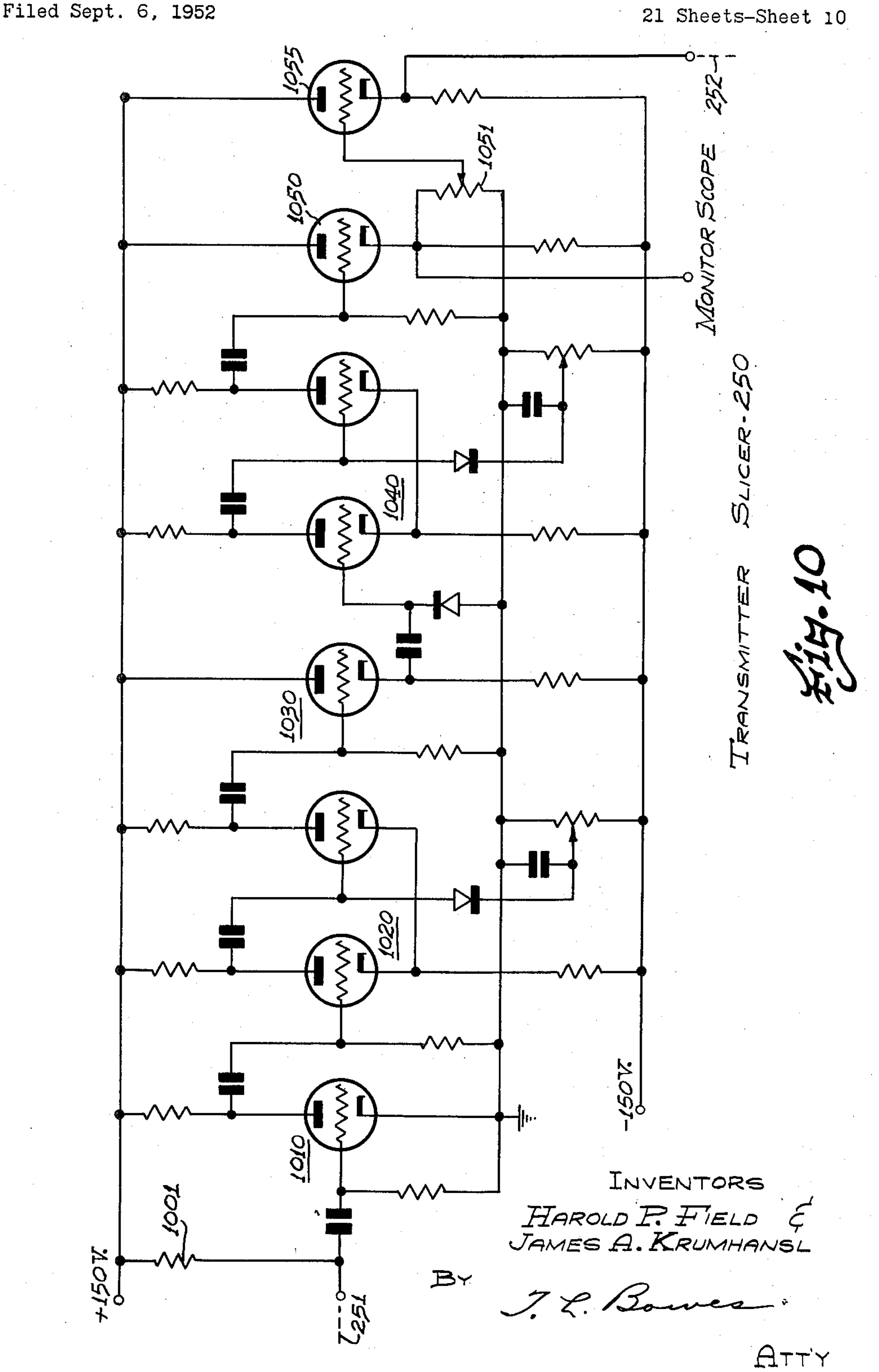
Figure 19:
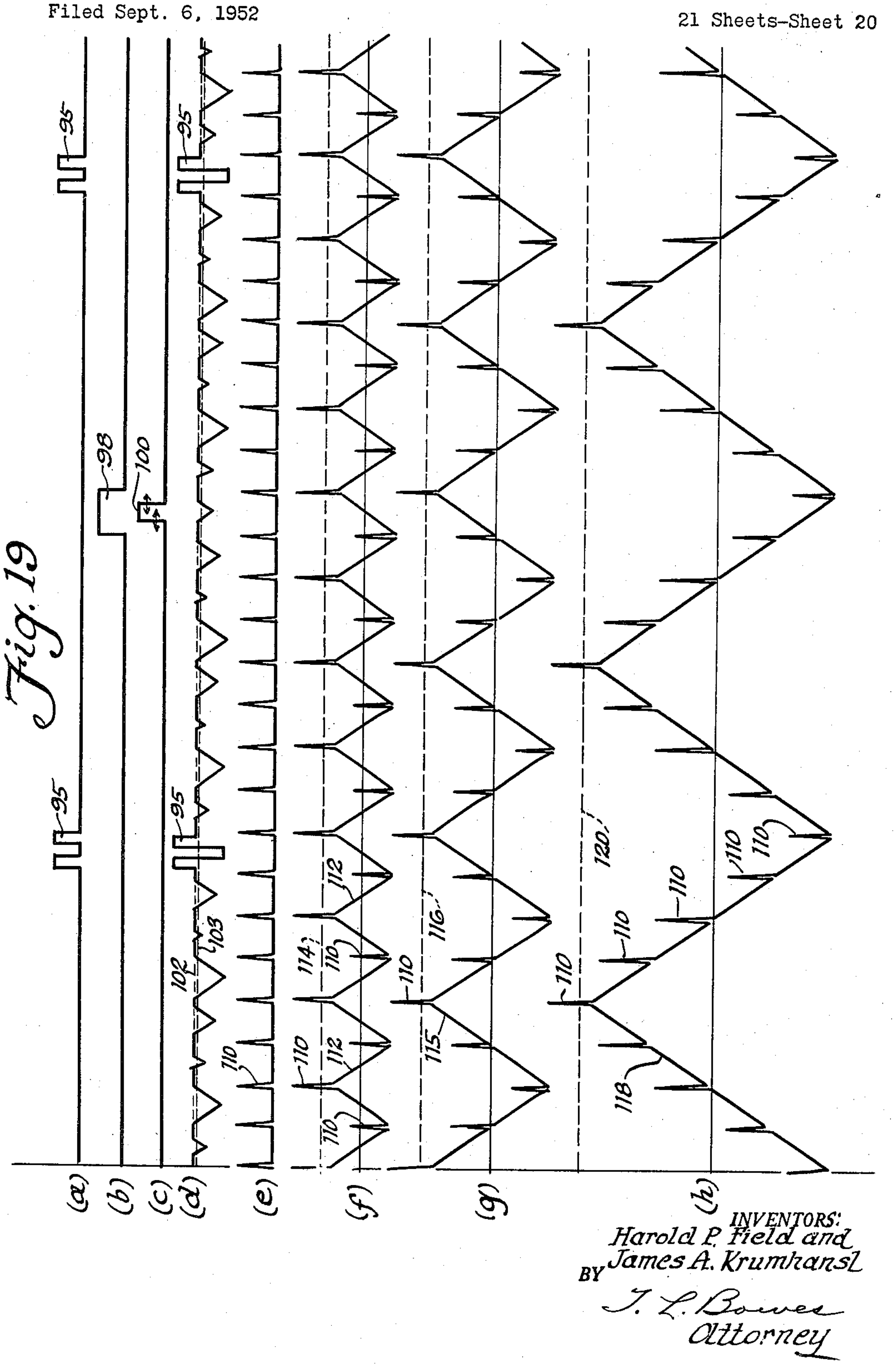
Figure 20:
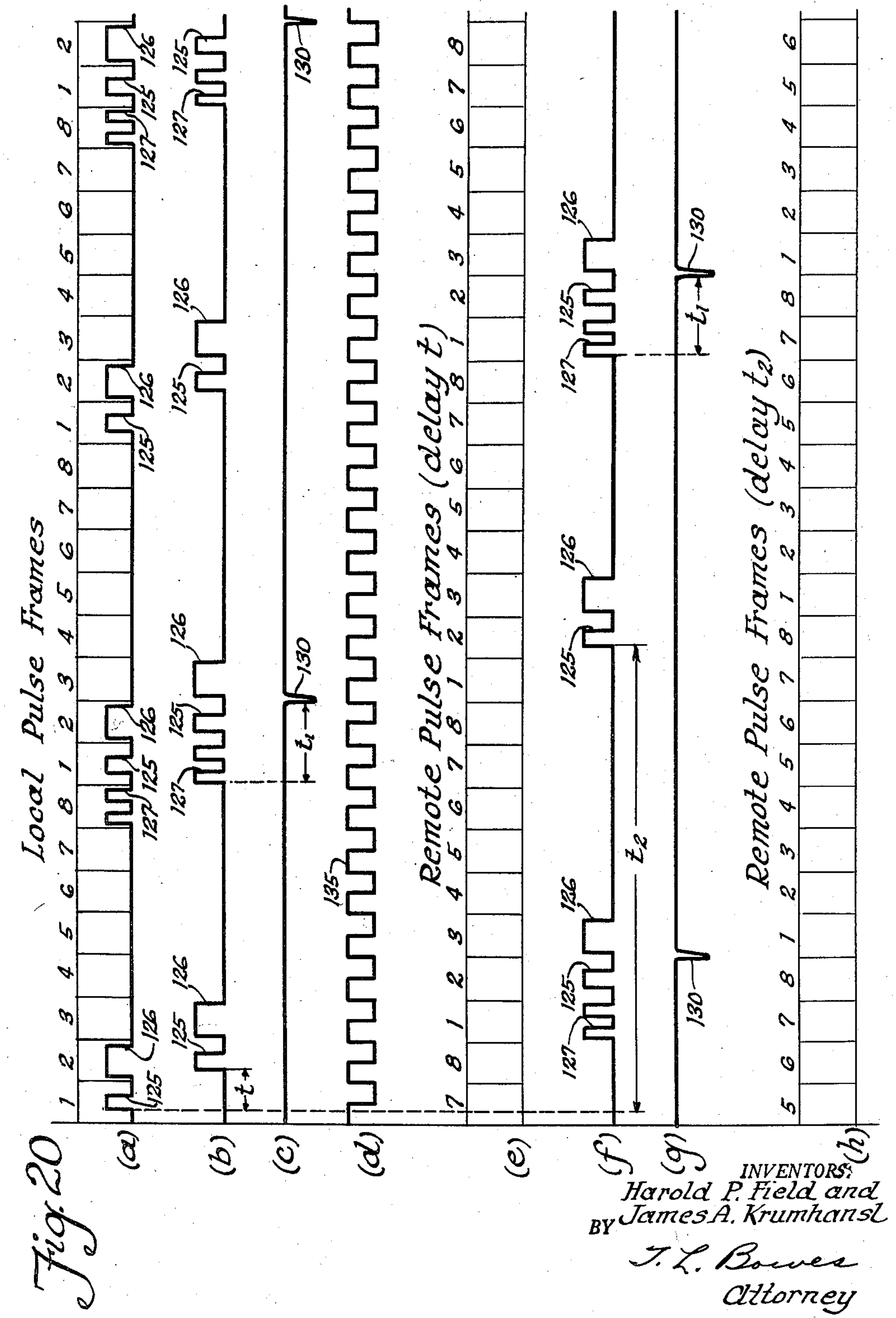

As discussed generally in connection with the general description of the system, the transmitter slicer 250, which is shown in detail in Fig. 10 of the drawings, performs the function of translating the output pulse wave train shown in Fig. 19*d*, which appears on the common conductor 251 and consists of a series of amplitude modulated selected triangular waves from each of the modulator units of the channels A to H, inclusive, and a synchronizing signal from the modulator unit 380, into a train of corresponding flat topped width modulated pulses which are suitable for modulating the carrier wave of the transmitter 250. More specifically, the transmitter slicer 250 includes an amplifier stage 1010, a first regenerative slicing circuit 1020, a cathode follower isolating stage 1030, a second regenerative slicing circuit 1040, and a pair of tandem connected cathode follower output stages 1050 and 1055.

It will be recalled from the detailed description of the pulse width modulator and multiplexer 220 that each of these units is connected over the common conductor 251 to the transmitter slicer 250. More specifically, the anode of the gating tube 941 of each of these units is connected through the common conductor 251 to a common anode resistor 1001 which is connected to the positive supply potential. Accordingly, the selected triangular portions 77 from each of the modulator units appear across the resistor 1001. This composite wave train is amplified in the stage 1010 and supplied to the first regenerative slicing circuit 1020. The circuit 1020 is substantially identical to the regenerative circuit 710, described in detail in connection with the master timing circuit 360, and selects a horizontal slice through the composite wave. Thus, referring to Fig. 19*d*, the regenerative slicing circuit 1020 establishes the upper clipping level 102 and the lower clipping level 103, so as to select the horizontal slice between the levels 102 and 103 of the amplitude modulated triangular pulses. There is thus produced in the output of the slicing circuit 1020 flat topped width modulated pulses corresponding to the pulses 80 shown in Fig. 18*e* for each of the channels A to H, inclusive. This pulse multiplex wave train is coupled through the cathode follower stage 1030 to provide a low impedance output and further slicing action is produced by the second regenerative slicing circuit 1040 to eliminate any amplitude modulation of the pulse wave train. The output of the second regenerative slicing circuit 1040 is coupled through the cathode followers 1050 and 1055 and over the conductor 252 to the microwave transmitter 255. A potentiometer 1051 may be used to control the amplitude of the width modulated output pulses which are supplied to the transmitter 255 to obtain the correct modulation level therein.

*Receiver slicer 350*

Figure 11:
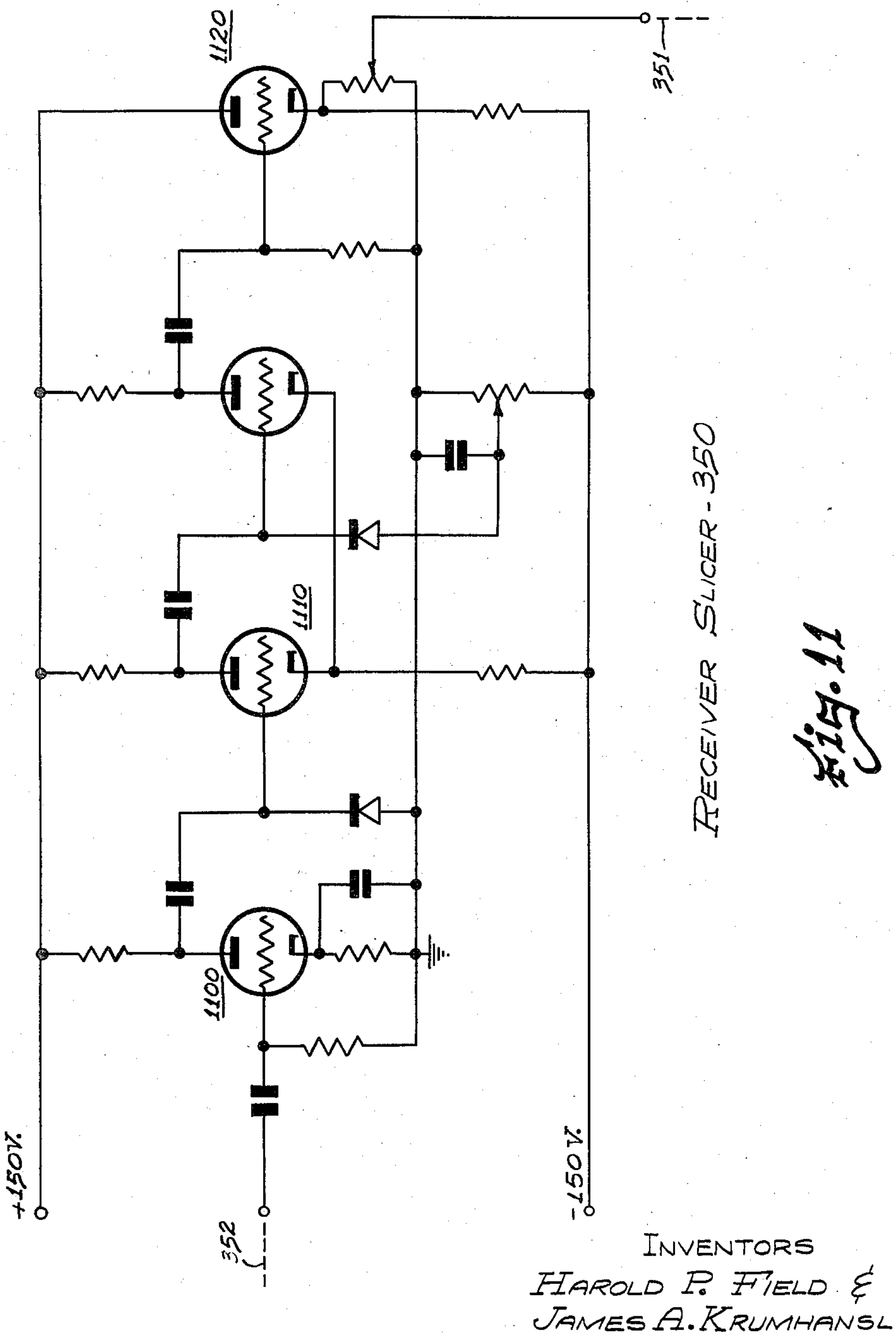

As discussed generally in connection with the general description of the system, the receiver slicer 350 which is shown in detail in Fig. 11 of the drawing performs the function of amplifying and shaping the pulse multiplex wave train which is received by the microwave receiver 355 at the local station 40 so that this wave train is suitable for driving the individual demultiplexer units of this station. More specifically, this receiver slicer includes an amplifier stage 1100, a regenerative slicing circuit 1110 and a cathode follower output stage 1120. The transmitted width modulated pulses which are received and detected by the microwave receiver 355, are supplied over the conductor 352 to the amplifier stage 1100, wherein they are further amplified and supplied to the regenerative slicing circuit 1110. The regenerative slicing circuit 1110 is substantially identical to the regenerative circuit 710 described in detail in connection with the master timing circuit 360 and selects a horizontal slice through the center of the received pulse wave train. The regenerative slicing circuit 1110 eliminates noise disturbances which may appear on the top and bottom of the width modulated pulses and also shortens the rise time of these pulses. By shortening the rise time of these width modulated pulses, the noise on the leading and trailing edges of these pulses is reduced to a relatively low value. The output from the regenerative slicing circuit 1110 is coupled through the cathode follower 1120 and supplied over the conductor 351 to the demultiplexer and pulse width demodulator units of the channels A to H, inclusive.

*Demultiplexer and pulse width demodulator 230*

Figure 12:
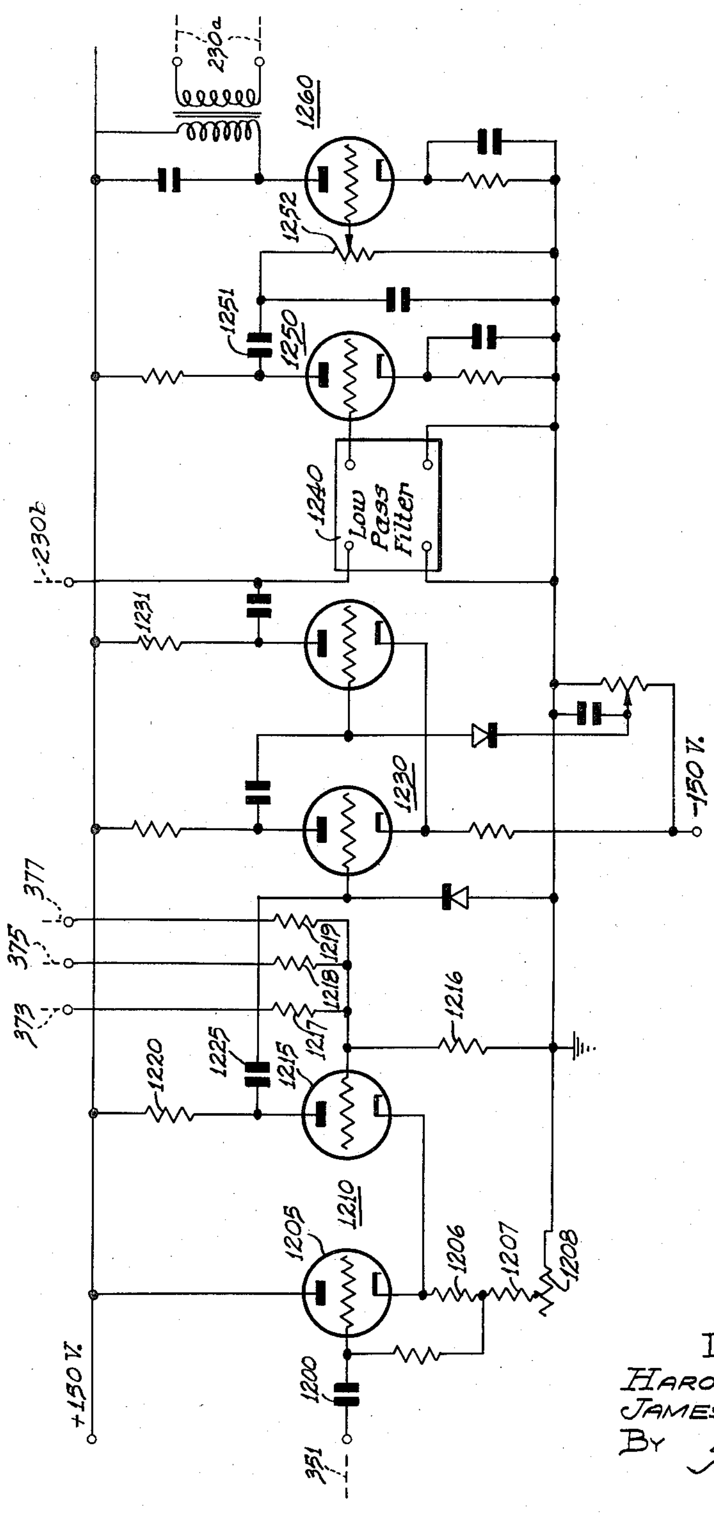

As discussed generally in connection with the general description of the system, the demultiplexer and pulse width demodulator 230, which is shown in detail in Fig. 12 of the drawings, performs the functions of separating the width modulated pulses which occur in the predetermined incoming pulse time position assigned to channel A from the remaining width modulated pulses of the system, and of demodulating the separated pulse to obtain the original message information. More specifically, the demultiplexer and pulse width demodulator 230 includes a demultiplexing stage 1210, a regenerative slicing circuit 1230, a low pass filter circuit 1240 and a pair of cascaded audio amplifier stages 1250 and 1260.

The received width modulated pulses which are transmitted through the receiver slicer 350 in the manner described above, are supplied over the conductor 351 and through the condenser 1200 to the demultiplexing stage 1210. The demultiplexing stage 1210 is similar in many respects to the gating and modulating stage 940 described in detail in connection with the pulse width modulator and multiplexer 220. Thus, the demultiplexing stage 1210 includes a gating tube 1215, the control grid of which is connected through the common resistor 1216 to ground, and the square waves produced on the conductors 373, 375, and 377 are respectively connected through the resistors 1217, 1218, and 1219 to the control grid of the tube 1215. The square waves are thus resistance mixed at the grid of the tube 1215, and, when all of these waves add simultaneously they produce a composite wave of sufficient amplitude to cause conduction of the tube 1215. The pulse multiplex wave train, including width modulated pulses from all of the signal channels, is presented to the control grid of a demodulator tube 1205 and is repeated across the cathode resistors 1206, 1207, and the potentiometer 1208 thereof. However, the cathode of the tube 1215 is connected to the cathode of the tube 1205 and a sufficient D. C. potential is produced across the resistors 1206 and 1207 and the potentiometer 1208 to prevent the tube 1215 from conducting except during periods when all of the gating waves supplied thereto coincide, which condition occurs only during the particular incoming pulse time position which is assigned to channel A. Accordingly, only the width modulated pulses appearing in this time position are gated by the tube 1215 and appear across the anode resistor 1220 thereof.

While the mixing tube 1215 removes the greater portion of the width modulated pulses which do not occur in the selected pulse time position, it is necessary to provide further selecting means in order to insure adequate interchannel separation. Accordingly, the selected width modulated pulses which occur during the pulse time position assigned to channel A, are coupled through the condenser 1225 to a regenerative slicing circuit 1230. The slicing circuit 1230 is substantially identical to the regenerative circuit 710 described in detail in connection with the master timing circuit 360 and selects a horizontal slice through the middle of the selected width modulated pulse so that portions of any other width modulated pulses which may be passed by the tube 1215, are removed. There is thus produced across the output resistor 1231 of the regenerative slicing circuit 1230, only the separated width modulated pulses which occur in the desired incoming pulse time position of channel A.

The separated width modulated pulses are demodulated by means of the low pass inductance-capacitance filter 1240 which preferably has an upper frequency limit of 3 kilocycles. The output of the filter 1240 is amplified in the audio amplifier stage 1250 and supplied through the condenser 1251 and the gain control potentiometer 1252 to the amplifier output stage 1260. The amplifier stage 1260 includes an output transformer 1261 suitable for matching the tube 1260 to the telephone line impedance. Accordingly, the audio frequency message signals which are demodulated in the filter 1240 and amplified in the amplifier stages 1250 and 1260, are supplied over the cable **230*a* through the hybrid coil circuit 210 and through the supervisory relay circuits 200 to the trunk circuit 11**.

*Synchronizing pulse generator 385*

Figures 13, 13A:
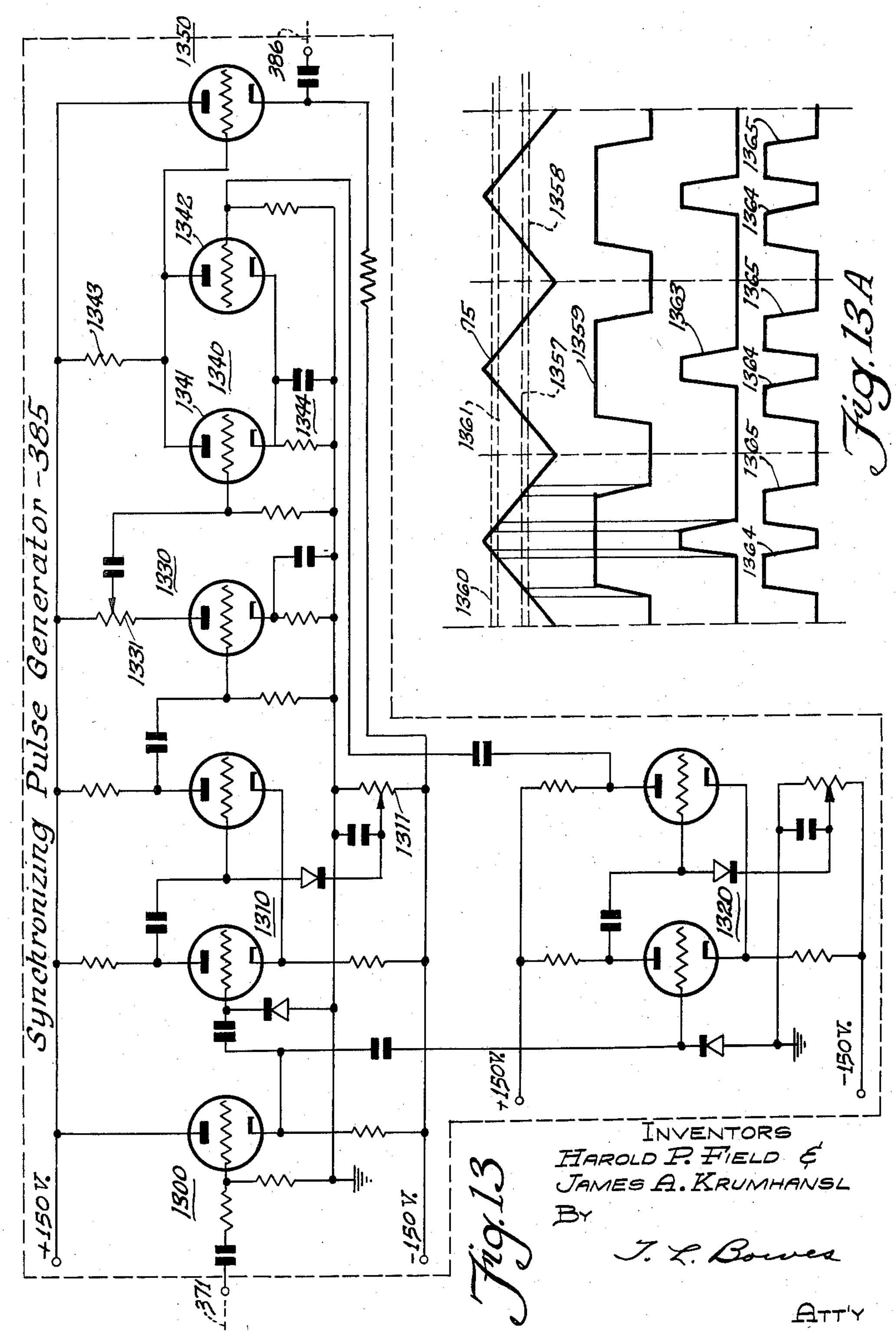

As discussed generally in connection with the general description of the system, the synchronizing pulse generator 385, which is shown in detail in Fig. 13 of the drawings, performs the function of generating a unique synchronizing signal under the control of the triangular modulation wave 75 transmitted thereto from the switching wave form generator 370 over the conductor 371, the synchronizing signal output of the generator 385 being transmitted to the synchronizing pulse modulator and multiplexer 380 over the conductor 386. More specifically, the synchronizing pulse generator 385 includes a cathode follower stage 1300, a first regenerative slicing circuit 1310, a second regenerative slicing circuit 1320, an inverter stage 1330, a pulse mixing circuit 1340 and a cathode follower output stage 1350.

The triangular wave 75 produced by the switching wave form generator 370 is supplied over the conductor 371 to the cathode follower stage 1300 and is repeated through this stage to the input circuits of both of the slicing circuits 1310 and 1320. Each of the slicing circuits 1310 and 1320 is substantially identical to the regenerative circuit 710 described in detail in connection with the master timing circuit 360. However, the slicing circuits 1310 and 1320 are so adjusted as to select a horizontal slice through different portions of the triangular shaped wave 75 thereby producing in the output circuits thereof square waves having different time durations which are dependent upon the clipping or slicing levels of the circuits 1310 and 1320. More particularly, the setting for the control grid potentiometer 1311 of the circuit 1310 is adjusted so that this circuit selects a slice through the lower half portion of the triangular wave 75 to produce a square wave having a time duration which is greater than one-half of the total time duration of one cycle of the timing wave. The setting of the control grid potentiometer 1321 of the slicing circuit 1320 is adjusted so that the circuit 1320 takes a slice through the upper half portion of the wave 75 so as to produce in the output of the slicing circuit 1320 a square wave having a time duration which is somewhat less than one-half the total time duration of one cycle of the timing wave 75. The output square wave from the slicing circuit 1310 is inverted in the phase inverter stage 1330 and repeated across the anode load potentiometer 1331 thereof. A variable portion of the voltage appearing across the potentiometer 1331 is supplied to the control grid of one tube 1341 of the mixer stage 1340. The square wave produced by the slicing circuit 1320 is supplied to the control grid of the other mixing tube 1342 of the mixing stage 1340 and the outputs from the tubes 1341 and 1342 are combined in the common anode load resistor 1343. A bias potential for the tubes 1341 and 1342 is provided by the common cathode bias network indicated generally at 1344.

In the mixing circuit 1340 the oppositely polarized square waves from the slicing circuits 1310 and 1320 are combined to provide a composite synchronizing signal which consists of successive groups of two synchronizing pulses of equal duration which are separated by an interval of the same duration, both of the pulses of each group occurring within the interval of one pulse time position in the multiplex system. The composite synchronizing signal described above is repeated through the cathode follower stage 1350 and over the conductor 386 to the synchronizing pulse modulator and multiplexer 380 which latter unit selects only those synchronizing pulses which occur during the pulse time position set aside for the transmission of synchronizing information, namely, the pulse time positions assigned to channel H during the alternate pulse frames which are not used by this channel.

In order more clearly to visualize the above-described operation of the synchronizing signal generator 385, there is shown in Fig. 13A certain of the wave forms which are produced in the generator 385. Referring to this figure, the triangular wave 75 which is supplied over the conductor 371 to the synchronizing signal generator 385 is shown on a larger scale and this wave is supplied to both of the slicing circuits 1310 and 1320. The slicing circuit 1320 establishes the upper clipping level, indicated by the dotted line 1360, and the lower clipping level, indicated by the dotted line 1361, to provide in the output circuit thereof a square wave having a time duration equal to the width of the triangular wave 75 along the horizontal section established by the levels 1360 and 1361. The output from the slicing circuit 1320 comprises the square wave 1363 (Fig. 13A), which is inverted in the mixer tube 1342 and appears across the anode resistor 1343 thereof as a square wave of the opposite polarity.

Figure 5:
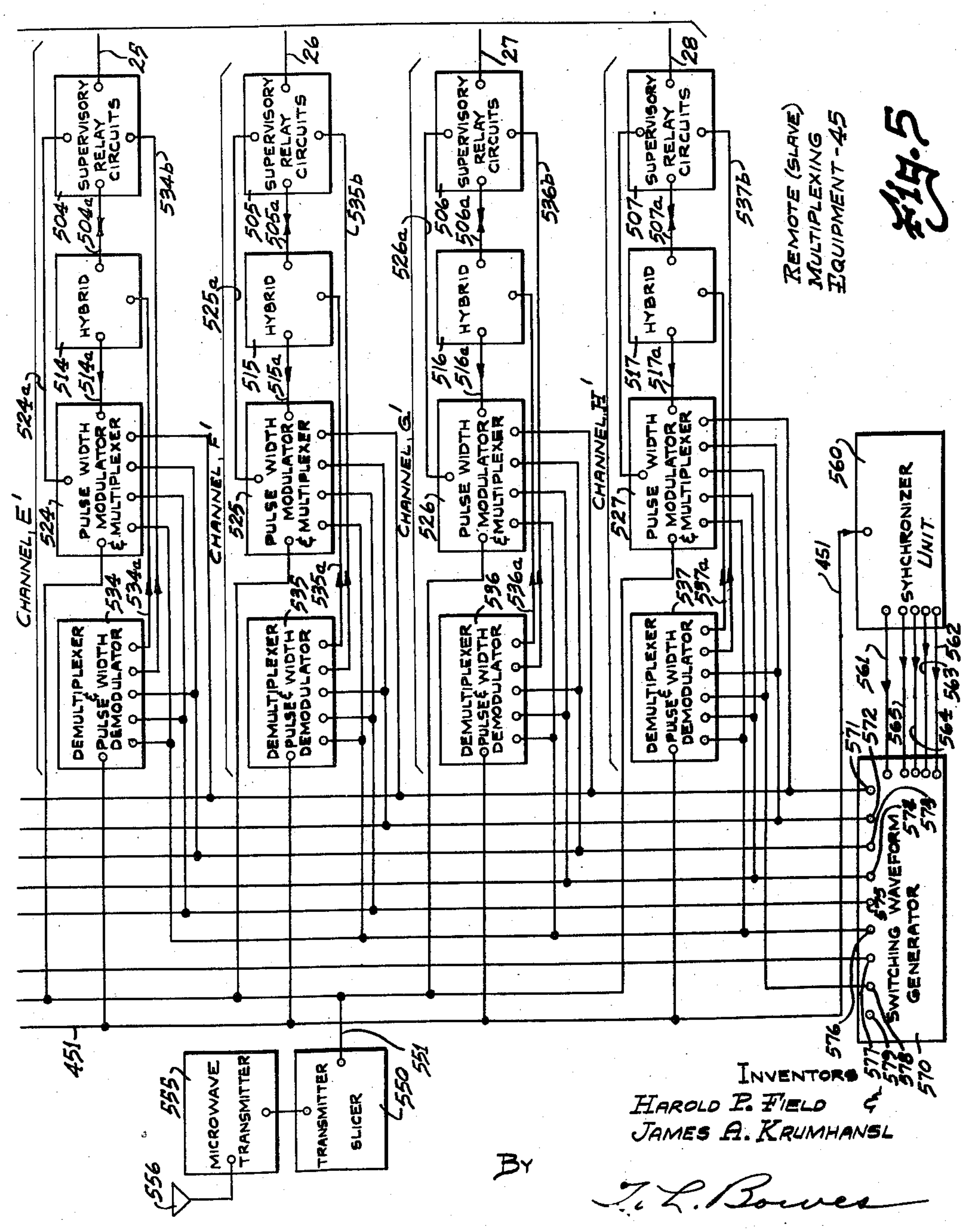

The slicing circuit 1310 establishes an upper clipping level indicated by the dotted line 1357 and a lower clipping level indicated by the dotted line 1358 to provide in the output circuit thereof a square wave having a time duration equal to the width of the horizontal section of the triangular wave 75 between the levels 1357 and 1358. The output from the slicing circuit 1310 comprises the square wave 1359 (Fig. 13A), which is inverted in the stage 1330 so as to appear across the anode resistor 1331 thereof as a square wave of the opposite polarity. This square wave is again inverted in the mixer tube 1341 and added to the square wave 1363 in the common anode resistor 1343 thereof so as to provide the positive pairs of synchronizing pulses 1364 and 1365 shown in Fig. 13A. It will be noted that the duration and separation of the synchronizing pulses 1364 and 1365 may be controlled by varying the clipping levels established by the clipping circuits 1310 and 1320. Preferably these clipping levels are so chosen that the interval between the leading edges of the pulses 1364 and the paired pulses 1365 is less than one-half of the time duration of the triangular wave 1365. Accordingly, the separation between the leading edges of the synchronizing pulse pairs 1364 and 1365 is less than the separation between the leading edges of any of the remaining signal modulated pulses in the composite wave train. The composite synchronizing signal shown in Fig. 13A is supplied over the conductor 386 to the synchronizing pulse modulator and multiplexer 380 which functions to select only those pairs of synchronizing pulses which occur during alternate pulse frames in the pulse time position assigned to channel H. The selected synchronizing pulses, which are of constant width and appear during the above-described pulse time positions, are transmitted over the conductor 251 to the transmitter slicer 250 and from the unit 250 to the transmitter 255. After transmission to the receiver 455 at the remote station 45, the synchronizing pulses are transmitted through the receiver slicer 450 and over the conductor 451 to the synchronizer unit 560 (Fig. 5). In this connection it will be noted that no time constants are involved in setting up the clipping levels with the result that the synchronizing pulses are extremely stable. Also, these pulses are automatically centered and are symmetrical about the center of the synchronizing pulse time position.

*Synchronizer unit 560*

Figure 14:
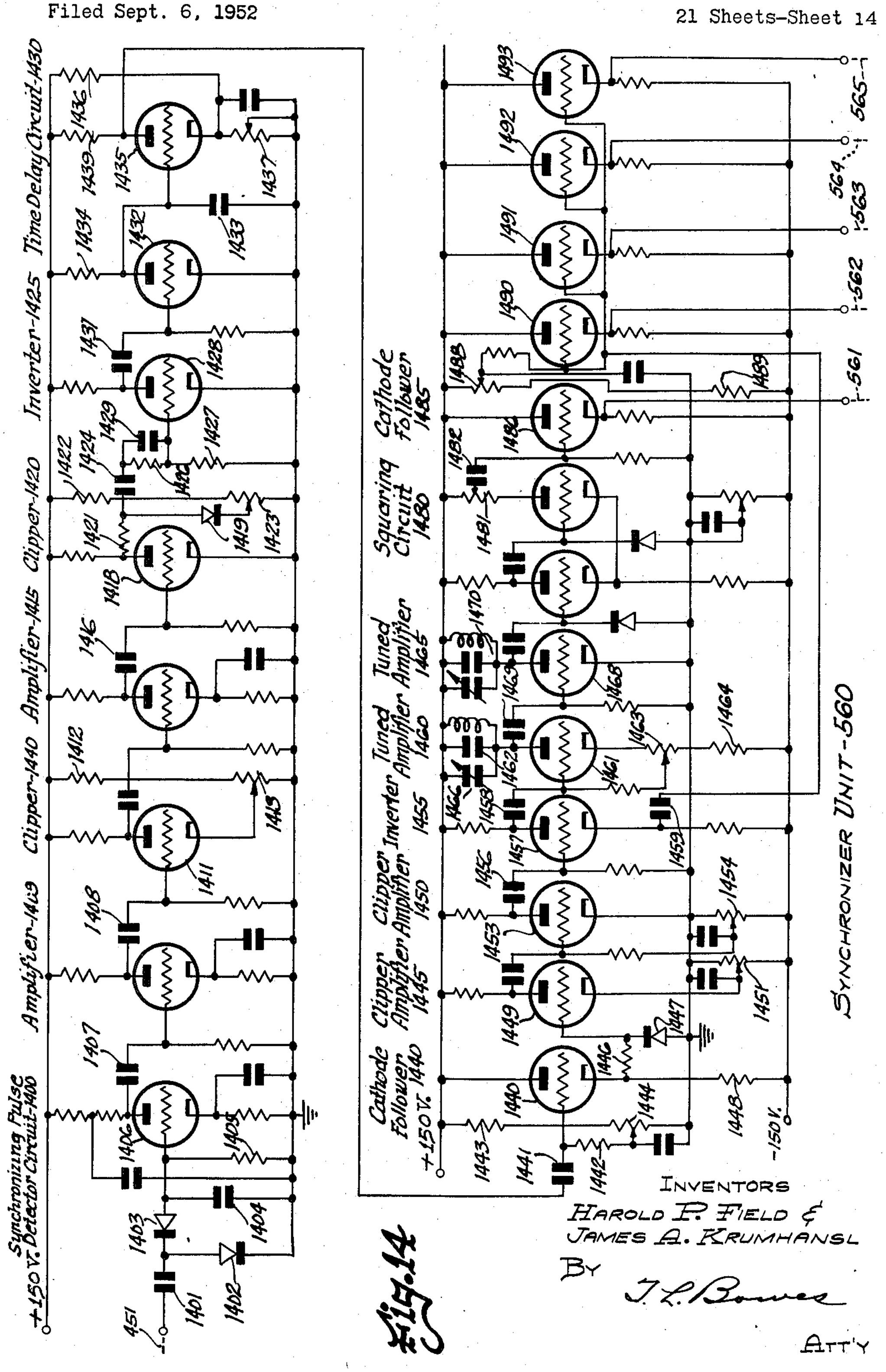

As discussed generally in connection with the general description of the system, the synchronizer unit 560, which is shown in detail in Fig. 14 of the drawings, is located at the remote station 45 and provides a timing square wave similar to the square wave 51 (Fig. 17B) and negative phasing pulses of short duration which have a frequency which is one-sixteenth that of the timing wave 51, these wave forms being supplied to the switching wave form generator 570 to control this generator in a manner similar to the control of the switching wave form generator 370 by the master timing circuit 360. More specifically, the synchronizer unit 560 includes a synchronizing pulse detector circuit indicated generally at 1400, an amplifier stage 1409, a pulse clipping stage 1410, a pulse amplifier stage 1415, a second pulse clipping stage 1420, a phase inverter and attenuator stage 1425, a time delay circuit indicated generally at 1430, a cathode follower clipping stage 1440, first and second amplifier and clipping stages 1445 and 1450, a phase inverter stage 1455, a first tuned amplifier stage 1460, a second tuned amplifier stage 1465, a slicing circuit 1480, a cathode follower stage 1485, and a plurality of cathode follower output tubes 1490, 1491, 1492 and 1493.

The synchronizing pulse detector circuit 1400 comprises a coupling condenser 1401, a first crystal rectifier 1402, a second crystal rectifier 1403, a second condenser 1404, and a resistor 1405. The condenser 1401 is of relatively small value so that the pulses of the incoming pulse multiplex wave train are differentiated to produce a positive pulse coincide with the leading edge of each pulse of the incoming pulse wave train and a negative pulse coincide with the trailing edge of each such pulse. The anode of the rectifier 1402 is connected to ground so that this rectifier conducts during the negative differentiated pulses of the pulse wave train and prevents these portions of the signal from being transmitted through the detector circuit 1400. However, during the positive differentiated pulse portions of the signal, the rectifier 1402 is non-conductive and the rectifier 1403 is conductive so that the condensers 1401 and 1404 are charged in series in proportion to the relative capacitance values thereof. Following each positive differentiated pulse the rectifier 1402 conducts due to the charge on the condenser 1402 to discharge this condenser back to ground potential. During these periods the rectifier 1403 is not conductive and, hence, the condenser 1404 cannot discharge through the rectifier 1403. However, the resistor 1405 provides a relatively high resistance discharge path for the condenser 1404 so that this condenser discharges gradually according to the time constant of the condenser 1404 and the resistor 1405.

As discussed heretofore in connection with the synchronizing pulse generator 385, the synchronizing signal comprises the positive pulse pair 1364 and 1365 (Fig. 13A) which are separated by a relatively small interval such that the interval between the leading edges of these pulses is less than the interval between the leading or trailing edges of any other of the pulses produced in the multiplex pulse wave train. The time constant of the condenser 1404 and the resistor 1405 is so chosen that the condenser 1404 is substantially discharged between each of the successive signal bearing width modulated pulses so that in the absence of a synchronizing signal, the voltage across the condenser 1404 is maintained at a relatively low level.

However, during the synchronizing pulse pair intervals the condenser 1404 is not completely discharged after the first synchronizing pulse 1364 so that the second synchronizing pulse 1365 is raised in amplitude and produces a spike or peak which rises above the general amplitude level of the voltage across the condenser 1404. The second synchronizing pulse 1365 may then be separated on an amplitude basis from the other pulses of the wave train to provide a synchronizing pulse which is suitable for controlling the operation of the switching wave form generator 570 of the remote multiplexing equipment 45. In this connection it will be understood that the condenser 1404 discharges during the succeeding pulse time position intervals after the synchronizing pulses so as to return to a substantially discharged condition between each synchronizing interval. It will further be understood that the interval between successive leading or the successive trailing edges of any two adjacent pulses of the wave train is sufficiently great to produce a substantially complete discharge of the condenser 1404 with the result that no pulse other than the second synchronizing pulse 1365 is elevated in amplitude sufficiently by the synchronizing pulse detector circuit 1400 to exceed the clipping level.

Inasmuch as the output from the pulse detector circuit 1400 is of relatively small amplitude, it is necessary to amplify the detected synchronizing pulse, i. e., the second synchronizing pulse 1365 of the transmitted synchronizing signal before a complete separation may be achieved. Accordingly, the output wave from the synchronizing pulse detector circuit, i. e., the voltage produced across the condenser 1404, is amplified in a first amplifier tube 1406 and coupled through the condenser 1407 to a second amplifier stage 1409 wherein this pulse is further amplified and coupled through the condenser 1408 to a clipper stage 1410. The clipper stage 1410 comprises the tube 1411, the cathode of which is biased positively by means of the network including the resistor 1412 and the potentiometer 1413 which are connected in series from the positive source of anode potential to ground, the cathode of the tube 1411 being connected to the arm of the potentiometer 1413. By adjustment of the arm of the potentiometer 1413 the tube 1411 is made normally non-conductive and is insensitive to signals of negative polarity which may be applied to the control grid thereof. However, the positive spike, which is produced by the second synchronizing pulse 1365 in the detector circuit 1400 in the manner described above and which extends above the peak amplitude level of the other differentiated pulses of the wave train, raises the control grid potential of the tube 1411 by an amount sufficient to cause conduction thereof and there is produced in the anode circuit of the tube 1411 a negative pulse corresponding to the second synchronizing pulse of the detected synchronizing signal. The negative pulse produced in the anode circuit of the tube 1411 comprises a detected synchronizing pulse which occurs once during every other pulse frame and which is suitable for synchronizing the switching wave form generator 570. However, in order further to separate the detected synchronizing pulse from any extraneous signals or noise impulses which may be transmitted through the portion of the system described thus far, the detected synchronizing pulse is further amplified in the amplifier stage 1415 and is coupled through the condenser 1416 to a second clipper stage 1420. The clipper stage 1420 comprises the tube 1418, the cathode of which is connected to ground and the control grid of which is operated at a slightly negative potential as determined by the charge on the coupling condenser 1416. In the anode circuit of the tube 1418 the undesired portions of the pulse wave train are further attenuated by means of a crystal rectifier 1419, the cathode of which is connected through the resistor 1421 to the anode of the tube 1418, and the anode of which is connected to a point on a voltage divider network comprising the resistor 1422 and the potentiometer 1423, the anode of the rectifier 1419 being connected to the arm of the potentiometer 1423. The detected synchronizing pulse which appears as a negative pulse at the anode of the tube 1418 lowers the anode potential of the rectifier 1419 so that this rectifier is non-conductive and the detective synchronizing pulse is transmitted without change through the condenser 1424 to the following inverter stage 1425. However, pulses of the opposite polarity which appear at the anode of the tube 1418 are removed by conduction of the rectifier 1419 which connects the anode circuit of the tube 1418 to the low impedance bleeder network 1422, 1423.

In order to invert the detected synchronizing pulse without distortion thereof this pulse is attenuated in the input circuit of the inverter stage 1425. More particularly, there is provided a voltage divider network including the resistors 1426 and 1427 which are connected from one side of the coupling condenser 1424 to ground. The control grid of the inverter tube 1428 is connected to the junction point of the resistors 1426 and 1427 and a condenser 1429 is connected across the resistor 1426 to transmit the high frequency components of the synchronizing pulse to the control grid of the tube 1428. The amplitude of the synchronizing pulse is thus decreased in the ratio of the values of the resistors 1426 and 1427 and the attenuated synchronizing pulse is inverted in the tube 1428 so as to appear as a positive pulse in the anode circuit thereof.

The positive synchronizing pulse produced in the anode circuit of the tube 1428 is coupled through the condenser 1431 to the time delay circuit 1430. More specifically, the positive synchronizing pulse is supplied to the discharge tube 1432 of the circuit 1430, which tube is connected across a charging condenser 1433, this condenser being connected through the charging resistor 1434 to the B+ supply. The control grid of a time delay control tube 1435 is connected to the ungrounded side of the condenser 1433 and the cathode of the tube 1435 is biased positively by means of the bleeder network including the resistor 1436 and the potentiometer 1437 which are connected between the positive supply potential and ground, the cathode of the tube 1435 being connected to the junction point of the resistor 1436 and the potentiometer 1437. A by-pass condenser 1438 is connected across the potentiometer 1437 to prevent short time fluctuations in the cathode potential of the tube 1435.

Before a synchronizing pulse is impressed upon the control grid of the discharge tube 1432, the anode of the tube 1432 is held at the cathode potential of the control tube 1435 due to the fact that the control grid-cathode portion of the tube 1435 acts as a diode rectifier to clamp the anode of the tube 1432 to the positive cathode potential established by the divider network 1436, 1437. At this time the condenser 1433 is charged to the cathode potential of the tube 1435. When the next positive synchronizing pulse is impressed upon the control grid of the discharge tube 1432 this tube conducts and the condenser 1433 is rapidly discharged through the tube 1432 for the duration of the synchronizing pulse. When the pulse ends the condenser 1433 is charged gradually towards the potential of the B+ supply through the resistor 1434, the discharge tube 1432 now being cut off due to the bias potential developed across the coupling condenser 1431 thereof. The control tube 1435 is cut off as soon as the synchronizing pulse is impressed upon the discharge tube 1432 and the potential across the condenser 1433 is decreased, and this tube remains cut off until the condenser 1433 is charged positively by an amount sufficient to cause the tube 1435 again to conduct. When the tube 1435 again conducts, anode current flows through the anode resistor 1439 thereof so as to decrease the anode potential of the tube 1435. The output wave form thus produced at the anode of the tube 1435 comprises a positive pulse, the leading edge of which occurs coincident with the leading edge of the synchronizing pulse which is impressed upon the control grid of the discharge tube 1432, and the trailing edge of which occurs at the instant when the control tube 1435 is again rendered conductive in the manner described above. The pulse interval may be varied by adjustment of the potentiometer 1437 so that a variable time delay is provided between the leading edge of the detected synchronizing pulse and the trailing edge of the time delay output pulse.

From the previous description of the local multiplexing equipment 40 it will be recalled that the master timing circuit 360 provides the timing square wave 51 (Fig. 17B) which is supplied to the switching wave form generator 370 to establish eight successive pulse time positions in repetitive pulse time position frames. Output pulses which are width modulated in accordance with the desired message signal are produced in each of the pulse time positions and transmitted over the microwave link 35 to the remote equipment 45. In order to use identical switching wave form generators at both the master and remote stations of the multiplexing equipment it is necessary to produce at the remote station 45 a variable frequency square wave corresponding to the timing wave 51, this variable frequency square wave being supplied to the switching wave form generator 570 to establish at the remote station repetitive pulse time position frames which are in synchronism with the pulse frames at the local station. Accordingly, the detected synchronizing pulse produced in the synchronizer unit 560 is used to control the tuned amplifier stages 1460 and 1465 which are shock excited into oscillation at the natural resonant frequency thereof, which may be varied from 80 to 90 kilocycles, and the shock excited oscillations are converted into a square wave of the same frequency. In this connection it will be recalled that the detected synchronizing pulse occurs only once during alternate pulse time position frames and during the pulse time position assigned to channel H. Therefore, the tuned amplifier stages 1460 and 1465 receive synchronizing information only once during sixteen oscillatory cycles thereof. Due to delays in the tuned amplifier stages 1460 and 1465 the final square wave produced therefrom is delayed relative to the detected synchronizing pulse and hence is not in the correct time phase relationship with respect to the pulse time positions of the width modulated pulses which are received at the remote multiplexing equipment 45. However, the tuned amplifier stages 1460 and 1465 are controlled by the trailing edge of the positive time delay pulse produced by the time delay circuit 1430 in the manner described above so that an additional time delay is provided which is sufficient to produce time phase coincidence between the timing square wave of the synchronizer unit 560 and the pulse time positions of the width modulated pulses which are received at the remote station 45. In this connection it will be understood that the time delay interval produced by the circuit 1430 may be varied by adjusting the potentiometer 1437. However, the time delay interval remains fixed once the delay in the tuned amplifier stages 1460 and 1465 and other components of the unit 560 is determined so that repeated adjustment of the time delay circuit 1430 is unnecessary.

In order to control the tuned amplifiers 1460 and 1465 synchronously with the trailing edge of the positive time delay pulse produced at the anode of the tube 1435, in the manner described above, this pulse is differentiated in the circuit including the condenser 1441 and the resistor 1442, and the differentiated time delay pulse is coupled through the cathode follower 1440 to a clipper-amplifier stage 1445. The control grid of the cathode follower 1440 is biased positively by means of the bleeder network including the resistor 1443 and the potentiometer 1444, and the cathode of the tube 1440 is connected through the resistor 1446 to the anode of a crystal rectifier 1447, the cathode of the rectifier 1447 being connected to ground. The cathode of the tube 1440 is also connected through a resistor 1448 to the negative supply potential. The potential of the control grid of the tube 1440 is adjusted so that the cathode of this tube is operated just slightly above ground potential whereby the rectifier 1447 is normally conductive and prevents the transmission of the positive or leading edge portion of the differentiated time delay pulse to the control grid of the clipper amplifier tube 1449. The potential of the cathode of the tube 1449 may be varied by adjustment of the potentiometer 1451, this potential being so adjusted that the tube 1449 is normally operated at substantially zero bias.

During the positive or leading edge portion of the differentiated delay pulse the rectifier 1447 is conducting and hence short circuits the input circuit of the tube 1449. Furthermore, any positive increase in the control grid of the tube 1449 is prevented by adjustment of the cathode potential of this tube so that the tube is normally fully conductive and the control grid-cathode portion thereof acts as a clamping rectifier to prevent the control grid of the tube 1449 from becoming more positive. However, during the negative or trailing edge portion of the differentiated delay pulse the rectifier 1447 is rendered non-conductive so as to open the grid circuit of the tube 1449 and permit the transmission thereto of the negative differentiated pulse, this pulse appearing as a positive pulse in the anode circuit of the tube 1449.

The leading edge portion of the time delay pulse is further attenuated in a second clipper amplifier stage 1450 including the amplifier tube 1453. The tube 1453 is biased negatively by means of the potentiometer 1454 in the grid circuit thereof so that only the positive pulse which appears in the anode circuit of the tube 1449 is repeated through the tube 1453 and coupled through the condenser 1456 to the phase inverter stage 1455. The phase inverter stage 1455 includes the tube 1457, which provides both a positive pulse at the anode thereof and a negative pulse at the cathode thereof corresponding to the trailing edge portion of the time delay pulse.

The positive control pulse appearing at the anode of the tube 1457 is coupled through the condenser 1458 to the tuned amplifier stage 1460. The amplifier 1460 includes an amplifier tube 1461 having a parallel resonant circuit indicated generally at 1462 in the anode circuit thereof and having the cathode thereof connected to the negative supply potential through the potentiometer 1463 and the resistor 1464. The control grid of the tube 1461 is connected to the arm of the potentiometer 1463. The control grid potential of the tube 1461 is adjusted by a variation of the potentiometer 1463 so that the tube 1461 is normally nonconductive. When the positive pulse from the inverter 1455 is impressed upon the control grid of the tube 1461, a pulse of anode current flows through the inductive branch of the resonant circuit 1462 which shock excites the tuned circuit 1462 into oscillation at the natural resonant frequency thereof. In the illustrated embodiment, the resonant frequency of the circuit 1462 may be adjusted from 80 kilocycles per second to 90 kilocycles per second by any suitable means such as the variable condenser 1466. The circuit 1462 provides a sinusoidal wave train the amplitude of which decreases with successive cycles due to internal losses in the resonant circuit 1462. In this connection it will be understood that the oscillatory wave train which is produced across the circuit 1462 starts coincidentally with the leading edge of the positive control pulse which is derived from the trailing edge of the time delay pulse produced by the circuit 1430 and is impressed upon the control grid to the tube 1461.

In order to provide a uniform amplitude of oscillations for the intervals between the detected synchronizing pulses, a second tuned amplifier stage 1465 is provided. This stage includes an amplifier tube 1468 which is normally operated at zero bias and the sinusoidal oscillations produced across the circuit 1462 are coupled through the condenser 1469 to the control grid of the tube 1468. A parallel resonant circuit indicated generally at 1470, which has a natural resonant frequency which may be varied from 80 to 90 kilocycles per second, is included in the anode circuit of the tube 1468 and the circuit 1470 is shock excited into oscillation at the natural resonant frequency thereof by means of the oscillatory wave train produced by the tuned amplifier stage 1460. There is thus provided at the anode of the tube 1468 a sinusoidal wave train of substantially constant amplitude which is synchronized with the detected and time delayed synchronizing pulse produced at the anode of the inverter tube 1457.

In order to convert the sinusoidal wave train produced by the tuned amplifier stage 1465 into a square wave of corresponding frequency and phase, there is provided the squaring circuit indicated generally at 1480. The squaring circuit 1480 is substantially identical to the squaring circuit 710 described in detail in connection with the master timing circuit 360 (Fig. 7) and functions to provide a steep sided square wave across the output potentiometer 1481 thereof. A variable amount of this square wave may be selected by adjustment of the potentiometer 1481, which is coupled through the condenser 1482 to the cathode follower stage 1485. The stage 1485 includes a cathode follower output tube 1486, the cathode of which is directly connected over the conductor 561 to the switching wave form generator 570 (Fig. 5). The square wave impressed upon the conductor 561 functions in a manner identical to the master timing wave 51 in controlling the switching units of the switching wave form generator 570.

As discussed previously in connection with the switching wave form generator 370, it is necessary to provide, in addition to the master timing wave 51, a plurality of negative phasing pulses which are applied to the switching circuits of the switching wave form generator to force these circuits to operate in synchronism and to insure that they always operate in the same time phase relationship. In order to provide corresponding negative phasing pulses for the switching circuits of the switching wave form generator 570, the negative delayed control pulses which are produced at the cathode of the inverter tube 1457 in the manner described above are coupled through the condenser 1459 to the control grids of the cathode follower output tubes 1490, 1491, 1492, and 1493. The bias potential on the control grids of the tubes 1490, 1491, 1492, and 1493, is controlled by means of the bleeder network which includes the potentiometer 1488 and the resistor 1489 which are connected in series from the B+ supply to the negative source of potential. The cathodes of the tubes 1490, 1491, 1492, and 1493 are respectively connected to the conductors 562, 563, 564, and 565 and the negative phasing pulses produced on these conductors are supplied to the switching wave form generator 570 wherein they are impressed upon the switching circuits of the generator 570 to force these circuits to operate in a fixed time phase relationship.

SUPERVISORY RELAY CIRCUITS 200 AND HYBRID 210

In order to permit the multiplex system of the present invention to be incorporated in and function as an integral part of a standard telephone system, it is necessary that the multiplex system include means for transmitting all of the telephone supervisory signals through the multiplex system in both directions. The actual requirements placed on the multiplex system to pass supervisory signals of different characteristics may differ with different telephone systems and vary from the relatively simple manual ring-down system to a two-way dialing system with full supervision. Basically, however, the supervisory signals of any type of telephone system may be classified as either audible, sub-audible, or unidirectional signals. The audible signals include such signals as dial tone and busy tone signals. The sub-audible signals may comprise such signals as the conventional 20 cycle or 135 cycle ringing signal. The unidirectional signals may comprise dialing impulses, which are essentially D. C. and disconnect signals which are true unidirectional signals. Any communication system which is capable of transmitting audible, sub-audible, and unidirectional signals simultaneously will meet the requirements of any telephone supervisory system. Inasmuch as both the audible and sub-audible signals are of the same general type, i. e., an alternating current signal, it is evident that any system which can transmit both unidirectional and alternating current signals at the same time will meet all supervisory requirements so long as two-way transmission of the supervision is possible in the case of a fully automatic telephone system. Furthermore, the unidirectional supervisory signal varies only between two fixed levels indicating either an "on" condition or an "off" condition.

From the foregoing description of the pulse width modulator and multiplexer 220 it is evident that the transmission of any one type of supervisory signal is readily accomplished. For example, if an audible supervisory signal such as a dial tone or a busy tone is presented to the multiplexing equipment, the width of the multiplexing pulse is modulated in accordance with the amplitude and frequency of the supervisory signal, limited only by the over-modulation control of the limiting circuit 920 (Fig. 9). In conventional telephone systems the dial tone and busy tone signals are usually of comparable amplitude to the voice signals so that no attenuation of the supervisory signals is necessary.

Similarly, for sub-audible supervisory signals, such as ringing signals, the multiplexing pulse is modulated in width in accordance with the amplitude and frequency of the ringing signal. However, the amplitude of conventional ringing signals is so great that it must be attenuated before presentation to the pulse width modulator and multiplexer 220 to preserve the ringing signal wave shape during transmission. Usually the ringing signal is of relatively low frequency and the transmission of such a signal requires that all circuits which are adapted to pass the ringing signal must have adequate response at its fundamental frequency.

In the system of the present invention, a unidirectional supervisory signal can be used either to modulate the width of the multiplexing pulse directly or to close a relay which will in turn apply a potential from a suitable source to the pulse width modulator and multiplexer to change the width of the pulse.

Inasmuch as the multiplexing system of the present invention provides a single pulse multiplexing channel for the transmission of supervisory sigals as well as voice signals, it is necessary to provide additional facilities in the event that the telephone system requires the simultaneous transmission of a unidirectional supervisory signal and a corresponding voice signal. While it is possible to assign a portion of the modulation range for voice signals and another portion of the modulation range for supervisory signals, such an arrangement does not permit the voice signals alone to make full use of the modulation range with the result that the signal to noise ratio of the voice signals is reduced. Accordingly, it is very desirable to provide a system in which the voice signals make full use of the modulation capabilities of the system while permitting the simultaneous transmission of a unidirectional supervisory signal.

Figure 15:
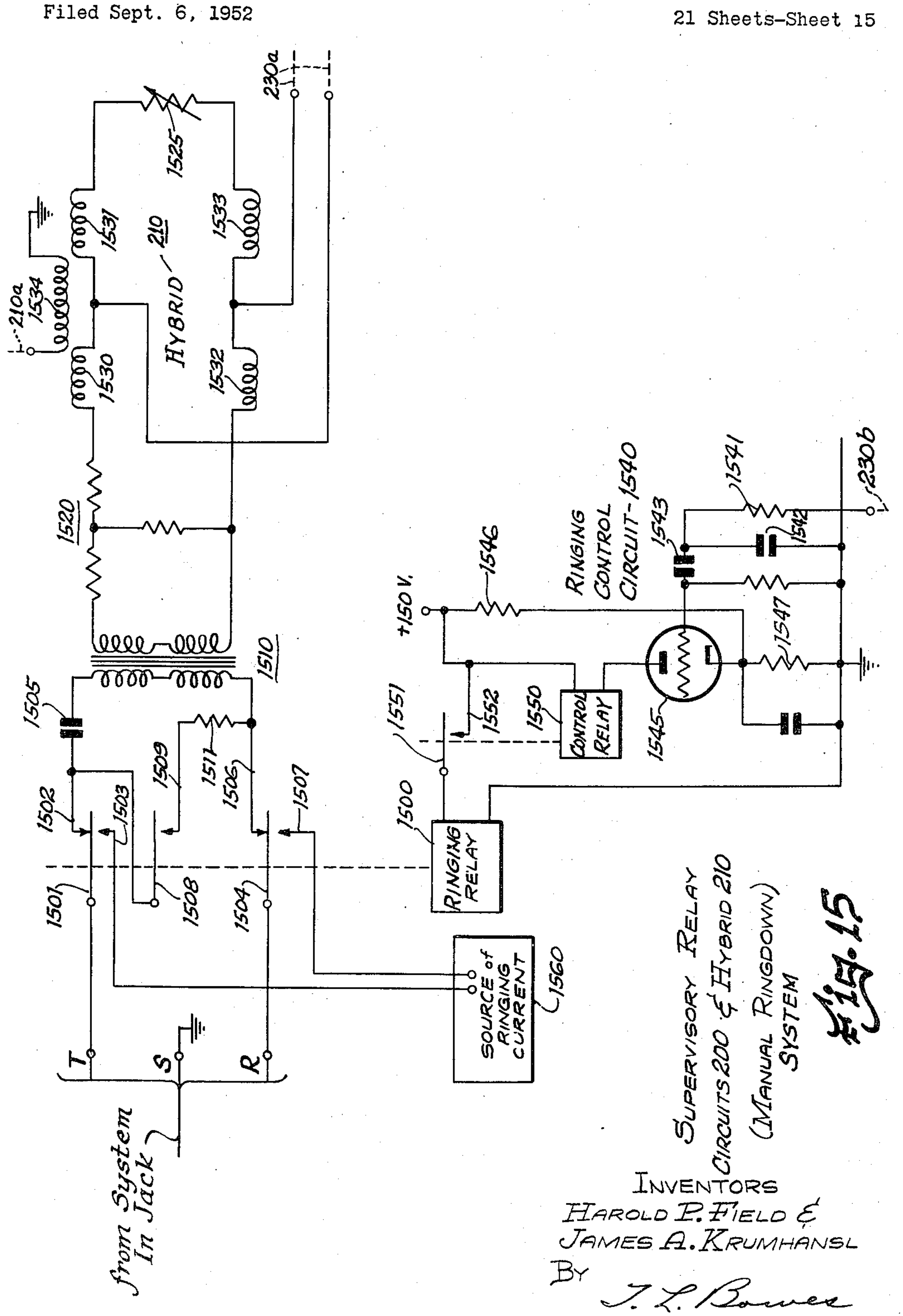

Considering first the supervisory equipment which is necessary to adapt the present multiplex system for operation with a manual ring-down type of telephone system, there is shown in Fig. 15 of the drawings the supervisory relay circuits 200 and hybrid 210 suitable for application to a manual ring-down system. In this connection it will be understood that with manual ringdown supervision either the ringing voltage or the voice signal is present on the line, but at no time are both of these signals simultaneously present on the line. Also, a unidirectional current is never present on the line. Referring now to Fig. 15, when the operator at the local exchange 10 throws the ringing key, the normal 20 cycle or 135 cycle current appears on the trunk circuit 11 and is transmitted through the closed upper contacts 1501, 1502 of the ringing relay 1500 to the condenser 1505 which is connected in series with the primary winding of a conventional channel repeat coil 1510. The impedance of the condenser 1505 at the ringing frequency is so chosen as to attenuate the ringing signal by a substantial amount without altering the wave shape thereof. The ringing signal is then transmitted through the channel repeat coil and through a T-pad or attenuator 1520, which further reduces the ringing signal by a factor of 4 db, from which it is supplied to the hybrid coil 210.

In order to balance the hybrid coil 210 to prevent oscillations from being set up in the associated equipment, there is provided a conventional balancing resistor 1525 which is connected across the ends of the hybrid coil 210. The hybrid coil 210 is entirely conventional and comprises the series connected primary coils 1530, 1531, 1532, and 1533, and the secondary coils 1534. The ringing signal is thus transmitted to the secondary coils 1534 of the hybrid 210 and over the conductor **210*a* to the input circuit of the pulse width modulator and multiplexer 220. In the unit 220 the ringing signal is further attenuated in the filter, including the condenser 901 (Fig. 9) and the potentiometer 902 so that the ringing signal presented to the control grid of the amplifier tube 903 is of the same maximum amplitude as the voice signals presented to this amplifier. The ringing signal is then amplified in the tube 903 and supplied to the mixer tube 932** wherein it functions to modulate the multiplexing pulse in a manner identical to that described above in connection with the transmission of voice signals over the channel A.

An incoming ringing signal modulated multiplexing pulse is separated from the other pulses of the system in the demultiplexer and pulse width demodulator 230 (Fig. 12), and is transmitted over the conductor **230*b* to a ringing control circuit in the supervisory relay circuit 200, indicated generally at 1540 in Fig. 15. More specifically the demultiplexed pulse which is transmitted over the conductor 230*b* and which is width modulated in accordance with the ringing signal, is passed through a low pass filter which includes the series resistor 1541 and the shunt condenser 1542 to separate the ringing signal from signals of other frequencies. The separated ringing signal is then coupled through the condenser 1543 to the control grid of a ringing control tube 1545. The cathode of the tube 1545 is normally biased positively by means of the bleeder network including the resistors 1546 and 1547 which are connected in series from the B+ supply to ground potential, the cathode of the tube 1545 being connected to the junction point of the resistors 1546 and 1547**.

In the anode circuit of the tube 1545 there is provided a sensitive control relay 1550 having a normally open movable contact 1551 and a fixed contact 1552 which is connected to the B+ supply. Normally the tube 1545 is biased by means of the above-described voltage divider network to prevent anode current flow therethrough. However, the detected ringing signal which is impressed upon the control grid of the tube 1545 functions to render this tube conductive and cause a flow of current through the control relay 1550 which closes the contacts 1551 and 1552 and applies energizing potential from the B+ supply to the conventional ringing relay 1500. The relay 1500 is provided with a first movable contact 1501 having an upper fixed contact 1502 and a lower fixed contact 1503 associated therewith, and a second movable contact 1504 having an upper fixed contact 1506 and a lower fixed contact 1507 associated therewith. The contacts 1501, 1502 and the contacts 1504, 1506 are normally closed so that ringing signals present on the line are transmitted to the channel repeat coil 1510 in the manner described above. However, when the ringing control relay 1500 is energized by means of the ringing control circuit 1540, the movable contacts 1501 and 1504 are respectively connected to the fixed contacts 1503 and 1507 so as to supply ringing current from the ringing current source 1560 to the trunk circuit 11 and thence to the ringing facilities of the line associated therewith. The ringing relay 1500 is also provided with a third movable contact 1508 and a fixed contact 1509, which contacts are closed when the relay 1500 is energized so as to connect a 600 ohm load resistor 1511 across the drop side of the repeat coil 1510 during the ringing operation, thereby maintaining the hybrid circuit at constant impedance during the application of ringing current to the trunk circuit 11.

Figure 16A:
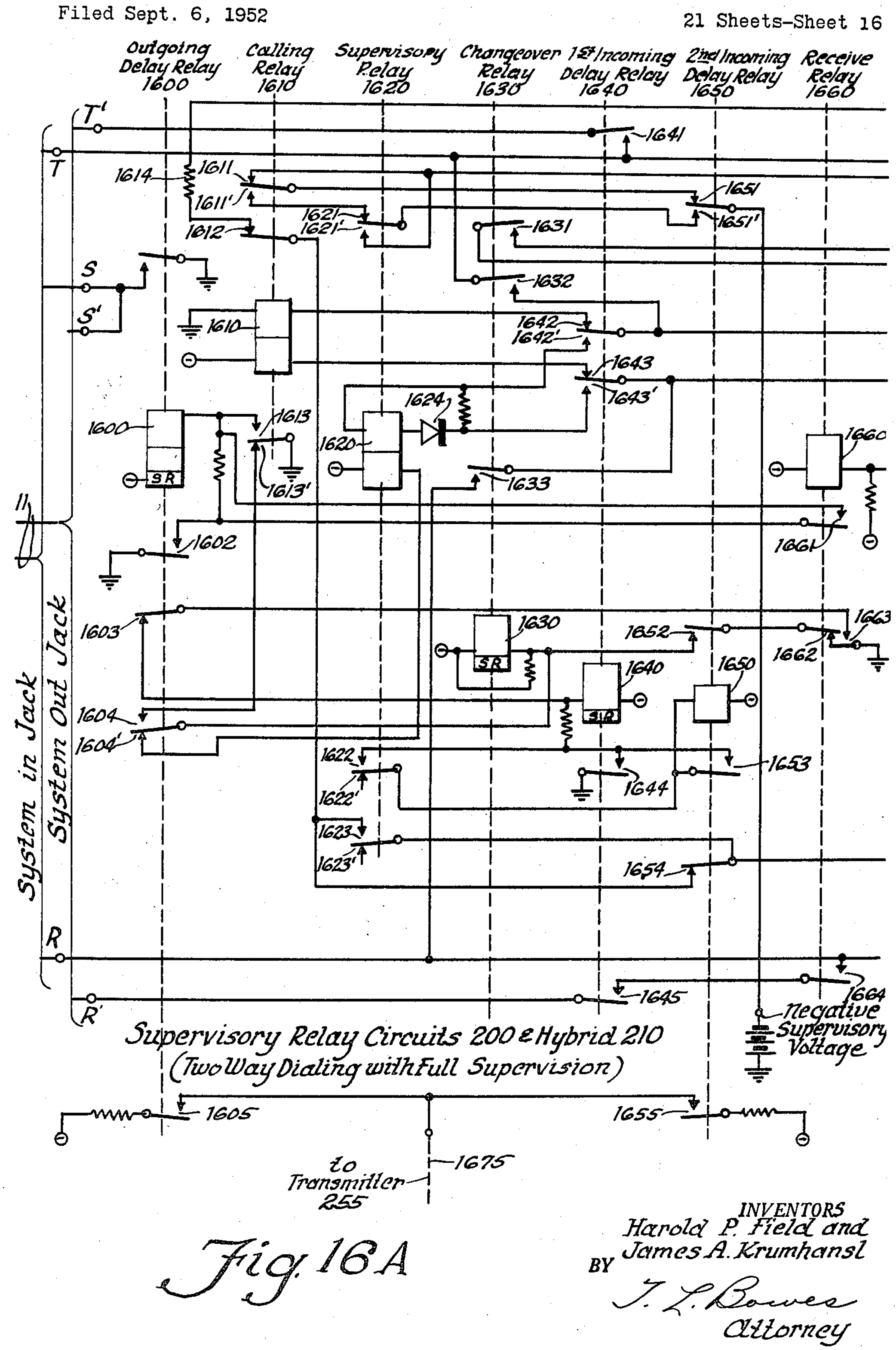
Figure 16B:
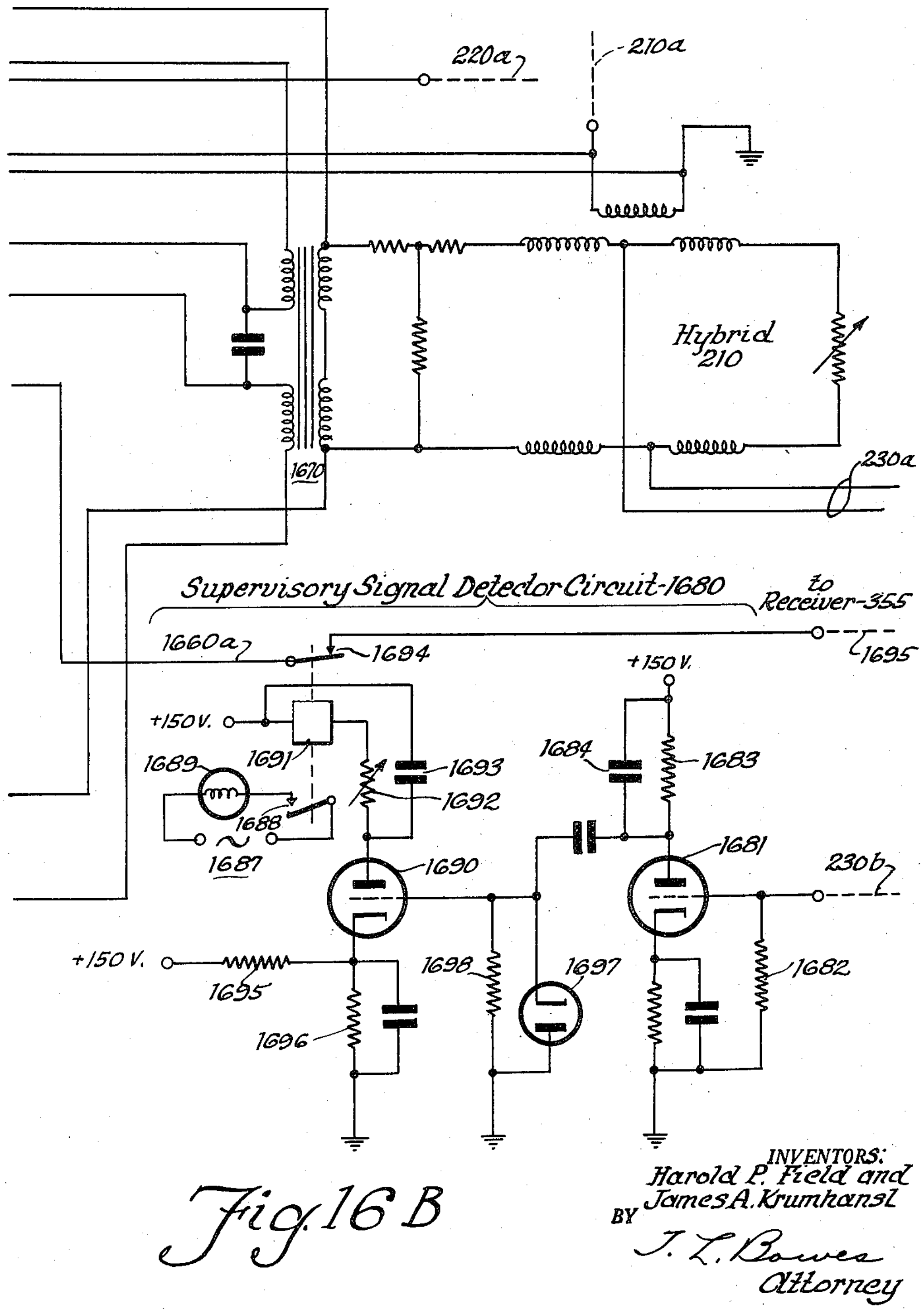

Considering now the more complicated supervisory requirements connected with a two-way dialing toll system with full supervision, there is shown in Figs. 16A and 16B the supervisory relay circuits 200 and hybrid 210 which are suitable for operation with a typical system of this type. In the system illustrated the supervisory requirements include the two-way transmission of D. C., and during the conversation part of the call it is necessary that (*a*) D. C. be present on the originating trunk circuit, and (*b*) no D. C. be present on the answering trunk circuit. It is evident that these requirements specify that the originating terminal, i. e., the local multiplexing equipment 40, must set up a condition at both terminals which will make the average pulse width correspond to the presence of D. C. on the originating circuit and to the absence of D. C. on the answering circuit. In other words, the identical pulse width corresponds to different D. C. conditions at the originating and answering terminals.

Referring now to Figs. 16A and 16B, the supervisory relay circuits 200 have been designed to conform to and operate with the applicable portions of the standard dialing and supervisory signals as proposed for nationwide operator toll dialing. In general, the supervisory relay circuits 200 of Figs. 16A and 16B perform the following functions, the number assigned to the function indicating the sequence of operation:

*Outgoing*:

(1) Transmission of a seizure pulse for seizure of an incoming selector.
(2) Transmission of the dial pulses.
(8) Transmission of a re-ring signal, if necessary, to the called party.
(9) Transmission of a release signal for the release of the incoming selector.

*Incoming*:

(3) Transmission of all trunks busy signal, if necessary, flashing outward operator's lamp at 120 IPM.
(4) Transmission of line busy signal, if necessary, flashing outward operator's lamp at 60 IPM. Transmission also of audible busy tone.
(5) Transmission of the revertive ringing tone for the outward operator.
(6) Transmission of answer supervisory signal extinguishing outward operator's lamp.
(7) Transmission of a disconnect or recall supervisory signal, lighting the outward operator's lamp.

To perform the above-described functions, the supervisory relay circuits include an outgoing delay relay 1600, calling relay 1610, a supervisory relay 1620, a changeover relay 1630, a first incoming delay relay 1640, a second incoming delay relay 1650, a receive relay 1660, and a supervisory signal detector circuit 1680. In this connection it will be understood that the supervisory relay circuits 200 in channel A at the local multiplexing station 40 are identical to the supervisory relay circuits in each of the other channels of the system, including the circuits 400 at the remote station 45. Accordingly, a description of the completion of a call between these stations will be described with reference only to the circuit components shown in Figs. 16A and 16B.

In order to provide for the transmission of information relative to the seizure of an incoming selector at the remote telephone exchange 20 upon an outward call from the selector bank at the local exchange 10, the transmitters 255 and 555 are normally de-energized if no call is being made on any channel of the system. With this arrangement there is no transmission over the microwave link 35 even though the pulse multiplex wave train described above is supplied to the modulator stages of the transmitters 255 and 555. The receivers 355 and 455 are operated continuously so as to receive any signals transmitted from the corresponding microwave transmitter. However, in order to provide an indication of the start of transmission of pulses over the microwave link, these receivers are provided with squelch relay circuits which operate upon the reception of an incoming pulse wave train from the associated transmitter to supply a ground connection to the supervisory signal detector circuit 1680 of each of the signalling channels of the associated station.

When the supervisory relay circuits are idle and no calls are being made on the system, a negative supervisory voltage is connected by way of the contacts 1651 of the second incoming delay relay 1650 and the contacts 1611 of the calling relay 1610 and over the conductor 220*a* to the pulse width modulator and multiplexer 220 shown in detail in Fig. 9. In the unit 220 the negative supervisory voltage is impressed through the resistor 936 onto the control grid of the modulator tube 932 thereby raising the cathode potential thereof and producing a multiplexing pulse of greater than average width which occurs in the pulse time position assigned to channel A. This wide multiplexing pulse of channel A is multiplexed with the other quiescent pulses of the system and supplied over the common conductor 251 and through the transmitter slicer 250 to the microwave transmitter 255. However, the carrier frequency circuits of this transmitter are normally disabled so that the pulse wave train is not transmitted to the remote multiplexing equipment 45.

Considering first the operation of the supervisory relay circuits 200 in originating a call, when an outward call from the selector bank associated with the particular trunk circuit 11 is established, a closure is placed across the tip T and ring R leads, through the drop side of the channel repeat coil 1670, and through the contacts 1642 and 1643 to the windings of the calling relay 1610, the upper winding being connected to ground and the lower winding being connected to a negative battery to complete the closure of the line to battery voltage. When the calling relay 1610 operates the contacts 1611 thereof are opened, thus removing the negative supervisory voltage from the conductor 220*a* with the result that the average width of the multiplexing pulse produced in channel A decreases to a midpoint or zero modulation point at which the pulse may be modulated equally in either direction. Also, when the calling relay 1610 operates it energizes the outgoing delay relay 1600 by closure of the contacts 1613. Furthermore, when the calling relay 1610 operates, the contacts 1612 are opened, thus removing the 680 ohm balancing resistor 1614 from the secondary of the channel repeat coil 1670. When the outgoing delay relay 1600 operates, it places ground on the sleeve S lead from the selector bank, thereby holding the selector for the duration of the call. The outgoing delay relay 1600 is of the slow release type so that it remains operated during each series of dial impulses. Also, when the outgoing delay relay 1600 operates, the contacts 1605 thereof are closed to apply a negative battery potential by way of the contacts 1605 and over the conductor 1675 to the transmitter 255 to operate a control relay in this transmitter, thereby turning on the carrier frequency circuits thereof. When the transmitter 255 is thus enabled, the pulse multiplex wave train is modulated on the high frequency carrier and transmitted to the remote multiplexing equipment 45. Inasmuch as the negative supervisory voltage is removed from the conductor 220*a* before the transmitter 255 is energized, the multiplexing pulse transmitted over the channel A to the remote equipment 45 is of normal width so that this pulse may be modulated equally in both directions by intelligence signals.

During dial pulses the calling relay 1610 releases and operates at the dial pulse rate and respectively applies and removes the negative supervisory voltage from the conductor 220a at this rate. Upon the first release of the calling relay 1610 the contacts 1613′ are closed so that the changeover relay 1630 is operated by way of the contacts 1613′ and 1604. The changeover relay 1630 is also of the slow release type so that it remains operating during the dial operation. The changeover relay 1630 performs the function of shorting the primary windings of the channel repeat coil 1670 and the secondary windings of the hybrid coil 210. More specifically, when the relay 1630 is operating the upper primary coil of the channel, repeat coil 1670 is shorted by way of the contacts 1632, and the lower primary coil is shorted by way of the contacts 1633. Also, the secondary windings of the hybrid coil 210 is short circuited by way of the contacts 1631. By shorting out the primary windings of the repeat coil 1670, any possible local distortion of the dial pulses due to a change in the impedance of the coil is eliminated. Furthermore, such a short circuiting operation attenuates any audible dial clicks. By shorting out the secondary windings of the hybrid coil 210 any feedback in the form of "singing" which could be caused by the unbalancing of the hybrid networks due to a short circuiting of the repeat coil 1670 is prevented.

Considering now the operation of the supervisory relay circuits at a called terminal, it will be assumed that the supervisory relay circuits 200 are employed to receive a coil originating at the remote station 45 in the manner described above. When an incoming call is received, that is, when the transmitter 555 is enabled and a pulse multiplex wave train is transmitted to the receiver 355 at the local equipment 40, a squelch relay in the receiver 355 is operated to supply a ground connection over the conductor 1695 (Fig. 16B) to the supervisory signal detector circuit indicated generally at 1680. The ground connection from the receiver 355 is supplied through the normally closed contacts 1694 of the detector relay 1691 and over the conductor 1660a to the receive relay 1660, thus operating this relay.

When the receive relay 1660 is operated, the first incoming delay relay 1640 is in turn operated by way of the contacts 1663 and 1603. With the relays 1160 and 1640 both operated, the T′ and R′ leads to the incoming selector are connected across the upper winding of the supervisory relay 1620. More specifically, the T′ lead is connected by way of the contacts 1641, the upper primary winding of the repeat coil 1670, and the contacts 1642′ to one side of the upper winding of the relay 1620, and the R′ lead is connected by way of the contacts 1645, 1664, the lower primary winding of the coil 1670, and the contact 1643′ and through the rectifier 1624 to the other end of the upper winding of the relay 1620. The T′ and R′ battery is thus applied to the relay 1620 to operate this relay. When the supervisory relay 1620 operates, the contacts 1622 thereof are closed so that the second incoming delay relay 1650 is operated by way of the contacts 1644 and 1622.

Upon closure of the T′ and R′ leads to the incoming selector, the incoming selector places ground on its S′ lead, which also places ground on the trunk sleeve S coming from the outward selector bank, so that a busy condition can be given to any outward calls attempting to seize this channel.

When the second incoming delay relay 1650 is operated, a negative battery potential is supplied through the contacts 1655 thereof and over the conductor 1675 to the transmitter at the receiving terminal, thereby operating the control relay of this transmitter and turning on the radio carrier so that transmission can be made back to the originating terminal. When the transmitter at the called terminal is turned on, the pulse multiplex wave train is modulated upon a high frequency carrier and transmitted back to the originating terminal.

Also, when the second incoming delay relay 1650 operates, a negative supervisory voltage is impressed by way of the contacts 1651′ and the contacts 1621′ and over the conductor 220a to the pulse width modulator and multiplexer unit 220 to produce a multiplexing pulse of greater than average width which occurs in the desired pulse time position. This wide multiplexing pulse is multiplexed with the other pulses of the system and transmitted over the microwave link to the originating terminal wherein it is separated from the other pulses of the system in the corresponding demultiplexer and pulse width denominator unit and is detected in the supervisory signal detector circuit 1680 at the originating terminal so that a supervisory signal lamp is lit, as will be described in more detail hereinafter. The transmission of a wide multiplexing pulse back to the originating terminal in the manner described above thus signifies to the originating office that an incoming selector has been seized and is being held for the completion of a call.

From the foregoing description of the operation of the supervisory relay circuits at an originating terminal it will be recalled that during dialing pulses the negative supervisory voltage is respectively applied and removed from the conductor 220a to provide a multiplexing pulse, the width of which varies from average to greater than average at the dial pulse rate. At the called terminal the dial impulse modulated multiplexing pulse is separated from the other pulses of the system in the demultiplexer and pulse width demodulator unit and is supplied over the conductor 230b to the supervisory signal detector circuit indicated generally at 1680 in Fig. 16B. The supervisory signal detector circuit 1680 detects the change in pulse width which occurs at the relatively low dial impulse frequency and translates the pulse width change into a suitable control function which controls the receive relay 1660 and the supervisory lamp 1689.

More specifically, the separated multiplexing pulse which is of negative polarity is transmitted over the conductor 230b to the control grid of a pulse detector tube 1681, this control grid being connected to ground through a grid leak resistor 1682. The tube 1681 is normally conducting and the anode resistor 1683 thereof is of relatively large value so that normally the anode voltage of the tube 1681 is relatively low. A condenser 1684 is connected across the resistor 1683 and is normally charged to the relatively low anode potential of the tube 1681. When the negative multiplexer pulse arrives it cuts off the tube 1681 and the condenser 1684 gradually discharges through the resistor 1683 to increase the potential at the anode of the tube 1681 at a relatively slow rate. When the negative multiplexer pulse ends, the tube 1681 again conducts so that the condenser 1684 is rapidly recharged through the tube 1681 to its original potential. With a multiplexer pulse which has an average width which is midway between the extreme modulation widths, the condenser 1684 is permitted to discharge by only a small amount during pulses so that a small amplitude pulse is produced in the anode circuit of the tube 1681. However, the negative multiplexer pulse increases in width during periods when a negative supervisory voltage is applied at the originating office, so that the condenser 1684 is permitted to discharge by a substantially greater amount during the pulse persistence interval to produce a pulse of increased amplitude in the anode circuit of the tube 1681. The variable amplitude pulse produced in the anode circuit of the tube 1681 is supplied to the control grid of a control tube 1690, in the anode circuit of which there is provided a detector relay 1691 in series with a variable anode load resistor 1692. A condenser 1693 is connected across the series combination of the relay 1691 and the resistor 1692. Preferably, the condenser 1693 has a value such that the relay 1691 is operated only during periods when relatively wide multiplexer pulses are successively transmitted, i. e. during the dialing impulses, and the condenser 1693 provides in effect a low pass filter so that the relay 1691 responds only to frequencies up to approximately 60 cycles per second. The control tube 1690 is normally held nonconductive by means of the voltage divider network including the resistors 1695 and 1696, the cathode of the tube 1690 being connected to the junction point of these resistors. A rectifier 1697 is connected across the grid resistor 1698 of the tube 1690, so that the variable amplitude wave produced at the anode of the tube 1681 in the manner described above is clamped to ground potential. The cathode potential of the tube 1690 is so adjusted that this tube does not conduct either during periods when there are no multiplexer pulses presented to the tube 1681 or during periods when the multiplexer pulse presented to the tube 1681 has an average width which is midway between the extreme modulation widths thereof. However, when a sufficiently long chain of relatively wide multiplexer pulses is supplied to the tube 1681 so as to produce a series of relatively large amplitude pulses in the anode circuit thereof, the tube 1690 conducts and the relay 1691 operates, thus opening the contacts 1694. When the contacts 1694 are opened, the ground connection for the receive relay 1660 is removed and this relay is released. It is thus evident from the foregoing description that the receive relay 1660 can be successively released and operated at the dial impulse rate upon the make and break of the contacts 1694 resulting from the above-described action of the supervisory signal detector circuit 1680.

In order to signal the operator at the originating station, there is provided an indicator lamp 1689 which is controlled by means of the contacts 1688 of the detector relay 1691, the lamp 1689 being energized by a suitable alternating current source indicated at 1687.

It will be evident from the foregoing description of the supervisory signal detector circuit 1680 that during incoming dial impulses the width of the multiplexer pulses is varied at the dial impulse rate and the detector relay 1691 is released and operated at the dial impulse rate, whereupon the receive relay is correspondingly released and operated by opening and closing of the contacts 1694 of the relay 1691.

The second incoming delay relay 1650 is held in an operating condition despite the successive release and operation of the receive relay 1660 through closure of the contacts 1653 and 1644 to ground, the first incoming delay relay 1640 being of the slow release type so that it is not affected by dial pulses. Upon the first release of the receive relay 1660 the changeover relay 1630 is operated by way of the contacts 1662 and 1652. When the changeover relay 1630 operates it short circuits the primary windings of the channel repeat coil 1670 and the secondary windings of the hybrid coil 210 in a manner identical to that described above in connection with the operation of the relay circuits 200 in originating a call. During incoming dial pulses both of the incoming delay relays 1640 and 1650 remain operated. Also, the supervisory relay 1620 remains operated during this period by way of the contacts 1662, 1652, and 1604′, which apply ground to the lower winding of the relay 1620 during the intervals when the upper winding thereof is deenergized.

Upon completion of the incoming dial pulses the receive relay again remains steadily operated, both of the incoming delay relays 1640 and 1650 continue to remain operated for the duration of the call, and the upper winding of the supervisory winding 1620 keeps this relay operated.

If an all trunks busy condition is encountered at the called terminal, the pulsing battery current which comes over the T′ and R′ leads from the incoming selector releases and operates the supervisory relay 1620 at the standard pulse rate of 120 impulses per minute. Also, if a line busy condition is encountered, the pulsing battery current which comes over the T′ and R′ leads from the incoming selector releases and operates the supervisory relay 1620 at the standard pulse rate of 60 impulses per minute. Consequently, the contacts 1621′ of the supervisory relay 1620 are opened and closed at the particular busy pulse rate to remove and reapply the negative supervisory voltage from the conductor 220*a*. The resultant change in the width of the multiplexer pulse which occurs at the particular busy pulse rate is transmitted to the originating terminal, at which point it is detected in the supervisory signal detector circuit thereof so as to release and operate the detector relay 1691 at the busy pulse rate. Accordingly, the indicator lamp 1689 is flashed at the busy pulse rate to indicate to the outward operator either an all trunks busy or a line busy condition at the answering office. In this connection it will be understood that conventional audible busy tones may also be sent directly over the voice channel, i. e. the T and R leads, to the originating office.

When the called party answers, the reversal of the T and R battery releases the supervisory relay 1620 due to the fact that the rectifier 1624 prevents the flow of reverse current through the upper winding of the relay 1620. As a result, the contacts 1621′ thereof are opened and negative supervisory voltage is removed from the conductor 220*a*.

The removal of the negative supervisory voltage from the conductor 220*a* has the effect at the originating terminal of decreasing the multiplexer pulse width, thus causing the detector relay at the originating terminal to release, which in turn causes the receive relay at the originating terminal to be operated. When the receive relays at both the originating and called terminals are operated, the circuit is prepared for conversation.

As soon as the called party hangs up, the T and R battery is reversed back to its original polarity, thereby operating the supervisory relay 1620 of the called terminal and closing the contacts 1621′ so that a negative supervisory voltage is again placed on the conductor 220*a* and the resultant increase in pulse width is detected at the originating office and operates the detector relay thereof so that the indicator lamp 1689 is lit thus indicating to the originating office that the called party has hung up.

When disconnect is made at the originating terminal, the calling relay 1610 is released and the negative supervisory voltage is connected by way of the contacts 1621 and the contacts 1611 to the conductor 220*a* so as to change the multiplexer pulse to a relatively wide pulse which is transmitted to the called terminal. At the called terminal the supervisory signal detector circuit 1680 detects the change in average pulse width and releases the associated receive relay which in turn releases all other operated relays, thus bringing the supervisory relay circuits to an idle condition at both terminals.

Flashing recall by the called subscriber before a disconnect by the originating office reverses the polarity of the T and R battery at the called terminal, thereby operating and releasing the supervisory relay 1620 at the flashing rate. When the supervisory relay is operated and released, the contacts 1621′ thereof operate to apply and remove negative supervisory voltage to the conductor 220*a* so that the indicator lamp 1689 at the originating terminal is flashed to indicate recall to the outward operator.

Upon a disconnect at both terminals, the battery voltage is removed from the transmitter start conductor 1675 at both the originating and called terminals so that both of the transmitters 255 and 555 are turned off. However, these transmitters are only turned off during periods when no other call has been originated or is still in progress on another channel of the system. If another call has been originated or is still in progress, the transmitters would then be under the control of the supervisory circuits of that channel.

While the transmission of supervisory information has been illustrated as comprising an increase in the average pulse width during the application of negative supervisory voltage in accordance with the supervisory signals of the telephone system, it will be evident that the opposite change in pulse widths, namely, a decrease in pulse widths, may equally well be employed to convey the supervisory signals through the multiplexing system. However, under these conditions the supervisory signal detector circuit 1680 is modified so that the relay 1691 thereof is operated only during periods when the received multiplexer pulse is relatively narrow and is not operated in the absence of multiplexer pulses or during multiplexer pulses of average width.

While there has been described what is at present considered to be the preferred embodiment of the invention, it will be understood that various modifications may be made therein which are within the true spirit and scope of the invention as defined in the appended claims.

What we claim as new and desire to secure by Letters Patent of the United States is:

1. A pulse multiplex communication system comprising a local station, a remote station, a plurality of lines associated with each of said stations, means for producing at said local station a first time base comprising a plurality of successive timing pulses in repetitive pulse frames, means for transmitting a synchronizing signal to said remote station during one of said timing pulses, means at said remote station and controlled by said synchronizing signal for producing a second time base comprising a plurality of successive timing pulses in repetitive pulse frames, means for varying the duration of said timing pulses to compensate for the delay in transmission between said stations, and means for setting up private two-way communication channels between calling and called lines of the system during predetermined ones of said timing pulses at said local and remote stations.

2. Switching waveform generating apparatus for controlling the signal channel multiplexing and de-multiplexing components of a signalling system of the time sharing type, comprising means for developing a pulse wavetrain having a frequency $f$, means controlled by said pulse wavetrain for developing a square wave having a frequency $f/2$, means for integrating said $f/2$ square wave to produce a first triangular wave of the same frequency, means for combining said first triangular wave and said pulse wavetrain, means for selecting only those pulses of said combined wave which occur during predetermined portions of said first triangular wave, and means controlled by said selected pulses for developing a square wave having a frequency $f/4$.

3. Switching waveform generating apparatus for controlling the signal channel multiplexing and de-multiplexing components of a signalling system of the time sharing type, comprising a master oscillator arranged to provide an essentially sinusoidal wave, a squaring circuit for converting the output of said oscillator into a first square wave of the same frequency, means for integrating said first square wave to provide a triangular modulation base wave of the same frequency, means controlled by said first square wave for developing control pulses of the same frequency, a first switching circuit controlled by said control pulses and arranged to provide a second square wave of one half the frequency of said first square wave, a second switching circuit, means jointly responsive to said control pulses and said second square wave for controlling said second switching circuit to develop a third square wave of one fourth the frequency of said first square wave, means controlled by said first square wave for developing synchronizing pulses of relatively short duration and of a frequency one fourth that of said third square wave, and means for impressing said synchronizing pulses upon said first, second and third switching circuits to synchronize the square wave outputs thereof.

4. Switching waveform generating apparatus for controlling the signal channel multiplexing and de-multiplexing components of a signalling system of the time sharing type, comprising a master oscillator, a first chain of frequency divider stages controlled by said oscillator, means for deriving from said oscillator control pulses of the same frequency, a second chain of frequency divider stages controlled by said control pulses, each of the stages of said second chain being arranged to provide a square wave of a frequency one half the frequency of the preceding stage square wave, and means controlled by the last stage of said first chain for forcing all of the stages of said second chain to operate in the same relative phase.

5. Switching waveform generating apparatus for controlling the signal channel multiplexing and de-multiplexing components of a signalling system of the time sharing type, comprising a source of control pulses, a first series of switching circuits of the type having two conditions of stable equilibrium connected in cascade relation and arranged to be triggered in sequence, means for controlling the first circuit in said first series in accordance with said control pulses, means for deriving from the last circuit of said first series synchronizing pulses having a subharmonic relation to said control pulses, a second series of switching circuits of the type having two conditions of stable equilibrium, means controlled in part by said control pulses and individual to each of the switching circuits of said second series for triggering said circuits at different rates which are sub-multiples of the rate of said control pulses and are of progressively lower order, and means for controlling the relative phase of the switching circuits of said second series in accordance with said subharmonic synchronizing pulses.

6. Switching waveform generating apparatus for controlling the signal channel multiplexing and de-multiplexing components of a signalling system of the time sharing type, comprising a source of control pulses, a series of switching circuits of the type having two conditions of stable equilibrium, means controlled in part by said control pulses for triggering said circuits at different rates which are sub-multiples of the rate of said control pulses and are of progressively lower order, and means for simultaneously forcing said circuits into the same condition of equilibrium at a sub-multiple rate not greater than the triggering rate of the last circuit in said series, thereby to maintain the same phase relationship between said circuits.

7. Switching waveform generating apparatus for controlling the signal channel multiplexing and de-multiplexing components of a signalling system of the time sharing type, comprising a source of control pulses, a series of switching circuits of the type having two conditions of stable equilibrium and arranged in a predetermined order, means for triggering the first circuit in said series in a predetermined order, means for triggering the first circuit in said series in accordance with said control pulses, means controlled in part by said control pulses for triggering the remaining ones of said circuits at progressively lower rates which are sub-multiples of the control pulse rate, and means independent of said circuits and controlled by said control pulses for simultaneously forcing said circuits into the same condition of equilibrium at a sub-multiple rate not greater than one half the triggering rate of the last circuit of said series, thereby to maintain the same phase relationship between said circuits.

8. Switching waveform generating apparatus for controlling the signal channel multiplexing and de-multiplexing components of a signalling system of the time sharing type, comprising a source of control pulses, a series of switching circuits of the type having two conditions of stable equilibrium and arranged in a predetermined order, means for triggering the first circuit in said series in a predetermined order, means for triggering the first circuit in said series in accordance with said control pulses, means controlled in part by said control pulses for triggering the remaining ones of said circuits at progressively lower rates which are sub-multiples of the control pulse rate, means for deriving from each of said circuits a square wave having a frequency corresponding to one half the triggering rate of the circuit, and means independent of said circuits and controlled by said control pulses for simultaneously forcing said circuits into the same condition of equilibrium at a sub-multiple rate not greater than one half the triggering rate of the last circuit of said series, thereby to maintain the same phase relationship between said circuits.

9. In a pulse multiplex communication system, the combination of a plurality of signalling channels, means common to all of said channels for developing a series of isophase pairs of positive and negative square waves, each of said pairs having a frequency one half that of the preceding pair in said series, means individual to each of said channels for combining one square wave from each of said pairs to define a unique time position which is successively repeated during repetitive time position frames, and means individual to said channels for sampling signals impressed upon the channel in the time position defined by said last named means.

10. In a pulse multiplex communication system, the combination of a plurality of signalling channels, means common to all of said channels for developing a series of isophase pairs of positive and negative square waves, each of said pairs having a frequency one half that of the preceding pair in said series, and means individual to said channels and under the joint control of one square wave from each of said square wave pairs for sampling signals impressed upon the channel during the coincidence of like phase portions of all of the controlling square waves.

11. In a pulse multiplex communication system, the combination of, a plurality of signalling channels, means common to all of said channels for developing a series of pairs of positive and negative square waves, each of the pairs of said series having a frequency one half that of the preceding pair, means individual to said channels for combining one square wave from each of said pairs on a binary coincidence basis to provide a series of successive time positions which are successively repeated during repetitive time position frames, and means individual to each of said channels and controlled by said last-named means for sampling signals impressed upon the channel in the time position assigned thereto and for reconstructing signals from signal samples impressed upon said channel in the same position.

12. In a pulse multiplex communication system, the combination of, a plurality of signalling channels, means common to all of said channels for developing a series of pairs of positive and negative square waves, each of the pairs of said series having a frequency one half that of the preceding pair, means individual to said channels for combining one square wave from each of said pairs on a binary coincidence basis to provide a series of successive time positions which are successively repeated during repetitive time position frames, means individual to each of said channels and controlled by said last-named means for sampling incoming signals impressed upon the channel in a first one of said time positions and for reconstructing outgoing signals from signal samples impressed upon said channel and occurring in a second time position, the time interval between said first and second time positions having an integral relationship to the time delay of signal samples transmitted over said channel.

13. In a pulse multiplex communication system, the combination of, a plurality of signalling channels, means common to all of said channels for developing a series of pairs of positive and negative square waves, each of the pairs of said series having a frequency one half that of the preceding pair, and means individual to said channels for combining one square wave from each of said pairs and sampling signals impressed upon the signalling channel during periods when all of the combined square waves are of the same phase.

14. In a pulse multiplex communication system, the combination of, a plurality of signalling channels, means common to all of said channels for developing a series of pairs of positive and negative square waves, each of the pairs of said series having a frequency one half that of the preceding pair, means individual to each channel for limiting the peak amplitude of signals impressed upon said channel, and means individual to said channels for combining one square wave from each of said pairs and sampling signals impressed upon the signalling channel during periods when all of the combined square waves are of the same phase.

15. In a pulse multiplex communication system, the combination of, a plurality of signalling channels, means common to all of said channels for developing a series of pairs of positive and negative square waves, each of the pairs of said series having a frequency one half that of the preceding pair, means individual to said channels for combining one square wave from each of said pairs and sampling signals impressed upon the signalling channel during periods when all of the combined square waves are of the same phase, said last-named means including a gating tube, resistance means connecting each of said combined square waves to the control grid of said gating tube, and means for varying the cathode potential of said gating tube in accordance with signals impressed upon said channel.

16. In a pulse multiplex communication system, the combination of, a plurality of signalling channels, means common to all of said channels for developing a series of pairs of positive and negative square waves, each of the pairs of said series having a frequency one-half that of the preceding pair, means individual to said channels for combining one square wave from each of said pairs and sampling signals impressed upon the signalling channel during periods when all of the combined square waves are of the same phase, said last-named means including a gating tube, resistance means connecting each of said combined square waves to the control grid of said gating tube, a modulating tube, means including said modulating tube for biasing said gating tube non-conductive except during periods when all of the combined square waves are of the same phase, and means for varying the control grid potential of said modulating tube in accordance with signals impressed upon said channel.

17. In a pulse multiplex communication system, the combination of, a plurality of signalling channels, means common to all of said channels for developing a series of pairs of oppositely phased square waves, each pair of square waves having a frequency one half that of the preceding pair in said series, means individual to each of said channels for combining one square wave from each of said pairs and sampling signals impressed upon the signalling channel during periods when all of the combined square waves are of the same phase, said last-named means comprising a gating tube, a modulating tube, means connecting the cathodes of said gating and modulating tubes together, means connecting each of said combined square waves to the control grid of said gating tube, means connecting signals impressed upon said channel to the control grid of said modulating tube, and means for deriving from the anode of said gating tube signal samples during said signal sampling periods.

18. In a pulse multiplex communication system, the combination of, a plurality of signalling channels, means common to all of said channels for developing a series of pairs of oppositely phased square waves, each pair of square waves having a frequency one half that of the preceding pair in said series, means individual to each of said channels for combining one square wave from each of said pairs and sampling signals impressed upon the signalling channel during periods when all of the combined square waves are of the same phase, a pulse multiplex transmission path common to all of said channels, means for impressing signal samples from each of said channels upon said transmission path, means individual to each of said channels for combining one square wave from each of said pairs and selecting those signal samples impressed upon said path which occur during periods when all of the combined square waves are of the same phase, said signal sampling periods and said selecting periods being integrally related to the time delay of signals transmitted over said transmission path.

19. In a pulse multiplex communication system, the combination of, a plurality of signalling channels, means common to all of said channels for developing a series of pairs of oppositely phased square waves, each pair of square waves having a frequency one half that of the preceding pair in said series, means individual to each of said channels for combining one square wave from each of said pairs and sampling signals impressed upon the signalling channel during periods when all of the combined square waves are of the same phase, a pulse multiplex transmission path common to all of said channels, means for impressing signal samples from each of said channels upon said transmission path, means individual to each of said channels for combining one square wave from each of said pairs and selecting those signal samples impressed upon said path which occur during periods when all of the combined square waves are of the same phase, and means for varying the frequency of said pairs of square waves, whereby said signal sampling periods may be displaced from said signal sample selecting periods by an interval which is equal to the time delay of signals transmitted over said transmission path.

20. In a pulse multiplex communication system, the combination of, a plurality of signalling channels, means common to all of said channels for developing a series of pairs of positive and negative square waves, each of the pairs of said series having a frequency one half that of the preceding pair, means individual to each channel for limiting the peak amplitude of signals impressed upon said channel, said last-named means including an amplifying tube, means for connecting signals impressed upon said channel to a control grid of said amplifying tube, means for deriving from the anode of said tube said signals in amplified form, a pair of rectifiers effectively connected in opposite phase to the anode of said tube, means for deriving from the cathode of said tube a bias potential for at least one of said rectifiers, thereby to prevent said one rectifier from conducting until amplified signals of the corresponding polarity exceed a predetermined maximum amplitude, and means individual to said channels for combining one square wave from each of said pairs and sampling signals impressed upon the signalling channel during periods when all of the combined square waves are of the same phase.

21. In a pulse multiplex communication system, the combination of, a plurality of signalling channels, means common to all of said channels for developing a series of pairs of positive and negative square waves, each of the pairs of said series having a frequency one half that of the preceding pair, means individual to each channel for limiting the peak amplitude of signals impressed upon said channel, said last-named means including an amplifying tube, means for connecting signals impressed upon said channel to a control grid of said amplifying tube, means for deriving from the anode of said tube said signals in amplified form, a pair of cathode resistors included in the cathode circuit of said tube, a pair of rectifiers connected in series aiding relation across said pair of cathode resistors, means connecting the anode of said tube to the junction point between said pair of rectifiers, and means individual to said channels for combining one square wave from each of said pairs and sampling signals impressed upon the signalling channel during periods when all of the combined square waves are of the same phase.

22. In a pulse multiplex communication system, the combination of, a plurality of signalling channels, means common to all of said channels for developing a series of pairs of positive and negative square waves, each of the pairs of said series having a frequency one half that of the preceding pair, means individual to each channel for limiting the peak amplitude of signals impressed upon said channel, said last-named means including an amplifying tube, means for connecting signals impressed upon said channel to a control grid of said amplifying tube, means for deriving from the anode of said tube said signals in amplified form, first and second resistors connected from the cathode of said tube to a point of fixed potential, first and second rectifiers connected in series aiding relation from the cathode of said tube to said point of fixed potential, a third resistor connected between the junction points of said first and second resistors and said first and second rectifiers, means connecting the anode of said tube to the junction point between said first and second rectifiers, by-pass means connected across said first and second resistors to prevent signal frequency fluctuations of voltage thereacross, and means individual to said channels for combining one square wave from each of said pairs and sampling signals impressed upon the signalling channel during periods when all of the combined square waves are of the same phase.

23. In a pulse multiplex communication system, the combination of, a plurality of signalling channels, means common to all of said channels for developing a series of pairs of positive and negative square waves, each of the pairs of said series having a frequency one half that of the preceding pair, means individual to said channels for combining one square wave from each of said pairs and sampling signals impressed upon the signalling channel during periods when all of the combined square waves are of the same phase, said last-named means including a gating tube, resistance means connecting each of said combined square waves to a control element of said gating tube, a modulating tube, means connecting signals impressed upon said channel to a control element of said modulating tube, low impedance coupling means connecting a second control element of each of said tubes together, and means for deriving from an output element of said gating tube signal samples which are modulated in accordance with said impressed signals.

24. In a pulse multiplex communication system, the combination of, a plurality of signalling channels, means common to all of said channels for developing a series of pairs of positive and negative square waves, each of the pairs of said series having a frequency one half that of the preceding pair, means individual to said channels and including a gating tube for combining one square wave from each of said pairs, the combination of square waves for each of said channels being different, means individual to each channel for biasing the gating tube thereof to prevent conduction thereof except during periods when all of the combined square waves are of the same phase, whereby cross talk between channels during non-conducting periods of said gating tubes is avoided, and means individual to each of said channels for sampling signals impressed upon the channel during the conducting periods of the gating tube included therein.

25. In a pulse multiplex communication system, the combination of, a plurality of signalling channels, means common to all of said channels for developing a series of pairs of positive and negative square waves, each of the pairs of said series having a frequency one half that of the preceding pair, means for developing a triangular wave having a frequency twice that of the highest frequency pair of square waves, means individual to said channels and including a gating tube for combining one square wave from each of said pairs and said triangular wave, the combination of square waves for each of said channels being different, means individual to each channel for biasing the gating tube thereof to prevent conduction thereof except during periods when all of the combined square waves are of the same phase, whereby cross talk between channels during the non-conducting periods of gating tubes is avoided, means individual to said channels for varying the bias on the gating tube associated therewith in accordance with signals impressed upon said channel, and means for deriving from the anodes of said gating tubes variable base triangular signal samples during the conducting periods of said gating tubes.

26. In a pulse multiplex cmmunication system, the combination of, a plurality of signalling channels, means common to all of said channels for developing a series of pairs of positive and negative square waves, each of the pairs of said series having a frequency one half that of the preceding pair, means for developing a triangular wave having a frequency twice that of the highest frequency pair of square waves, means individual to said channels and including a gating tube for combining one square wave from each of said pairs and said triangular wave, the combination of square waves for each of said channels being different, means individual to each channel for biasing the gating tube thereof to prevent conduction thereof except during periods when all of the combined square waves are of the same phase, whereby cross talk between channels during the non-conducting periods of said gating tubes is avoided, means individual to said channels for varying the bias on the gating tube associated therewith in accordance with signals impressed upon said channel, and means for deriving from the anodes of said gating tubes variable base triangular signal samples during the conducting periods of said gating tubes, said last-named means including an anode impedance common to all of said gating tubes, and wave slicing means common to all of said channels for converting the triangular signal samples from each of said channels into corresponding width modulated signal pulses of constant amplitude.

27. In a pulse multiplex communication system, the combination of, a plurality of signalling channels, means common to all of said channels for developing a series of pairs of positive and negative square waves, each of the pairs of said series having a frequency one half that of the preceding pair, means common to all of said channels for developing a triangular wave having a frequency twice that of the highest frequency pair of square waves, a gating tube and a modulating tube included in each of said channels, resistance mixing means individual to said channels for impressing one square wave of each of said pairs and said triangular wave on the control grid of the associated gating tube, the combination of square waves for each of said channels being different, means individual to said channels and including the modulating tube thereof for biasing the associated gating tube negatively by an amount sufficient to prevent conduction thereof except during periods when all of the combined square waves are of the same phase, means individual to said channels for varying the current through the associated modulating tube in accordance with signals impressed upon said channel, thereby to vary the bias on the associated gating tube in accordance with the impressed signals, and means including an impedance common to all of said channels for deriving from the anodes of said gating tubes variable amplitude triangular signal samples during the conducting periods of said gating tubes.

28. A pulse multiplex communication system, comprising a local station, a remote station, a plurality of signalling channels associated with each of said local and remote stations, a pulse multiplex transmission path common to the signalling channels of both said stations, means at said local station and common to the signalling channels thereof for developing a series of pairs of positive and negative square waves, each of the pairs of said series having a frequency one half that of the preceding pair in said series, means individual to the channels of said local station for combining one eqiare wave from each of said pairs and sampling signals impressed upon the signalling channel during periods when all of the combined square waves are of the same phase, means for developing a synchronizing signal in phase with said series of square wave pairs, means for impressing said synchronizing signal upon one of the channels of said local station to provide synchronizing signal samples therein, pulse multiplex means for transmitting signal samples and synchronizing signal samples from the channels of said local station over said path to said remote station, means at said remote station for reconstructing said synchronizing signal from said synchronizing signal samples, means common to the channels of said remote station and controlled by said reconstructed synchronizing signal for developing a second series of pairs of positive and negative square waves, each of the pairs of said second series having a frequency one half that of the preceding pair in said series, means individual to the channels of said remote stations for combining one square wave from each pair of said second series and sampling signals impressed upon the signalling channel during periods when all of the combined square waves are of the same phase, and pulse multiplex means for transmitting signal samples developed by said last-named means over said path to said local station.

29. A pulse multiplex communication system, comprising a local station, a remote station, a plurality of signalling channels associated with each of said local and remote stations, a pulse multiplex transmission path common to the signalling channels of both said stations, means at said local station and common to the signalling channels thereof for developing a series of pairs of positive and negative square waves, each of the pairs of said series having a frequency one half that of the preceding pair in said series, means individual to the channels of said local station for combining one square wave from each of said pairs and sampling signals impressed upon the signalling channel during periods when all of the combined square waves are of the same phase, means for developing a synchronizing signal in phase with said series of square wave pairs, means for impressing said synchronizing signal upon one of the channels of said local station to provide synchronizing signal samples therein, pulse multiplex means for transmitting signal samples and synchronizing signal samples from the channels of said local station over said path to said remote station, means at said remote station for reconstructing said synchronizing signal from said synchronizing signal samples, means common to the channels of said remote station and controlled by said reconstructed synchronizing signal for developing a second series of pairs of positive and negative square waves, each of the pairs of said second series having a frequency one half that of the preceding pair in said series, means individual to the channels of said remote stations for combining one square wave from each pair of said second series and sampling signals impressed upon the signalling channel during periods when all of the combined square waves are of the same phase, pulse multiplex means for transmitting signal samples developed by said last named means over said path to said local station, means individual to the channels of said local station for combining one square wave from each pair in said first series and selecting signal samples transmitted thereto over said common path during periods when all of the combined square waves are of the same phase, means individual to the channels of said remote station for combining one square wave from each pair in said second series and selecting signal samples transmitted thereto over said common path during periods when all of the combined square waves are of the same phase, the signal sampling and signal sample selecting periods of each of said channels being separated by an interval which bears an integral relation to the transmission time delay for signal samples transmitted over said path, and means individual to each of the channels of both said stations for reconstructing signals from the signal samples selected in each of said channels.

30. A pulse multiplex communication system, comprising a local station, a remote station, a plurality of signalling channels associated with each of said local and remote stations, a pulse multiplex transmission path common to the signalling channels of both said stations, means at said local station and common to the signalling channels thereof for developing a first series of pairs of positive and negative square waves, each of the pairs of said series having a frequency one half that of the preceding pair in said series, means individual to the channels of said local station for combining one square wave from each of said pairs and sampling signals impressed upon the channel during periods when all of the combined square waves are of the same phase, means for developing a synchronizing signal in phase with said first series of square wave pairs, means for impressing said synchronizing signal upon one of the channels of said local station to provide synchronizing signal samples therein, pulse multiplex means for multiplexing the signal samples and synchronizing signal samples produced in the channels of said local station and transmitting the multiplexed signal samples over said common path to said remote station, a synchronizing signal detector circuit at said remote station for separating said synchronizing signal from the remaining multiplexed signal samples, means for developing a time delay pulse which is delayed in time relative to said separated synchronizing signal, means controlled by said time delay pulse for developing a second series of pairs of positive and negative square waves, each of the pairs of said second series having a frequency one half that of the preceding pair in said series, means individual to the channels of said remote station for combining one square wave from each pair of said second series and sampling signals impressed upon the channel during periods when all of the combined square waves are of the same phase, pulse multiplex means for multiplexing the signal samples produced in the channels of said remote station and transmitting the multiplexed signal samples over said common path to said local station, and means individual to each of the channels of both said stations for de-multiplexing and de-modulating the signal samples transmitted thereto over said pulse multiplex path.

31. A pulse multiplex communication system, comprising a local station, a remote station, a plurality of signalling channels associated with each of said local and remote stations, a pulse multiplex transmission path common to the signalling channels of both said stations, means at said local station and common to the signalling channels thereof for developing a first series of pairs of positive and negative square waves, each of the pairs of said series having a frequency one half that of the preceding pair in said series, means individual to the channels of said local station for combining one square wave from each of said pairs and sampling signals impressed upon the channel during periods when all of the combined square waves are of the same phase, means for developing a synchronizing signal in phase with said first series of square wave pairs, means for impressing said synchronizing signal upon one of the channels of said local station to provide synchronizing signal samples therein, pulse multiplex means for multiplexing the signal samples and synchronizing signal samples produced in the channels of said local station and transmitting the multiplexed signal samples over said common path to said remote station, a synchronizing signal detector circuit at said remote station for separating said synchronizing signal from the remaining multiplexed signal samples, means for developing a time delay pulse which is delayed in time relative to said separated synchronizing signal, means controlled by said time delay pulse for developing a second series of pairs of positive and negative square waves, each of the pairs of said second series having a frequency one half that of the preceding pair in said series, means for adjusting the interval between said separated synchronizing signal and said time delay pulse to bring said second series of square wave pairs into phase coincidence with the signal sampling positions of said multiplexed signal samples, means individual to the channels of said remote station for combining one square wave from each pair of said second series and sampling signals impressed upon the channel during periods when all of the combined square waves are of the same phase, pulse multiplex means for multiplexing the signal samples produced in the channels of said remote station and transmitting the multiplexed signal samples over said common path to said local station, and means individual to each of the channels of both said stations for de-multiplexing and de-modulating the signal samples transmitted thereto over said pulse multiplex path.

32. A pulse multiplex communication system, comprising a local station, a remote state, a plurality of signalling channels associated with each of said local and remote stations, a pluse multiplex transmission path common to the signalling channels of both said stations, means at said local station and common to the signalling channels thereof for developing a first series of pairs of said series having a frequency one half that of the preceding pair in said series, means individual to the channels of said local station for combining one square wave from each of said pairs and sampling signals impressed upon the channel during periods when all of the combined square waves are of the same phase, means for developing a synchronizing eignal in phase with said first series of square wave pairs, means for impressing said synchronizing signal upon one of the channels of said local station to provide synchronizing signal samples therein, pulse multiplex means for multiplexing the signal samples and synchronizing signal samples produced in the channels of said local station and transmitting the multiplexed signal samples over said common path to said remote station, means at said remote station deriving synchronizing pulses from the multiplexed signal samples transmitted thereto over said common path corresponding to the synchronizing signal developed at said local station, means for delaying said synchronizing pulses, a resonant circuit, means for impressing said delayed synchronizing pulses on said resonant circuit to shock excite the same into oscillation at the natural resonant frequency thereof, said natural resonant frequency being harmonically related to the frequency of the square wave pairs of said first series, means controlled by said shock excited oscillations for developing a second series of pairs of positive and negative square waves, each of the pairs of said second series having a frequency one half that of the preceding pair in said series, means individual to the channels of said remote station for combining one square wave from each pair of said second series and sampling signals impressed upon the channel during periods when all of the combined square waves are of the same phase, pulse multiplex means for multiplexing the signal samples produced in the channels of said remote station and transmitting the multiplexed signal samples over said common path to said local station, and means individual to each of the channels of both said stations for de-multiplexing and de-modulating the signal samples transmitted thereto over said pulse multiplex path.

33. A pulse multiplex communication system, comprising a local station, a remote station, a plurality of signalling channels associated with each of said local and remote stations, a pulse multiplex transmission path common to the signalling channels of both said stations, means at said local station and common to the signalling channels thereof for developing a first series of pairs of said series having a frequency one half that of the preceding pair in said series, means individual to the channels of said local station for combining one square wave from each of said pairs and sampling signals impressed upon the channel during periods when all of the combined square waves are of the same phase, means for developing a synchronizing signal in phase with said first series of square wave pairs, means for impressing said synchronizing signal upon one of the channnels of said local station to provide synchronizing signal samples therein, pulse multiplex means for multiplexing the signal samples and synchronizing signal samples produced in the channels of said local station and transmitting the multiplexed signal samples over said common path to said remote station, means at said remote station deriving synchronizing pulses from the multiplexed signal samples transmitted thereto over said common path corresponding to the synchronizing signal developed at said local station, means for delaying said synchronizing pulses, a resonant circuit, means for impressing said delayed synchronizing pulses on said resonant circuit to shock excite the same into oscillation at the natural resonant frequency thereof, said natural resonant frequency being harmonically related to the frequency of the square wave pairs of said first series, means controlled by said shock excited oscillations for developing a second series of pairs of positive and negative square waves, means for adjusting the amount by which said syncronizing pulses are delayed to bring said second series of square wave pairs into phase coincidence with the signal sampling positions of said multiplexed signal samples, each of the pairs of said second series having a frequency one half that of the preceding pair in said series, means individual to the channels of said remote station for combining one square wave from each pair of said second series and sampling signals impressed upon the channel during periods when all of the combined square waves are of the same phase, pulse multiplex means for multiplexing the signal samples produced in the channels of said remote station and transmitting the multiplexed signal samples over said common path to said local station, and means individual to each of the channels of both said stations for de-multiplexing and de-modulating the signal samples transmitted thereto over said pulse multiplex path.

34. A pulse multiplex communication system, comprising a local station, a remote station, a plurality of signalling channels associated with each of said local and remote stations, a pulse multiplex transmission path common to the signalling channels of both said stations, means at said local station and common to the signalling channels thereof for developing a first series of pairs of positive and negative square waves, each of the pairs of said series having a frequency one half that of the preceding pair in said series, means individual to the channels of said local station for combining one square wave from each of said pairs and sampling signals impressed upon the channel during periods when all of the combined square waves are of the same phase, means for developing a synchronizing signal in phase with said first series of square wave pairs and comprising a pair of synchronizing pulses which are separated by an interval less than the interval between any two signal samples produced in the channels of said local station, means for impressing said synchronizing signal upon one of the channels of said local station to provide corresponding synchronizing pulse samples therein, pulse multiplex means for multiplexing the signal samples and synchronizing pulse samples produced in the channels of said local station and transmitting the multiplexed signal samples over said common path to said remote station, means at said remote station for developing synchronizing pulses from the multiplexed signal samples transmitted thereto over said path corresponding to the synchronizing signal developed at said local station, said last-named means comprising a series connected first condenser and first rectifier, a series connected second rectifier and second condenser connected across said first rectifier, said rectifiers being oppositely polarized for signals impressed upon said first condenser, means for connecting the multiplexed signal samples to said first condenser, and a resistor connected across said second condenser, said resistor and second condenser having a time constant such that said second condenser may be completely discharged between each of said multiplexed signal samples except said synchronizing pulse samples, means for deriving from said second condenser a synchronizing pulse in accordance with the incomplete discharge thereof, means for developing a time delay pulse which is delayed in time relative to said derived synchronizing pulse, means controlled by said time delay pulse for developing a second series of pairs of positive and negative square waves, each of the pairs of second series having a frequency one half that of the preceding pair in said series, means individual to the channels of said remote station for combining one square wave from each pair of said second series and sampling signals impressed upon the channel during periods when all of the combined square waves are of the same phase, pulse multiplex means for multiplexing the signal samples produced in the channels of said remote station and transmitting the multiplexed signal samples over said common path to said local station, and means individual to each of the channels of both said stations for de-multiplexing and de-modulating the signal samples transmitted thereto over said pulse multiplex path.

35. A pulse multiplex communication system, comprising a local station, a remote station, a plurality of signalling channels associated with each of said local and remote stations, a pulse multiplex transmission path common to the signalling channels of both said stations, means at said local station and common to the signalling channels thereof for developing a first series of pairs of positive and negative square waves, each of the pairs of said series having a frequency one half that of the preceding pair in said series, means individual to the channels of said local station for combining one square wave from each of said pairs and sampling signals impressed upon the channel during periods when all of the combined square waves are of the same phase, means for developing a synchronizing signal in phase with said first series of square wave pairs and comprising a pair of synchronizing pulses which are separated by an interval less than the interval between any two signal samples produced in the channels of said local station, means for impressing said synchronizing signal upon one of the channels of said local station to provide corresponding synchronizing pulse samples therein, pulse multiplex means for multiplexing the signal samples and synchronizing pulse samples produced in the channels of said local station and transmitting the multiplexed signal samples over said common path to said remote station, means at said remote station for developing synchronizing pulses from the multiplexed signal samples transmitted thereto over said path and corresponding to the synchronizing signal developed at said local station, said last-named means including a condenser, means for charging said condenser in accordance with each of said multiplexed signal samples, means for discharging said condenser at a predetermined rate, said discharge rate being so correlated with the interval between signal samples that said condenser is not completely discharged at the end of the first synchronizing pulse sample, means for deriving from said condenser a synchronizing signal proportional to the charge thereacross, means for developing a time delay pulse which is delayed in time relative to said separated synchronizing signal, means controlled by said time delay pulse for developing a second series of pairs of positive and negative square waves, each of the pairs of said second series having a frequency one half that of the preceding pair in said series, means individual to the channels of said remote station for combining one square wave from each pair of said second series and sampling signals impressed upon the channel during periods when all of the combined square waves are of the same phase, pulse multiplex means for multiplexing the signal samples produced in the channels of said remote station and transmitting the multiplexed signal samples over said common path to said local station, and means individual to each of the channels of both said stations for de-multiplexing and de-modulating the signal samples transmitted thereto over said pulse multiplex path.

36. A pulse multiplex communication system, comprising a local station, a remote station, a master frequency source at said local station, a plurality of signalling channels associated with each of said local and remote stations, a pulse multiplex transmission path common to the signalling channels of both said stations, means at each of said stations and common to the signalling channels thereof for developing under the control of said master frequency source a series of pairs of positive and negative square waves, each of the pairs of each series having a frequency one half that of the preceding pair in that series, means at each of said stations and individual to the channels thereof for combining one square wave from each of said pairs and sampling signals impressed upon the channel during periods when all of the combined square waves are of the same phase, pulse multiplex means for transmitting said signal samples between said stations and over said common path, means at each of said stations and individual to the channels thereof for combining one square wave from each of said pairs and selecting signal samples transmitted thereto over said common path during periods when all of said combined square waves are of the same phase, means at each of said stations and individual to the channels thereof for reconstructing the signals corresponding to the signal samples selected therein by said last-named means, and means individual to each of the channels of said stations for modulating said signal samples in accordance with at least one supervisory signal.

37. A pulse multiplex communication system, comprising a local station, a remote station, a master frequency source at said local station, a plurality of signalling channels associated with each of said local and remote stations, a pulse multiplex transmission path common to the signalling channels of both said stations, means at each of said stations and common to the signalling channels thereof for developing under the control of said master frequency source a series of pairs of positive and negative square waves, each of the pairs of each series having a frequency one half that of the preceding pair in that series, means at each of said stations and individual to the channels thereof for combining one square wave from each of said pairs and sampling signals impressed upon the channel during periods when all of the combined square waves are of the same phase, pulse multiplex means for transmitting said signal samples between said stations and over said common path, means at each of said stations and individual to the channels thereof for combining one square wave from each of said pairs and selecting signal samples transmitted thereto over said common path during periods when all of said combined square waves are of the same phase, means at each of said stations and individual to the channels thereof for reconstructing the signals corresponding to the signal samples selected therein by said last-named means, and supervisory relay circuit means individual to each of the channels of said stations for modulating the signal samples produced in said channel in accordance with supervisory signals accompanying the sampled signals, said supervisory relay circuit modulating means being so arranged that supervisory signals which occur during the transmission of intelligence signals correspond to an average signal sample irrespective of the polarity of the supervisory signal.

38. A puse multiplex communication system, comprising a local station, a remote station, a master frequency source at said local station, a plurality of signalling channels associated with each of said local and remote stations, a pulse multiplex transmission path common to the signalling channels of both said stations, means at each of said stations and common to the signalling channels thereof for developing under the control of said master frequency source a series of pairs of positive and negative square waves, each of the pairs of each series having a frequency one half that of the preceding pair in that series, means at each of said stations and individual to the channels thereof for combining one square wave from each of said pairs and sampling signals impressed upon the channel during periods when all of the combined square waves are of the same phase, pulse multiplex means for transmitting said signal samples between said stations and over said common path, means at each of said stations and individual to the channels thereof for combining one square wave from each of said pairs and selecting signal samples transmitted thereto over said common path during periods when all of said combined square waves are of the same phase, means at each of said stations and individual to the channels thereof for reconstructing the signals corresponding to the signal samples selected therein by said last-named means, and supervisory relay circuit means individual to each of the channels of said stations for controlling the signal sampling means of said one channel in accordance with supervisory signals impressed on said one channel, said last-named means including means for permitting said signal sampling means to use a full range of modulation for intelligence signals impressed upon said one channel despite the simultaneous impressions of a supervisory signal on said one channel.

39. A pulse multiplex communication system, comprising a local station, a remote station, a master frequency source at said local station, a plurality of signalling channels associated with each of said local and remote stations, a pulse multiplex transmission path common to the signalling channels of both said stations, means at each of said stations and common to the signalling channels thereof for developing under the control of said master frequency source a series of pairs of positive and negative square waves, each of the pairs of each series having a frequency one half that of the preceding pair in that series, means at each of said stations and individual to the channels thereof for combining one square wave from each of said pairs and sampling signals impressed upon the channel during periods when all of the combined square waves are of the same phase, pulse multiplex means for transmitting said signal samples between said stations and over said common path, means at each of said stations and individual to the channels thereof for combining one square wave from each of said pairs and selecting signal samples transmitted thereto over said common path during periods when all of said combined square waves are of the same phase, means at each of said stations and individual to the channels thereof for reconstructing the signals corresponding to the signal samples selected therein by said last-named means, and supervisory relay circuit means individual to each of the channels of said stations for controlling the signal sampling means of said channels in accordance with supervisory signals impressed upon said channels and for translating supervisory signal modulation of said signal samples into corresponding supervisory signals.

40. A pulse multiplex communication system, comprising a local station, a remote station, a master frequency source at said local station, a plurality of signalling channels associated with each of said local and remote stations, a pulse multiplex transmission path common to the signalling channels of both said stations, means at each of said stations and common to the signalling channels thereof for developing under the control of said master frequency source a series of pairs of positive and negative square waves, each of the pairs of each series having a frequency one half that of the preceding pair in that series, means at each of said stations and individual to the channels thereof for combining one square wave from each of said pairs, means controlled by said last-named means for developing signal pulses during periods when all of the combined square waves are of the same phase, means for varying the width of said developed pulses in accordance with signals impressed upon said channel, pulse multiplex means for transmitting said width modulated pulses between said stations and over said common path, means at each of said stations and individual to the channels thereof for combining one square wave from each of said pairs and selecting width modulated pulses transmitted thereto over said common path during periods when all of said combined square waves are of the same phase, means at each of said stations and individual to the channels thereof for de-modulating the width modulated pulses selected therein by said last-named means, and supervisory relay circuit means individual to each of the channels of said stations for varying the average width of the signal pulses developed in said channel in accordance with supervisory signals impressed upon said channel.

41. A pulse multiplex communication system, comprising a local station, a remote station, a master frequency source at one of said stations, a plurality of signal channels adapted to be operatively connected to individual ones of a plurality of signal circuits at each of said local and remote stations, a pulse multiplex transmission path common to the signal channels of both said stations, means at each of said stations and common to the signal channels thereof for developing under the control of said master source a series of pairs of positive and negative square waves, each of the pairs of each series having a frequency one half that of the preceding pair in that series, means at each of said stations and individual to the channels thereof for combining one square wave from each of said pairs, means controlled by said last-named means for developing pulses during periods when all of the combined square waves add simultaneously, means for varying the width of said developed pulses in accordance with signals impressed upon said channel, pulse multiplex means for transmitting said developed pulses between said stations over said common path, means at each of said stations and individual to the channels thereof for combining one square wave from each of said pairs and selecting those ones of said developed pulses which are transmitted thereto over said common path which occur during periods when all of said combined square waves add simultaneously, means at each of said stations and individual to the channels thereof for de-modulating the width modulated pulses selected therein by said last-named means, means individual to each of the channels at a call originating one of said stations for transmitting a seizure pulse over said common path to the corresponding channel at the other station in response to the operative connection thereof to a calling one of said signal circuits, means individual to each of the channels at the call answering station for changing the average width of said developed pulses in response to the operative connection of said channel to one of said signal circuits on a call incoming thereto, means individual to each of the channels at the originating station for varying the average width of the pulses developed therein in accordance with dial impulses impressed upon the signal circuit operatively connected thereto, means individual to the channels at the answering station for translating the dial impulse changes in average width produced by said last-named means into corresponding supervisory signals for connection to the signal circuit operatively connected thereto, and means individual to each channel at the answering station and responsive to an answering condition on the signalling circuit operatively connected thereto for decreasing the average width of said developed pulses, thereby to permit said developed pulses to be fully modulated in accordance with signals impressed upon the signal circuits connected thereto.

42. A pulse multiplex communication system, comprising a local station, a remote station, a master frequency source at one of said stations, a plurality of signal channels adapted to be operatively connected to individual ones of a plurality of signal circuits at each of said local and remote stations, a pulse multiplex transmission path common to the signal channels of both said stations, means at each of said stations and common to the signal channels thereof for developing under the control of said master source a series of pairs of positive and negative square waves, each of the pairs of each series having a frequency one half that of the preceding pair in that series, means at each of said stations and individual to the channels thereof for combining one square wave from each of said pairs, means controlled by said last-named means for developing pulses during periods when all of the combined square waves add simultaneously, means for varying the width of said developed pulses in accordance with signals impressed upon said channel, pulse multiplex means for transmitting said developed pulses between said stations over said common path, means at each of said stations and individual to the channels thereof for combining one square wave from each of said pairs and selecting those ones of said developed pulses which are transmitted thereto over said common path which occur during periods when all of said combined square waves add simultaneously, means at each of said stations and individual to the channels thereof for de-modulating the width modulated pulses selected therein by said last-named means, means individual to each of the channels at a call originating one of said stations for transmitting a seizure pulse over said common path to the corresponding channel at the other station in response to the operative connection thereof to a calling one of said signal circuits, means individual to each of the channels at the call answering station for changing the average width of said developed pulses in response to the operative connection of said channel to one of said signal circuits on a call incoming thereto, means individual to each of the channels at the originating station for varying the average width of the pulses developed therein in accordance with dial impulses impressed upon the signal circuit operatively connected thereto, means individual to the channels at the answering station for translating the dial impulse changes in average width produced by said last-named means into corresponding supervisory signals for connection to the signal circuit operatively connected thereto, means individual to the channels at the answering station for varying the average width of the pulses developed therein in accordance with a busy signal impressed upon the call answering signal circuit operatively connected thereto, and means individual to each channel at the answering station and responsive to an answering condition on the signalling circuit operatively connected thereto for decreasing the average width of said developed pulses, thereby to permit said developed pulses to be fully modulated in accordance with signals impressed upon the signal circuits connected thereto.

43. A pulse multiplex communication system, comprising a local station, a remote station, a master frequency source at one of said stations, a plurality of signal channels adapted to be operatively connected to individual ones of a plurality of signal circuits at each of said local and remote stations, a pulse multiplex transmission path common to the signal channels of both said stations, means at each of said stations and common to the signal channels thereof for developing under the control of said master source a series of pairs of positive and negative square waves, each of the pairs of each series having a frequency one half that of the preceding pair in that series, means at each of said stations and individual to the channels thereof for combining one square wave from each of said pairs, means controlled by said last-named means for developing pulses during periods when all of the combined square waves add simultaneously, means for varying the width of said developed pulses in accordance with signals impressed upon said channel, pulse multiplex means for transmitting said developed pulses between said stations over said common path, means at each of said stations and individual to the channels thereof for combining one square wave from each of said pairs and selecting those ones of said developed pulses which are transmitted thereto over said common path which occur during periods when all of said combined square waves add simultaneously, means at each of said stations and individual to the channels thereof for demodulating the width modulated pulses selected therein by said last-named means, means individual to each of the channels at a call originating one of said stations for transmitting a seizure pulse over said common path to the corresponding channel at the other station in response to the operative connection thereof to a calling one of said signal circuits, means individual to each of the channels at the call answering station for changing the average width of said developed pulses in response to the operative connection of said channel to one of said signal circuits on a call incoming thereto, means individual to each of the channels at the originating station for varying the average width of the pulses developed therein in accordance with dial impulses impressed upon the signal circuit operatively connected thereto, means individual to the channels at the answering station for translating the dial impulse changes in average width produced by said last-named means into corresponding supervisory signals for connection to the signal circuit operatively connected thereto, means individual to each channel at the answering station and responsive to an answering condition on the signalling circuit operatively connected thereto for decreasing the average width of said developed pulses, thereby to permit said developed pulses to be fully modulated in accordance with signals impressed upon the signal circuits connected thereto, and means individual to the channels at the answering station and responsive to termination of a call on the signal circuit operatively connected thereto for changing the average width of the pulses developed therein.

44. A pulse multiplex communication system, comprising a local station, a remote station, a master frequency source at one of said stations, a plurality of signal channels adapted to be operatively connected to individual ones of a plurality of signal circuits at each of said local and remote stations, a pulse multiplex transmission path common to the signal channels of both said stations, means at each of said stations and common to the signal channels thereof for developing under the control of said master source a series of pairs of positive and negative square waves, each of the pairs of each series having a frequency one half that of the preceding pair in that series, means at each of said stations and individual to the channels thereof for combining one square wave from each of said pairs, means controlled by said last-named means for developing pulses during periods when all of the combined square waves add simultaneously, means for varying the width of said developed pulses in accordance with signals impressed upon said channel, pulse multiplex means for transmitting said developed pulses between said stations over said common path, means at each of said stations and individual to the channels thereof for combining one square wave from each of said pairs and selecting those ones of said developed pulses which are transmitted thereto over said common path and which occur during periods when all of said combined square waves add simultaneously, means at each of said stations and individual to the channels thereof for de-modulating the width modulated pulses selected therein by said last-named means, means individual to each of the channels at a call originating one of said stations for transmitting a seizure pulse over said common path to the corresponding channel at the other station in response to the operative connection thereof to a calling one of said signal circuits, means individual to each of the channels at the call answering station for changing the average width of said developed pulses in response to the operative connection of said channel to one of said signal circuits on a call incoming thereto, means individual to each of the channels at the originating station for varying the average width of the pulses developed therein in accordance with dial impulses impressed upon the signal circuit operatively connected thereto, means individual to the channels at the answering station for translating the dial impulse changes in average width produced by said last-named means into corresponding supervisory signals for connection to the signal circuit operatively connected thereto, means individual to the channels at the answering station for varying the average width of the pulses developed therein in accordance with a busy signal impressed upon the call answering signal circuit operatively connected thereto, means individual to the channels at the answering station and responsive to a disconnect signal impressed upon the signal circuit operatively connected thereto for changing the average width of said developed pulses, supervisory indicator means individual to the channels at the originating station and responsive to changes in the average width of pulses transmitted thereto over said common path for indicating seizure of a signal circuit at the answering station, a line or trunk busy condition on the answering signal circuit, and answering of the call and termination thereof at the answering station, and means individual to each channel at the answering station and responsive to an answering condition on the signalling circuit operatively connected thereto for decreasing the average width of said developed pulses, thereby to permit said developed pulses to be fully modulated in accordance with signals impressed upon the signal circuits connected thereto.

References Cited in the file of this patent

UNITED STATES PATENTS

| | | |
|---|---|---|
| 2,390,608 | Miller | Dec. 11, 1945 |
| 2,429,613 | Deloraine et al. | Oct. 28, 1947 |
| 2,457,986 | Edson | Jan. 4, 1949 |
| 2,484,611 | Davis | Oct. 11, 1949 |
| 2,485,591 | Grieg | Oct. 25, 1949 |
| 2,490,801 | Grieg et al. | Dec. 13, 1949 |
| 2,490,833 | Ransom | Dec. 13, 1949 |
| 2,521,774 | Bliss | Sept. 12, 1950 |
| 2,543,736 | Trevor | Feb. 27, 1951 |
| 2,543,738 | Houghton | Feb. 27, 1951 |
| 2,610,254 | Deloraine et al. | Sept. 9, 1952 |
| 2,773,934 | Trousdale | Dec. 11, 1956 |